US011148403B2

(12) United States Patent
Kudo et al.

(10) Patent No.: US 11,148,403 B2
(45) Date of Patent: Oct. 19, 2021

(54) DECORATIVE SHEET

(71) Applicant: TOPPAN PRINTING CO., LTD., Tokyo (JP)

(72) Inventors: Mami Kudo, Tokyo (JP); Eiichi Higashikawa, Tokyo (JP); Masamitsu Nagahama, Tokyo (JP); Akira Sato, Tokyo (JP); Masatoshi Takahashi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 269 days.

(21) Appl. No.: 15/909,720

(22) Filed: Mar. 1, 2018

(65) Prior Publication Data
US 2018/0186131 A1    Jul. 5, 2018

Related U.S. Application Data

(63) Continuation of application No. PCT/JP2016/075898, filed on Sep. 2, 2016.

(30) Foreign Application Priority Data

Sep. 4, 2015 (JP) .............................. JP2015-174470
Sep. 4, 2015 (JP) .............................. JP2015-174471
Jan. 12, 2016 (JP) .............................. JP2016-003512
Jan. 12, 2016 (JP) .............................. JP2016-003513
Mar. 10, 2016 (JP) .............................. JP2016-047201

(51) Int. Cl.
  B32B 27/00    (2006.01)
  B32B 3/30     (2006.01)
  B32B 27/08    (2006.01)
  B32B 27/32    (2006.01)
  B32B 7/12     (2006.01)
  B44C 7/00     (2006.01)
  B44C 5/04     (2006.01)
  B32B 27/18    (2006.01)
  B44C 5/00     (2006.01)
  C08J 7/04     (2020.01)

(52) U.S. Cl.
  CPC .............. *B32B 27/18* (2013.01); *B32B 3/30* (2013.01); *B32B 27/00* (2013.01); *B32B 27/08* (2013.01); *B32B 27/32* (2013.01); *B44C 5/00* (2013.01); *C08J 7/042* (2013.01); *B32B 2307/412* (2013.01); *B32B 2307/712* (2013.01); *B32B 2307/75* (2013.01); *B32B 2451/00* (2013.01)

(58) Field of Classification Search
  CPC ..................................................... C08K 9/10
  See application file for complete search history.

(56) References Cited

U.S. PATENT DOCUMENTS

| 4,783,220 | A | 11/1988 | Gamble et al. |
| 5,985,079 | A | 11/1999 | Ellison |
| 6,025,433 | A | 2/2000 | Shibatoh et al. |
| 6,187,424 | B1 | 2/2001 | Kjellqvist et al. |
| 6,337,126 | B1 | 1/2002 | Simpson et al. |
| 9,365,048 | B1 * | 6/2016 | Robinson ................ B41F 16/00 |
| 2002/0155283 | A1 | 10/2002 | Carter et al. |
| 2003/0112311 | A1 | 6/2003 | Naik et al. |
| 2004/0161568 | A1 | 8/2004 | Truog et al. |
| 2004/0180211 | A1 | 9/2004 | Moravec et al. |
| 2006/0052491 | A1 | 3/2006 | Braig et al. |
| 2009/0118400 | A1 | 5/2009 | Sawaguchi |
| 2009/0258041 | A1 | 10/2009 | Mongiat et al. |
| 2010/0048750 | A1 | 2/2010 | Blom et al. |
| 2010/0261022 | A1 | 10/2010 | Higuchi et al. |
| 2011/0130492 | A1 | 6/2011 | Mader et al. |
| 2012/0328541 | A1 | 12/2012 | Baschong et al. |
| 2013/0287986 | A1 * | 10/2013 | Yamamuro .............. G09F 3/005 428/40.1 |
| 2014/0349096 | A1 * | 11/2014 | Miyazaki ................ B32B 27/36 428/216 |

(Continued)

FOREIGN PATENT DOCUMENTS

| CN | 103469605 A | 12/2013 |
| JP | 09-314791 A | 12/1997 |

(Continued)

OTHER PUBLICATIONS

Machine Translation of JP 2007-204666-A (Year: 2007).*
Extended European Search Report dated Apr. 18, 2019 in corresponding application No. 16842032.1.
International Searching Authority, "International Search Report and Written Opinion," issued in connection with International Patent Application No. PCT/JP2016/075898, dated Nov. 29, 2016.
Chinese Office Action dated Aug. 6, 2019 for corresponding Application No. CN2016800604403 (14 pages).
Japanese Office Action dated Nov. 26, 2019 for corresponding Application No. 2016-003512.
Liposome of III. Cosmetic Formulation Technique. In New Cosmetics Handbook, 30 Japan, Oct. 30, 2006, pp. 683-698.

(Continued)

*Primary Examiner* — Sheeba Ahmed
(74) *Attorney, Agent, or Firm* — Foley & Lardner LLP

(57) ABSTRACT

The present invention provides a decorative sheet having higher designability and weatherability over a long period of time by adding an organic ultraviolet absorbent and an inorganic ultraviolet absorbent each provided as organic ultraviolet absorbent vesicles and inorganic ultraviolet absorbent vesicles, respectively, to at least one of a top coat layer and a transparent resin layer. A decorative sheet of an aspect of the present invention includes a top coat layer as an outermost layer, and a transparent resin layer as an underlayer of the top coat layer, wherein an organic ultraviolet absorbent and an inorganic ultraviolet absorbent are added to at least one of the top coat layer and the transparent resin layer, and the organic ultraviolet absorbent and the inorganic ultraviolet absorbent are each encapsulated in vesicles having a monolayer outer membrane and provided as organic ultraviolet absorbent vesicles and inorganic ultraviolet absorbent vesicles, respectively.

20 Claims, 2 Drawing Sheets

(56) References Cited

U.S. PATENT DOCUMENTS

| | | |
|---|---|---|
| 2015/0368432 A1 | 12/2015 | Smith |
| 2016/0130213 A1 | 5/2016 | Barman et al. |
| 2017/0368837 A1 | 12/2017 | Kesti et al. |
| 2018/0186131 A1 | 7/2018 | Kudo et al. |
| 2018/0186132 A1 | 7/2018 | Ikeda et al. |
| 2018/0186135 A1 | 7/2018 | Higashikawa et al. |
| 2019/0016104 A1 | 1/2019 | Kashiwame et al. |
| 2019/0048212 A1 | 2/2019 | Breon et al. |

FOREIGN PATENT DOCUMENTS

| | | |
|---|---|---|
| JP | 09-314792 A | 12/1997 |
| JP | 11-147292 A | 6/1999 |
| JP | 2000-272057 A | 10/2000 |
| JP | 2000-289162 A | 10/2000 |
| JP | 2001-270054 A | 10/2001 |
| JP | 2001-315270 A | 11/2001 |
| JP | 2003-039613 A | 2/2003 |
| JP | 2003-340973 A | 12/2003 |
| JP | 2006-298840 A | 11/2006 |
| JP | 2006-328272 A | 12/2006 |
| JP | 2007-119623 A | 5/2007 |
| JP | 2007-204666 A | 8/2007 |
| JP | 3959813 B2 | 8/2007 |
| JP | 4032829 B2 | 1/2008 |
| JP | 2008-062416 A | 3/2008 |
| JP | 2009-184167 A | 8/2009 |
| JP | 2011-042041 A | 3/2011 |
| JP | 2011-056879 A | 3/2011 |
| JP | 2013-122020 A | 6/2013 |
| JP | 2016-117280 A | 6/2016 |
| JP | 2016-137585 A | 8/2016 |
| JP | 2016-155233 A | 9/2016 |
| JP | 2016-165807 A | 9/2016 |
| JP | 2016-168830 A | 9/2016 |
| JP | 2016-190464 A | 11/2016 |
| WO | WO-02/32564 A1 | 4/2002 |
| WO | WO-2006/035945 A1 | 4/2006 |
| WO | WO-2008/041649 A1 | 4/2008 |
| WO | WO-2012/090498 A1 | 7/2012 |

OTHER PUBLICATIONS

Office Action dated Apr. 7, 2020 for corresponding Japanese Patent Application No. 2016-003513.

Office Action dated Mar. 19, 2020 for corresponding Chinese Patent Application No. 201680060440.3.

Zhang et al.—"Preparation and properties of a controlled-release microencapsulated ultraviolet stabilizer"; Modern Chemical Industry; Jun. 2015; p. 124-127.

Basf SE et al., Coatings that stay looking good, Mar. 2011 (Year: 2011).

Extended European Search Report issued on patent No. 17876820.6-1107, dated Aug. 19, 2019 (8 pages).

International Searching Authority, "International Search Report," issued in connection with International Patent Application No. PCT/JP2017/042865, dated Mar. 6, 2018.

International Searching Authority, "Written Opinion," issued in connection with International Patent Application No. PCT/JP2017/042865, dated Mar. 6, 2018.

Office Action dated Feb. 2, 2021 for corresponding Japanese Patent Application No. 2017-044256.

Japanese Office Action issued in corresponding Japanese Patent Application No. 2020-117059 dated May 11, 2021.

Masahiko Abe et al., "Development of Nanocapsule Polymer Fillers", in "Plastics" (edited by Japan Plastics Industry Federation), published by Japan Industrial Publishing Co., Ltd., Sep. 10, 2011, pp. 1-5.

Office Action dated Jul. 23, 2020 for corresponding Chinese Patent Application No. 201680060440.3.

* cited by examiner

DECORATIVE SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/075898, filed on Sep. 2, 2016, which is based and claims the benefit of priority to Japan Priority Application No. 2015-174470, filed on Sep. 4, 2015, Japan Priority Application No. 2015-174471, filed on Sep. 4, 2015, Japan Priority Application No. 2016-003512, filed on Jan. 12, 2016, Japan Priority Application No. 2016-003513, filed on Jan. 12, 2016, and Japan Priority Application No. 2016-047201, filed on Mar. 10, 2016 the disclosures of which are all hereby incorporated herein by reference in their entireties.

TECHNICAL FIELD

The present invention relates to decorative sheets.

BACKGROUND

PTL 1 discloses an example technique related to decorative sheets using an olefin-based resin, which are drawing attention as alternative decorative sheets to polyvinyl chloride decorative sheets.

CITATION LIST

Patent Literature

PTL 1: Japanese Patent No. 4032829

SUMMARY OF THE INVENTION

Technical Problem

However, there are few decorative sheets that have designability and weatherability over a long period of time.

The present invention has been made to solve the above problem, and aims to provide decorative sheets having higher designability and weatherability over a long period of time.

Solution to Problem

In order to solve this problem, a decorative sheet according to an aspect of the present invention is characterized in that the decorative sheet includes a top coat layer as an outermost layer, and a transparent resin layer as an underlayer of the top coat layer, wherein an organic ultraviolet absorbent and an inorganic ultraviolet absorbent are added to at least one of the top coat layer and the transparent resin layer, and the organic ultraviolet absorbent and the inorganic ultraviolet absorbent are each encapsulated in vesicles having a monolayer outer membrane and provided as organic ultraviolet absorbent vesicles and inorganic ultraviolet absorbent vesicles, respectively.

Advantageous Effects of Invention

According to a decorative sheet of an aspect of the present invention, the organic ultraviolet absorbent vesicles and the inorganic ultraviolet absorbent vesicles are added to at least one of the top coat layer and transparent resin layer. Accordingly, a decorative sheet having higher designability and weatherability over a long period of time can be provided.

DETAILED DESCRIPTION OF THE DETAILED DESCRIPTION

Figure 1:
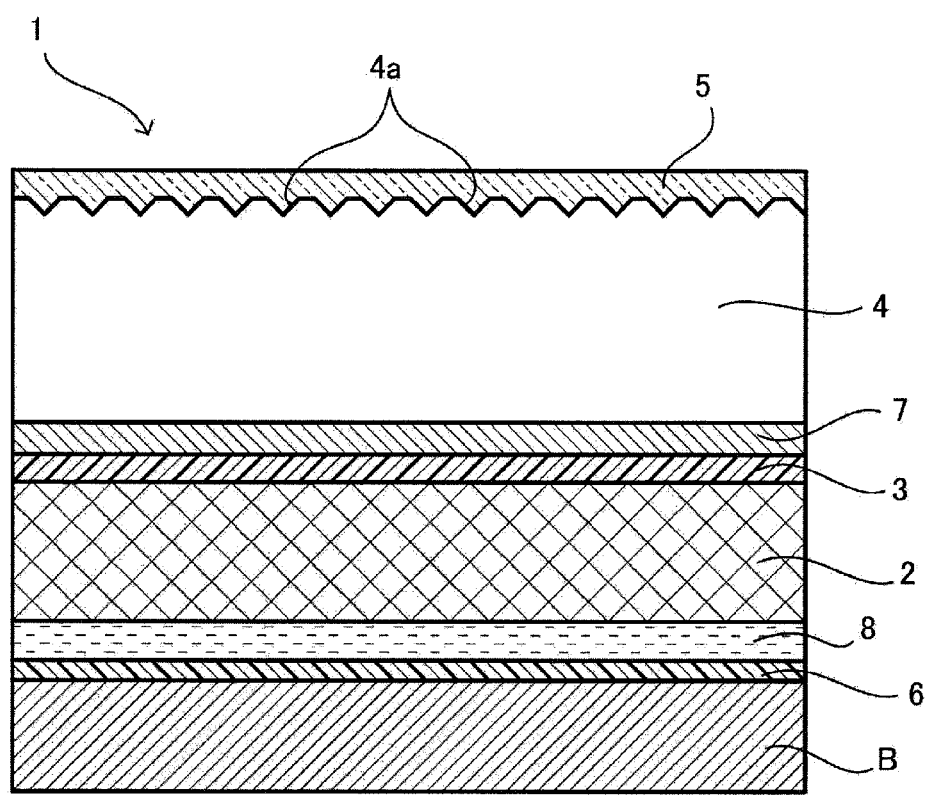
FIG. 1 is a cross-sectional view which illustrates a configuration of a decorative sheet according to first to third and fifth embodiments of the present invention.
Figure 2:
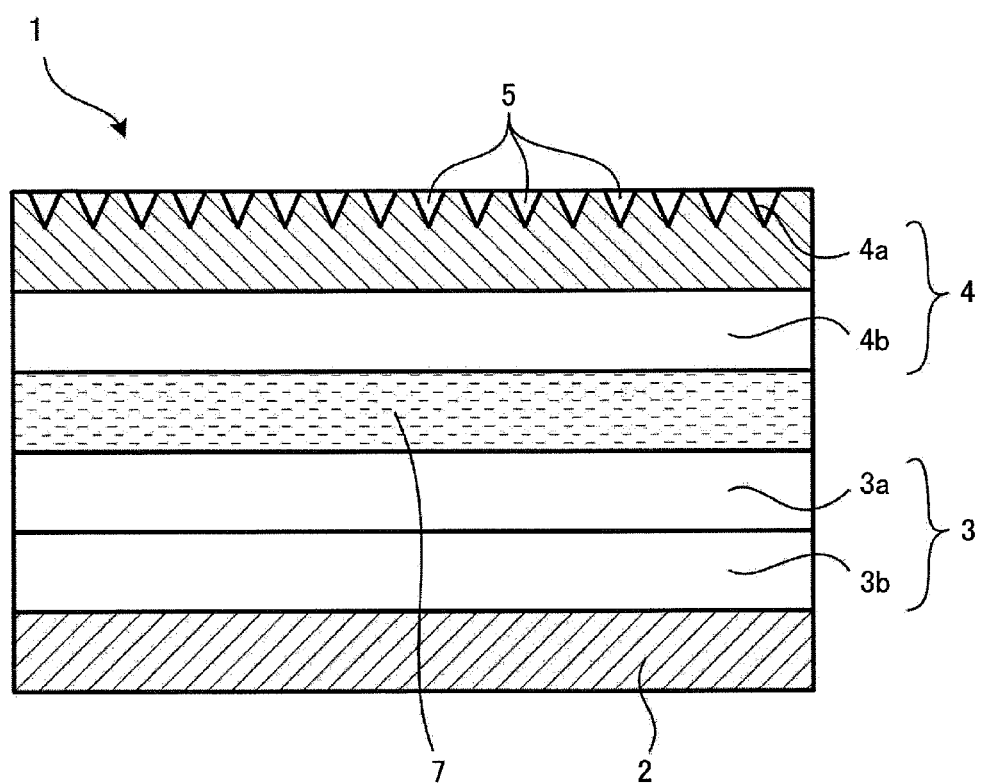
FIG. 2 is a cross-sectional view which illustrates a configuration of a decorative sheet according to fourth and sixth embodiments of the present invention.

With reference to FIGS. 1 and 2, specific examples of a configuration of a decorative sheet according to first to sixth embodiments of the present invention will be described.

It is to be understood that the following Examples and embodiments are intended to be representative of the present invention. The present invention is not necessarily limited to the Examples and embodiments discussed below. Also, the drawings are schematic, and the relationship of the thickness and the planar dimensions, the ratios of the thicknesses of the layers, and the like are different from the actual ones. In addition, in order to simplify drawings, well-known structures are schematically shown. Further, throughout the drawings, the same reference numbers refer to components that perform the same or like functions to omit duplicated description. The embodiments described below are merely examples of a configuration for embodying the technical concept of the present invention, and the technical concept of the present invention does not limit the materials, shapes, structures, and the like of the components to those described below. Further, the technical concept of the present invention can be variously modified within the technical scope defined in the claims.

First Embodiment

A decorative sheet of the present embodiment includes a top coat layer as an outermost layer and a transparent resin layer made of a transparent olefin-based resin as an underlayer of the top coat layer, wherein an organic ultraviolet absorbent and an inorganic ultraviolet absorbent are added to at least one of the top coat layer and the transparent resin layer.

In the decorative sheet of the present embodiment, it is particularly important that the organic ultraviolet absorbent and the inorganic ultraviolet absorbent are each encapsulated in vesicles having a monolayer outer membrane and provided as organic ultraviolet absorbent vesicles and inorganic ultraviolet absorbent vesicles, respectively. Accordingly, the additive amounts of the organic ultraviolet absorbent vesicles and the inorganic ultraviolet absorbent vesicles having different absorption wavelengths and photo-stability can be precisely determined depending on the application of the decorative sheet, which enables to provide the decorative sheet most suitable for the application.

The organic ultraviolet absorbent may be at least one selected from the group consisting of, for example, benzotriazole, triazine, benzophenone, benzoate, and cyanoacrylate-based absorbents. In particular, at least one of benzotriazole-based organic ultraviolet absorbent or triazine-based organic ultraviolet absorbent is preferably used since they have high ultraviolet absorbance, thermal stability, less volatility and resin miscibility.

Examples of the benzotriazole-based ultraviolet absorbent include 2-(2'-hydroxy-5'-methylphenyl) benzotriazole, 2-(2'-hydroxy-3',5'-di-tert-butylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl) benzotriazole, 2-(2'-hydroxy-3',5'-dicumyl phenyl) benzotriazole, and 2,2'-methylenebis (4-tert-octyl-6-benzotriazolyl) phenol.

Examples of the triazine-based ultraviolet absorbent include 2-(2-hydroxy-4-[1-octyloxycarbonylethoxy]phenyl)-4,6-bis (4-phenyl phenyl)-1,3,5-triazine, 2-[4-[(2-hydroxy-3-dodecyloxypropyl)oxy]-2-hydroxyphenyl]-4,6-bis (2,4-dimethylphenyl)-1,3,5-triazine, 2,4-bis[2-hydroxy-4-butoxy phenyl]-6-(2,4-dibutoxy phenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, and 2-[4-[(2-hydroxy-3-(2'-ethyl)hexyl)oxy]-2-hydroxyphenyl]-4,6-bis(2,4-dimethylphenyl)-1,3,5-triazine.

Examples of the benzophenone-based ultraviolet absorbent include 2,4-dihydroxybenzophenone, 2-hydroxy-4-methoxy benzophenone, 2-hydroxy-4-octoxy benzophenone, and 5,5'-methylenebis(2-hydroxy-4-methoxy benzophenone).

Examples of the benzoate-based ultraviolet absorbent include phenyl salicylate, resorcinol monobenzoate, 2,4-di-tert-butylphenyl-3',5'-di-tert-butyl-4'-hydroxybenzoate, 2,4-di-tert-amyl phenyl-3',5'-di-tert-butyl-4'-hydroxybenzoate, and hexadecyl-3,5-di-tert-butyl-4-hydroxybenzoate. Examples of the cyanoacrylate-based ultraviolet absorbent include ethyl-α-cyano-β,β-diphenyl acrylate, and methyl-2-cyano-3-methyl-3-(p-methoxy phenyl) acrylate.

Further, examples of the inorganic ultraviolet absorbent include zinc oxide, titanium oxide, and cerium oxide. Among others, zinc oxide is preferably used since it has a similar refractive index to those of the transparent olefin-based resin and the top coat layer resin which enables these resins to maintain high transparency when the zinc oxide is added thereto. A particle diameter of the inorganic ultraviolet absorbent is preferably in the range of 1 nm to 200 nm.

It is most preferred that the organic ultraviolet absorbent vesicles and the inorganic ultraviolet absorbent vesicles of the present embodiment are prepared by a supercritical reverse phase evaporation method. A detailed description of the supercritical reverse phase evaporation method follows below. In the supercritical reverse phase evaporation method, a substance for constituting an outer membrane of the vesicles is dissolved in carbon dioxide which is under a supercritical state or under a condition in which temperature or pressure is equal to or higher than the critical point to prepare a homogenous mixture, and then an aqueous phase containing an organic ultraviolet absorbent or an inorganic ultraviolet absorbent which is a water soluble or hydrophilic substance to be encapsulated is added to the mixture to thereby prepare capsule-like organic ultraviolet absorbent vesicles and inorganic ultraviolet absorbent vesicles which encapsulate the organic ultraviolet absorbent or the inorganic ultraviolet absorbent, which is an encapsulation target substance, with a monolayer membrane (single layer membrane). Carbon dioxide in a supercritical state indicates carbon dioxide that is in a supercritical state with a temperature that is equal to or higher than the critical temperature (30.98° C.) and a pressure that is equal to or higher than the critical pressure (7.3773±0.0030 MPa). Further, carbon dioxide under a condition in which temperature or pressure is equal to or higher than the critical point indicates carbon dioxide under a condition where only one of the temperature and the pressure is equal to or higher than the critical condition. According to this method, unilamellar vesicles with a diameter of 50 to 800 nm can be obtained.

Examples of phospholipid that constitutes the outer membrane of vesicles include glycerophospholipids such as phosphatidyl choline, phosphatidylethanolamine, phosphatidylserine, phosphatidic acid, phosphatidylglycerol, phosphatidylinositol, cardiopine, yolk lecithin, hydrogenated yolk lecithin, soybean lecithin, and hydrogenated soybean lecithin, and sphingophospholipids such as sphingomyelin, ceramidephosphoryl ethanolamine, and ceramidephosphoryl glycerol.

Besides the phospholipid, the substance that constitutes the outer membrane of vesicles may be a dispersant such as a nonionic surfactant, or a mixture of the nonionic surfactant and cholesterols or triacylglycerol.

More specifically, the nonionic surfactant may be one or more of the followings: polyglycerol ether, dialkylglycerine, polyoxyethylene hydrogenated castor oil, polyoxyethylene alkyl ether, polyoxyethylene sorbitan fatty acid ester, sorbitan fatty acid ester, polyoxyethylene polyoxypropylene copolymer, polybutadiene-polyoxyethylene copolymer, polybutadiene-poly 2-vinylpyridine, polystyrene-polyacrylic acid copolymer, polyethylene oxide-polyethylethylene copolymer, and polyoxyethylene-polycaprolactam copolymer. Examples of the cholesterols include cholesterol, α-cholestanol, β-cholestanol, cholestane, desmosterol (5,24-cholestadiene-3β-ol), sodium cholate, and cholecalciferol.

Further, the outer membrane of vesicles may also be made of a mixture of phospholipid and a dispersant. In the decorative sheet of the present embodiment, it is important that the vesicles have the outer membrane made of phospholipid, which provides good miscibility with the resin composition which is the main component of the top coat layer and the transparent resin layer.

When the organic ultraviolet absorbent vesicles and the inorganic ultraviolet absorbent vesicles are added to the top coat layer, a preferred amount of the organic ultraviolet absorbent vesicles to be added is in the range of 0.5 to 20 parts by weight and a preferred amount of the inorganic ultraviolet absorbent vesicles to be added is in the range of 0.5 to 20 parts by weight per 100 parts by weight of the resin composition which is the main component of the top coat layer. If the additive amount of these ultraviolet absorbents is less than 0.5 parts by weight, ultraviolet absorbance will be less effective. On the other hand, if the additive amount is more than 20 parts by weight, blocking will be more likely to occur. More preferably, the additive amount of the organic ultraviolet absorbent vesicles is in the range of 1 to 10 parts by weight and the additive amount of the inorganic ultraviolet absorbent vesicles is in the range of 1 to 10 parts by weight. Still more preferably, the additive amount of the organic ultraviolet absorbent vesicles is in the range of 3 to 5 parts by weight and the additive amount of the inorganic ultraviolet absorbent vesicles is in the range of 3 to 5 parts by weight.

When the organic ultraviolet absorbent vesicles and the inorganic ultraviolet absorbent vesicles are added to the transparent resin layer, a preferred amount of the organic ultraviolet absorbent vesicles to be added is in the range of 0.1 to 5 parts by weight and a preferred amount of the inorganic ultraviolet absorbent vesicles to be added is in the range of 0.1 to 5 parts by weight per 100 parts by weight of the resin composition which is the main component of the transparent resin layer. If the additive amount of these ultraviolet absorbents is less than 0.1 parts by weight, ultraviolet absorbance will be less effective. On the other hand, if the additive amount is more than 5 parts by weight, bleeding-out will be more likely to occur. More preferably, the additive amount of the organic ultraviolet absorbent vesicles is in the range of 0.2 to 3 parts by weight and the additive amount of the inorganic ultraviolet absorbent vesicles is in the range of 0.2 to 3 parts by weight.

In the decorative sheet of the present embodiment, it is important that an embossed pattern is formed on the transparent resin layer and the recesses of the embossed pattern are filled with the top coat layer. More preferably, the recesses are filled with the top coat layer by wiping.

Further, it is important that an underlayer of the transparent resin layer is an ink layer made of ink to which at least a photostabilizer is added. As the photostabilizer, a hindered amine-based material is preferably used. Adding the photostabilizer to the ink layer can prevent radicals generated in the ink layer binder resin or generated by degradation of the resin in other layers from reducing the chemical components of the ink pigment to thereby prevent discoloration of the pigment.

With reference to FIG. 1, a specific configuration of the decorative sheet of the present embodiment will be described.

(Overall Configuration)

FIG. 1 illustrates a specific configuration of a decorative sheet 1 of the present embodiment, which is composed of a plurality of resin layers. The decorative sheet 1 of the present embodiment includes a top coat layer 5, a transparent resin layer 4, an adhesive layer 7, an ink layer 3, a primary film layer 2, a concealing layer 8, and a primer layer 6, which are laminated in this order from the outermost surface of the decorative sheet 1. Further, in order to improve designability, an embossed pattern 4a is formed on the surface of the transparent resin layer 4 which faces the top coat layer 5. The recesses of the embossed pattern 4a are filled with part of the resin composition which constitutes the top coat layer 5 by wiping. The adhesive layer 7 is composed of, for example, a thermosensitive adhesive, an anchor coat, an adhesive for dry lamination, and the like. Moreover, the decorative sheet 1 is bonded to a substrate B to thereby form a decorative board. Examples of the substrate B include wooden boards, inorganic boards and metal plates.

[Top Coat Layer 5]

The top coat layer 5 is formed by adding the organic ultraviolet absorbent vesicles and the inorganic ultraviolet absorbent vesicles to the resin composition that serves to protect the surface and adjust the gloss.

The resin composition which is the main component of the top coat layer 5 may be selected as appropriate from polyurethane, acrylic silicone, fluorine, epoxy, vinyl, polyester, melamine, aminoalkyd, urea-based compositions and the like. The form of the resin composition is not limited to any of aqueous, emulsion, and solvent. The curing method may be selected as appropriate from one-part type, two-part type, UV-curing and the like. In particular, the resin composition that is cured by mixing a urethane-based main agent with an isocyanate-based curing agent is preferable in view of processability, cost, and cohesive force of the resin.

The isocyanate may be appropriately selected from adduct, biuret, and isocyanurate hardeners, which are derivatives of tolylene diisocyanate (TDI), xylylene diisocyanate (XDI), hexamethylene diisocyanate (HMDI), diphenylmethane diisocyanate (MDI), lysine diisocyanate (LDI), isophorone diisocyanate (IPDI), bis(isocyanate methyl) cyclohexane (HXDI), trimethylhexamethylene diisocyanate (TMDI), and the like. In view of weatherability, hardener using hexamethylene diisocyanate (HMDI) or isophorone diisocyanate (IPDI) having a linear molecular structure as a base is preferably used. In addition, in order to improve surface hardness, resins curable with active energy beams such as ultraviolet and electron beams are preferably used. Moreover, these resins can be used in combination. For example, use of a hybrid of thermally curable resin and photo-curable resin can improve surface hardness, reduce cure shrinkage and enhance adhesion to the transparent resin layer.

In addition, in order to impart various functions to the top coat layer 5, functional additives such as antimicrobial agent and antifungal agent can be suitably added. In order to improve designability of the surface, alumina, silica, silicon nitride, silicon carbide, glass beads or the like can be added to adjust the gloss. Further, alumina, silica, silicon nitride, silicon carbide, glass beads or the like can be added to enhance abrasion resistance of the surface.

[Transparent Resin Layer 4]

The transparent resin layer 4 preferably contains olefin-based resin as the main component. Examples of the transparent resin layer 4 include, besides polypropylene, polyethylene, polybutene, and the like, a homopolymer or a copolymer of one or more of α-olefins (e.g., propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, etc.), and a copolymer of ethylene or an α-olefin with another monomer, for example, an ethylene-vinyl acetate copolymer, ethylene-vinyl alcohol copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, and the like. Further, in order to improve the surface hardness of the decorative sheet 1, highly crystalline polypropylene is preferably used.

More preferably, in the decorative sheet 1 of the present embodiment, the organic ultraviolet absorbent vesicles and the inorganic ultraviolet absorbent vesicles are added to the transparent resin layer 4. This enables the transparent resin layer 4 to have weatherability, which prevents the olefin-based resin composition which is the main component of the transparent resin layer 4 from being degraded and prevents a pattern printed on the ink layer 3, which is an underlayer of the resin layer 4, from being discolored due to UV exposure. Accordingly, higher designability can be maintained over a long period of time.

In addition, various additives such as thermal stabilizer, photostabilizer, anti-blocking agent, catalyst scavenger, coloring agent, light scattering agent and gloss adjusting agent may also be added to the transparent resin layer 4. Typically, a combination of the thermal stabilizer such as phenol, sulfur, phosphorus, or hydrazine-based stabilizer, the ultraviolet absorbent such as benzotriazole, benzoate, benzophenone, or triazine-based absorbent, and the photostabilizer such as hindered amine-based stabilizer is suitably used.

[Adhesive Layer 7]

The adhesive layer 7 is not specifically limited and can be appropriately selected from acrylic, polyester, polyurethane and epoxy-based adhesives and the like. An application method can be appropriately selected depending on the viscosity of the adhesive and the like, and may be typically gravure coating. After being applied on the top of the ink layer 3 by gravure coating, the adhesive layer 7 is laminated on the transparent resin layer 4. The adhesive layer 7 may not be necessarily provided when the adhesiveness between the transparent resin layer 4 and the ink layer 3 is sufficient.

[Ink Layer 3]

The ink layer 3 is a pattern printed on the primary film layer 2 by using ink, and may be appropriately selected from nitrocellulose, cellulose, vinyl chloride-vinyl acetate copolymer, polyvinyl butyral, polyurethane, acrylic, and polyester binders, or modified products thereof. These may be any of aqueous, solvent, and emulsion types, and may be a one-part type or a two-part type which uses a hardener. Further, ink can be cured by irradiation with ultraviolet rays, electron beams or the like. In particular, the most typical method is use of urethane-based ink cured by isocyanate. In addition to these binders, coloring agent such as pigment and dye, extender pigment, solvent, and various additives contained in general ink may be added. Examples of highly versatile pigment include condensed azo, insoluble azo, quinacridone, isoindoline, anthraquinone, imidazolone, cobalt, phthalocyanine, carbon, titanium oxide, iron oxide, pearl pigments of mica, and the like. Moreover, besides the application of ink, vapor deposition or sputtering of various metals can be performed to apply a design.

Further, in the decorative sheet 1 of the present embodiment, a photostabilizer is preferably added to the ink layer 3. Adding the photostabilizer to the ink layer 3 can prevent photodegradation of the ink which may impair the designability. Accordingly, higher designability of the decorative sheet 1 can be maintained.

[Primary Film Layer 2]

The primary film layer 2 may be selected from, for example, paper such as thin paper, titanium paper, and resin-impregnated paper, synthetic resins such as polyethylene, polypropylene, polybutylene, polystyrene, polycarbonate, polyester, polyamide, ethylene-vinyl acetate copolymer, polyvinyl alcohol, and acrylic resin, foams of these synthetic resins, rubber such as ethylene-propylene copolymer rubber, ethylene-propylene-diene copolymer rubber, styrene-butadiene copolymer rubber, styrene-isoprene-styrene block copolymer rubber, styrene-butadiene-styrene block copolymer rubber, and polyurethane, an organic or inorganic nonwoven fabric, synthetic paper, and metal foils such as aluminum, iron, gold, and silver.

In order to impart concealing properties to the decorative sheet 1, the primary film layer 2 may be a colored sheet to provide concealing properties, or an opaque concealing layer 8 can be additionally provided to the primary film layer 2 which is a transparent sheet to thereby provide concealing properties.

[Concealing Layer 8]

The concealing layer 8 can be basically made of the same material as that of the ink layer 3. Since the concealing layer 8 is provided to impart concealing properties, the pigment used is preferably an opaque pigment such as titanium oxide or iron oxide. Further, in order to improve concealing properties, a metal such as gold, silver, copper, or aluminum can be added. Typically, aluminum flakes are added.

Further, when an olefin-based resin is used as the primary film layer 2, the surface is inactivated in many cases. Therefore, a primer layer 6 is preferably provided between the primary film layer 2 and the substrate B. In addition to that, in order to improve adhesiveness between the primary film layer 2 made of an olefin-based material and the substrate B, the primary film layer 2 is preferably processed with a treatment such as a corona treatment, plasma treatment, ozone treatment, electron beam treatment, ultraviolet ray treatment, or bichromate treatment.

[Primer Layer 6]

The primer layer 6 can be basically made of the same material as that of the ink layer 3 described above. Considering the web handling, since the primer layer 6 is applied on the back surface of the decorative sheet 1, an inorganic filler such as silica, alumina, magnesia, titanium oxide, or barium sulfate may be added to the primer layer 6 to prevent blocking and improve adhesiveness to an adhesive.

[Production of Decorative Sheet 1]

In production of the decorative sheet 1 of the present embodiment, a lamination method can be appropriately selected from, but is not limited to, general methods such as lamination by heating and pressurizing, extrusion lamination, and dry lamination. The embossed pattern 4a, if provided, can be formed by applying heat and pressure after lamination by the above laminating method to thereby form the embossed pattern 4a or providing an embossed pattern on a cooling roll to form the embossed pattern 4a simultaneously with the extrusion lamination.

In the decorative sheet 1 of the present embodiment, the primary film layer 2 is preferably in the range of 20 to 150 μm thickness considering print workability, cost, and the like, the adhesive layer 7 is in the range of 1 to 20 μm thickness, the transparent resin layer 4 is in the range of 20 to 200 μm thickness, and the top coat layer 5 is in the range of 3 to 20 μm thickness, and the total thickness of the decorative sheet 1 is preferably in the range of 45 to 400 μm.

Advantageous Effect of the Present Embodiment

According to the decorative sheet 1 of the present embodiment, the organic ultraviolet absorbent vesicles and the inorganic ultraviolet absorbent vesicles are added to at least one of the top coat layer 5 and the transparent resin layer 4. Accordingly, high transparency can be maintained to ensure higher designability, and higher weatherability can be achieved over a long period of time.

Further, according to the decorative sheet 1 of the present embodiment, the organic ultraviolet absorbent vesicles and the inorganic ultraviolet absorbent vesicles are used. Accordingly, they can exhibit high dispersibility in the resin composition which is the main component, and express high ultraviolet absorbance without increase in the additive amount of the ultraviolet absorbent to thereby ensure higher weatherability. Moreover, the surface of the sheet does not become sticky since bleeding-out due to aggregation of an additive in the resin composition or white turbidity of the resin composition does not occur. Accordingly, the decorative sheet 1 having high adhesiveness and designability can be provided. Specifically, since these vesicles have a phospholipid outer membrane, particularly good miscibility with the resin composition which is the main component of the top coat layer 5 and the transparent resin layer 4 can be achieved.

Moreover, according to the decorative sheet 1 of the present embodiment, the recesses of the embossed pattern 4a are filled with the top coat layer 5. Accordingly, the recesses having a decreased layer thickness can also maintain higher weatherability.

Further, providing the ink layer 3 using ink to which a photostabilizer is added can prevent discoloration of the ink layer 3 due to UV exposure. Accordingly, the decorative sheet 1 having higher designability can be provided while maintaining a beautiful design print over a long period of time.

The more detailed effects of the present embodiment will be described below.

(1) The decorative sheet 1 of the present embodiment is characterized in that the decorative sheet 1 includes the top coat layer 5 as an outermost layer, and the transparent resin layer 4 as an underlayer of the top coat layer 5, wherein an organic ultraviolet absorbent and an inorganic ultraviolet absorbent are added to at least one of the top coat layer 5 and the transparent resin layer 4, and the organic ultraviolet absorbent and the inorganic ultraviolet absorbent are each encapsulated in vesicles having a monolayer outer membrane and provided as organic ultraviolet absorbent vesicles and inorganic ultraviolet absorbent vesicles, respectively.

With this configuration, the organic ultraviolet absorbent vesicles having high transparency and the inorganic ultraviolet absorbent vesicles having higher weatherability are added to at least one of the top coat layer 5 and the transparent resin layer 4. Accordingly, a decorative sheet that enables higher designability and weatherability over a long period of time can be provided. Further, the organic ultraviolet absorbent vesicles and the inorganic ultraviolet absorbent vesicles are separately prepared and added. Accordingly, the additive amount of the organic ultraviolet absorbent vesicles and the inorganic ultraviolet absorbent vesicles can be easily modified depending on the function desired for products. More specifically, when transparency is of importance, the additive amount of the inorganic ultraviolet absorbent vesicles is decreased and the additive amount of the organic ultraviolet absorbent vesicles is increased. When extension of the product life is desired, the additive amount of the organic ultraviolet absorbent vesicles is decreased and the additive amount of the inorganic ultraviolet absorbent vesicles is increased.

(2) In the decorative sheet 1 of the present embodiment, the outer membrane of the vesicles may be made of phospholipid.

With this configuration, good miscibility with the resin composition which is the main component of the top coat layer 5 and the transparent resin layer 4 can be achieved. Accordingly, vesicles can exhibit high dispersibility in the resin composition which is the main component, and prevent occurrence of secondary aggregation.

(3) In the decorative sheet 1 of the present embodiment, the organic ultraviolet absorbent may be at least one selected from the group consisting of, for example, benzotriazole, triazine, benzophenone, benzoate, and cyanoacrylate-based absorbents.

With this configuration, a decorative sheet with high transparency and higher designability can be provided.

(4) In the decorative sheet 1 of the present embodiment, the inorganic ultraviolet absorbent may be zinc oxide.

With this configuration, a decorative sheet with high functionality, having ultraviolet absorbance over a long period of time can be provided.

(5) In the decorative sheet 1 of the present embodiment, the embossed pattern 4a is formed on the surface of the transparent resin layer 4 which faces the top coat layer 5, and the recesses of the embossed pattern 4a may be filled with the top coat layer 5.

With this configuration, although the transparent resin layer 4 having the embossed pattern 4a has a reduced thickness at positions of the recesses of the embossed pattern 4a, the recesses are filled with the top coat layer 5 to which the organic ultraviolet absorbent vesicles and the inorganic ultraviolet absorbent vesicles have been added. Accordingly, a decorative sheet in which the recesses of the embossed pattern 4a have no less weatherability than the remaining portion of the transparent resin layer 4 can be provided.

EXAMPLES

Specific examples of the decorative sheet 1 of the present invention will be described below.

<Preparation of Organic Ultraviolet Absorbent Vesicles and Inorganic Ultraviolet Absorbent Vesicles>

A preparation method of organic ultraviolet absorbent vesicles or inorganic ultraviolet absorbent vesicles using a supercritical reverse phase evaporation method according to the present embodiment will be detailed below. In preparation of these vesicles, a supercritical reverse phase evaporation method was used.

Vesicles were prepared as follows: 100 parts by weight of hexane, 70 parts by weight of hydroxyphenyl triazine (TINUVIN 400; manufactured by BASF Corp.) containing triazine-based ultraviolet absorbent 2-[4-[(2-Hydroxy-3-dodecyloxypropyl)oxy]-2-hydroxyphenyl]-4,6-bis(2,4-dimethylphenyl)-1,3,5-triazine as the main component as an organic ultraviolet absorbent or 70 parts by weight of zinc oxide (the average grain size 20 nm) as an inorganic ultraviolet absorbent, and 5 parts by weight of a phosphatidylcholine as the phospholipid were placed in a high-pressure stainless steel vessel kept at 60° C., and sealed therein. Carbon dioxide was injected into the vessel so that the vessel pressure becomes 20 MPa at a supercritical state. 100 parts by weight of ethyl acetate was injected while vigorously stirring the vessel contents. After stirring for 15 minutes at constant temperature and the pressure, carbon dioxide was exhausted for returning to atmospheric pressure. Thus, the organic ultraviolet absorbent vesicles or the inorganic ultraviolet absorbent vesicles having a monolayer outer membrane made of phospholipid were obtained.

Examples 1-1 to 1-5

In Examples 1-1 to 1-5, the decorative sheet 1 was provided by adding 0.5, 1.0, 5.0, 10.0, and 20.0 parts by weight of the organic ultraviolet absorbent vesicles prepared by the method described above and 0.5, 1.0, 5.0, 10.0, and 20.0 parts by weight of the inorganic ultraviolet absorbent vesicles prepared by the method described above to the urethane-based resin composition which is the main component of the top coat layer 5.

Specifically, a resin prepared by adding 0.05 parts by weight of a hindered phenol-based antioxidant (IRGANOX 1010; manufactured by BASF Corp.) and 0.2 parts by weight of a hindered amine-based photostabilizer (CHIMASSORB 944; manufactured by BASF Corp.) to a highly crystalline homopolypropylene resin was melt-extruded by an extruder to thereby form a transparent highly crystalline polypropylene sheet having 80 µm thickness as the transparent resin layer 4. The highly crystalline polypropylene sheet thus obtained was subjected to corona treatment on both surfaces to achieve a sheet surface wet tension of 40 dyn/cm or more. Then, a pattern was printed on one of the surfaces of the primary film layer 2, which was a 70 µm thick polyethylene sheet having concealing properties, by gravure printing using a two-part type urethane ink (V180; manufactured by Toyo Ink Co., Ltd.) to thereby provide the ink layer 3 of 3 µm thickness. Further, primer coating was applied on the other of the surfaces of the polyethylene sheet which was the primary film layer 2 to thereby provide the primer layer 6 of 1 μm thickness. After that, the transparent resin layer 4 was bonded to the surface of the ink layer 3 formed on the polyethylene sheet via a dry lamination adhesive (TAKELAC A540; manufactured by Mitsui Chemicals, Inc.) which is an adhesive layer 7 having a thickness of 3 μm. Thus, a laminate resin sheet of 157 μm thickness made up of the primary film layer 2, the ink layer 3, the adhesive layer 7, the primer layer 6 and the transparent resin layer 4 was obtained. The embossed pattern 4a was formed on the surface of the transparent resin layer 4 of the laminate resin sheet. Then, a two-part type urethane top coat (W184; manufactured by DIC Graphics Corp., applied amount 3 g/m2) to which the organic ultraviolet absorbent vesicles and the inorganic ultraviolet absorbent vesicles combined as specified in Table 1 were added was applied on the surface of the transparent resin layer 4 to thereby form the top coat layer 5. Thus, the decorative sheets 1 of Examples 1-1 to 1-5 having a total thickness of 160 μm were obtained.

Examples 1-6 to 1-10

In Examples 1-6 to 1-10, the decorative sheet 1 was provided by adding 0.1, 0.5, 1.0, 2.5, and 5.0 parts by weight of the organic ultraviolet absorbent vesicles prepared by the method described above and 0.1, 0.5, 1.0, 2.5, and 5.0 parts by weight of the inorganic ultraviolet absorbent vesicles prepared by the method described above to the crystalline homopolypropylene resin composition which is the main component of the transparent resin layer 4.

Specifically, a resin prepared by adding 0.05 parts by weight of a hindered phenol-based antioxidant (IRGANOX 1010; manufactured by BASF Corp.), 0.2 parts by weight of a hindered amine-based photostabilizer (CHIMASSORB 944; manufactured by BASF Corp.), and the organic ultraviolet absorbent vesicles and the inorganic ultraviolet absorbent vesicles combined as specified in Table 2 to a highly crystalline homopolypropylene resin was melt-extruded by an extruder to thereby form a transparent highly crystalline polypropylene sheet having 80 μm thickness as the transparent resin layer 4. The highly crystalline polypropylene sheet thus obtained was subjected to corona treatment on both surfaces to achieve a sheet surface wet tension of 40 dyn/cm or more. Then, a pattern was printed on one of the surfaces of the primary film layer 2, which was a 70 μm thick polyethylene sheet having concealing properties, by gravure printing using a two-part type urethane ink (V180; manufactured by Toyo Ink Co., Ltd.) to thereby provide the ink layer 3 of 3 μm thickness. Further, primer coating was applied on the other of the surfaces of the polyethylene sheet which was the primary film layer 2 to thereby provide the primer layer 6 of 1 μm thickness. After that, the transparent resin layer 4 was bonded to the surface of the ink layer 3 formed on the polyethylene sheet via a dry lamination adhesive (TAKELAC A540; manufactured by Mitsui Chemicals, Inc.) which is an adhesive layer 7 having a thickness of 3 μm. Thus, a laminate resin sheet of 157 μm thickness made up of the primary film layer 2, the ink layer 3, the adhesive layer 7, the primer layer 6 and the transparent resin layer 4 was obtained. The embossed pattern 4a was formed on the surface of the transparent resin layer 4 of the laminate resin sheet. Then, a two-part type urethane top coat (W184; manufactured by DIC Graphics Corp., applied amount 3 g/m2) was applied on the surface of the transparent resin layer 4 to thereby form the top coat layer 5. Thus, the decorative sheets 1 of Examples 1-6 to 1-10 having a total thickness of 160 μm were obtained.

Example 1-11

In Example 1-11, the decorative sheet 1 was provided by adding 1.25 parts by weight of the organic ultraviolet absorbent vesicles prepared by the method described above and 1.25 parts by weight of the inorganic ultraviolet absorbent vesicles prepared by the method described above to the urethane-based resin composition which is the main component of the top coat layer 5, and adding 1.25 parts by weight of the organic ultraviolet absorbent vesicles prepared by the method described above and 1.25 parts by weight of the inorganic ultraviolet absorbent vesicles prepared by the method described above to the crystalline homopolypropylene resin composition which is the main component of the transparent resin layer 4.

Specifically, a resin prepared by adding 0.05 parts by weight of a hindered phenol-based antioxidant (IRGANOX 1010; manufactured by BASF Corp.), 0.2 parts by weight of a hindered amine-based photostabilizer (CHIMASSORB 944; manufactured by BASF Corp.) and 1.25 parts by weight of the organic ultraviolet absorbent vesicles and 1.25 parts by weight of the inorganic ultraviolet absorbent vesicles to a highly crystalline homopolypropylene resin was melt-extruded by an extruder to thereby form a transparent highly crystalline polypropylene sheet having 80 μm thickness as the transparent resin layer 4. The highly crystalline polypropylene sheet thus obtained was subjected to corona treatment on both surfaces to achieve a sheet surface wet tension of 40 dyn/cm or more. Then, a pattern was printed on one of the surfaces of the primary film layer 2, which was a 70 μm thick polyethylene sheet having concealing properties, by gravure printing using a two-part type urethane ink (V180; manufactured by Toyo Ink Co., Ltd.) to thereby provide the ink layer 3 of 3 μm thickness. Further, primer coating was applied on the other of the surfaces of the polyethylene sheet which was the primary film layer 2 to thereby provide the primer layer 6 of 1 μm thickness. After that, the transparent resin layer 4 was bonded to the surface of the ink layer 3 formed on the polyethylene sheet via a dry lamination adhesive (TAKELAC A540; manufactured by Mitsui Chemicals, Inc.) which is an adhesive layer 7 having a thickness of 3 μm. Thus, a laminate resin sheet of 157 μm thickness made up of the primary film layer 2, the ink layer 3, the primer layer 6, the adhesive layer 7, and the transparent resin layer 4 was obtained. The embossed pattern 4a was formed on the surface of the transparent resin layer 4 of the laminate resin sheet. Then, a two-part type urethane top coat (W184; manufactured by DIC Graphics Corp., applied amount 3 g/m2) to which 1.25 parts by weight of the organic ultraviolet absorbent vesicles and 1.25 parts by weight of the inorganic ultraviolet absorbent vesicles were added was applied on the surface of the transparent resin layer 4 to thereby form the top coat layer 5. Thus, the decorative sheet 1 of Example 1-11 having a total thickness of 160 μm was obtained.

Comparative Examples 1-1 and 1-2

In Comparative Examples 1-1 and 1-2, the decorative sheet 1 was provided by adding 0.5 or 50.0 parts by weight of the organic ultraviolet absorbent having no vesicles, respectively, and 0.5 or 50.0 parts by weight of the inorganic ultraviolet absorbent having no vesicles, respectively, to urethane-based resin composition which is the main component of the top coat layer 5. The other configurations are the same as those of the decorative sheets 1 of Examples 1-1 to 1-5.

Comparative Examples 1-3 and 1-4

In Comparative Examples 1-3 and 1-4, the decorative sheet 1 was provided by adding 0.5 or 50.0 parts by weight of the organic ultraviolet absorbent having no vesicles and 0.5 or 50.0 parts by weight of the inorganic ultraviolet absorbent having no vesicles to crystalline homopolypropylene resin composition which is the main component of the transparent resin layer 4. The other configurations are the same as those of the decorative sheets 1 of Examples 1-6 to 1-10.

Comparative Example 1-5

In Comparative Example 1-5, the decorative sheet 1 was provided by adding 0.5 parts by weight of the organic ultraviolet absorbent having no vesicles and 0.5 parts by weight of the inorganic ultraviolet absorbent having no vesicles to the urethane-based resin composition which is the main component of the top coat layer 5, and adding 0.5 parts by weight of the organic ultraviolet absorbent having no vesicles and 0.5 parts by weight of the inorganic ultraviolet absorbent having no vesicles to the crystalline homopolypropylene resin composition which is the main component of the transparent resin layer 4. The other configurations are the same as those of the decorative sheet 1 of Example 1-11.

Comparative Example 1-6

In Comparative Example 1-6, the decorative sheet 1 was provided without an ultraviolet absorbent being added to any of the resin layers. The other configurations are the same as those of the decorative sheet 1 of Example 1-1.

<Evaluations>

For the decorative sheets 1 of Examples 1-1 to 1-11 and Comparative Examples 1-1 to 1-6 obtained by the above processes, a carbon arc weatherability test in compliance with JIS B 7753 was performed by using a weatherability test machine (Sunshine weather meter; manufactured by Suga Test Instruments Co., Ltd.) to calculate the ultraviolet absorbance. The test condition was designed to determine the temporal changes after 4000 hours weatherability test. For the ultraviolet absorbance, the ultraviolet absorption ratio of the transparent layer made up of the top coat layer 5 and the transparent resin layer 4 of the decorative sheet 1 at 340 nm to 500 nm was determined. The difference between the ultraviolet absorption ratios (340 nm/500 nm) before and after the weatherability test was calculated. For the haze value, the value after the weatherability test was determined. For the color difference (ΔE), the color difference (ΔE) of the decorative sheet 1 before and after the weatherability test was calculated. In addition, the change in appearance of the decorative sheet 1 after the weatherability test was visually observed, and the result was indicated by the symbols as below. Table 1 shows the evaluation results for Examples 1-1 to 1-5 and Comparative Examples 1-1 and 1-2, Table 2 shows the evaluation results for Examples 1-6 to 1-10 and Comparative Examples 1-3 and 1-4, and Table 3 shows the evaluation results for Example 1-11 and Comparative Examples 1-5 and 1-6.

<Symbols for Appearance Change>
◎: No change observed
○: Slight change observed
Δ: Slight whitening or cracking observed
x: Severe whitening or cracking observed

TABLE 1

| | Ultraviolet absorbent added to the top coat layer | | | | | | |
|---|---|---|---|---|---|---|---|
| | Organic ultraviolet absorbent | | Inorganic ultraviolet absorbent | | Test time: 4000 hours | | |
| | Additive amount [parts by weight] | Vesicle formation | Additive amount [parts by weight] | Vesicle formation | ultraviolet absorbance | Haze value [%] | Color difference (ΔE) | Appearance change |
| Example 1-1 | 0.5 | Yes | 0.5 | Yes | 0.22 | 6.30 | 0.89 | ○ |
| Example 1-2 | 1.0 | Yes | 1.0 | Yes | 0.17 | 7.12 | 0.82 | ◎ |
| Example 1-3 | 5.0 | Yes | 5.0 | Yes | 0.12 | 7.53 | 0.57 | ○ |
| Example 1-4 | 10.0 | Yes | 10.0 | Yes | 0.08 | 8.03 | 0.48 | ○ |
| Example 1-5 | 20.0 | Yes | 20.0 | Yes | 0.03 | 8.56 | 0.30 | ◎ |
| Comparative Example 1-1 | 0.5 | No | 0.5 | No | 1.54 | 17.20 | 7.43 | Δ |
| Comparative Example 1-2 | 50.0 | No | 50.0 | No | 0.01 | 21.79 | 3.23 | X |

TABLE 2

Ultraviolet absorbent added to the transparent resin layer

| | Organic ultraviolet absorbent | | Inorganic ultraviolet absorbent | | Test time: 4000 hours | | | |
|---|---|---|---|---|---|---|---|---|
| | Additive amount [parts by weight] | Vesicle formation | Additive amount [parts by weight] | Vesicle formation | ultraviolet absorbance | Haze value [%] | Color difference (ΔE) | Appearance change |
| Example 1-6 | 0.1 | Yes | 0.1 | Yes | 0.06 | 6.50 | 0.79 | ○ |
| Example 1-7 | 0.5 | Yes | 0.5 | Yes | 0.04 | 9.50 | 0.63 | ○ |
| Example 1-8 | 1.0 | Yes | 1.0 | Yes | 0.03 | 9.85 | 0.57 | ◎ |
| Example 1-9 | 2.5 | Yes | 2.5 | Yes | 0.02 | 10.29 | 0.47 | ◎ |
| Example 1-10 | 5.0 | Yes | 5.0 | Yes | 0.01 | 11.23 | 0.33 | ◎ |
| Comparative Example 1-3 | 0.5 | No | 0.5 | No | 1.32 | 16.30 | 6.21 | Δ |
| Comparative Example 1-4 | 50.0 | No | 50.0 | No | 0.01 | 26.75 | 3.56 | X |

TABLE 3

Ultraviolet absorbent added (not added) to the top coat layer and the transparent resin layer

| | Layer to which ultraviolet absorbent added | Organic ultraviolet absorbent | | Inorganic ultraviolet absorbent | | Test time: 4000 hours | | | |
|---|---|---|---|---|---|---|---|---|---|
| | | Additive amount [parts by weight] | Vesicle formation | Additive amount [parts by weight] | Vesicle formation | ultraviolet absorbance | Haze value [%] | Color difference (ΔE) | Appearance change |
| Example 1-11 | Top coat layer | 1.25 | Yes | 1.25 | Yes | 0.09 | 7.22 | 0.25 | ◎ |
| | Transparent resin layer | 1.25 | Yes | 1.25 | Yes | | | | |
| Comparative Example 1-5 | Top coat layer | 0.50 | No | 0.50 | No | 1.61 | 24.60 | 7.68 | Δ |
| | Transparent resin layer | 0.50 | No | 0.50 | No | | | | |
| Comparative Example 1-6 | Top coat layer | — | — | — | — | 10.80 | 6.47 | 12.20 | X |
| | Transparent resin layer | — | — | — | — | | | | |

First, the case where the ultraviolet absorbent was added to the top coat layer 5 will be described. The evaluation results are shown in Table 1. For the decorative sheets 1 of Examples 1-1 to 1-5, in which 0.5 to 20.0 parts by weight of the organic ultraviolet absorbent vesicles and 0.5 to 20.0 parts by weight of the inorganic ultraviolet absorbent vesicles were added to the top coat layer 5, the value of ultraviolet absorbance for every additive amount was small, and the ultraviolet absorbance after the 4000 hours weatherability test remained substantially the same as that before the weatherability test. Further, the haze value after the test was small, and the value of color difference (ΔE) before and after the weatherability test was also small. As seen from these results, high transparency was retained and the color change was insignificant. The visual evaluation also showed good results. On the other hand, for the decorative sheet 1 of Comparative Example 1-1, in which 0.5 parts by weight of the organic ultraviolet absorbent having no vesicles and 0.5 parts by weight of the inorganic ultraviolet absorbent having no vesicles were added to the top coat layer 5, the value of ultraviolet absorbance was 1.54, the haze value was 17.20%, and the value of color difference (ΔE) was 7.43. These large values show that the ultraviolet absorbance decreased during the 4000 hours weatherability test, the transparent layer was deteriorated, and the transparency was reduced. In the visual evaluation, whitening and cracking were observed. These results indicate that use of the organic ultraviolet absorbent having no vesicles and inorganic ultraviolet absorbent having no vesicles induced poor dispersibility in the resin composition which was the main component and occurrence of secondary aggregation, resulting in failure in exhibiting sufficient ultraviolet absorbance. Further, for the decorative sheet of Comparative Example 1-2, in which 50.0 parts by weight of the organic ultraviolet absorbent having no vesicles and 50.0 parts by weight of the inorganic ultraviolet absorbent having no vesicles were added to the top coat layer 5, the value of ultraviolet absorbance was significantly small, at 0.01, while the haze value was significantly large, at 21.79% due to the large amount of the ultraviolet absorbent added. In the visual evaluation, severe whitening was observed. These results can be attributed to white turbidity which was caused by blocking due to the large amount of the organic and inorganic ultraviolet absorbents added.

Next, the case where the ultraviolet absorbent was added to the transparent resin layer 4 will be described. The evaluation results are shown in Table 2. For the decorative sheets 1 of Examples 1-6 to 1-10, in which 0.1 to 5.0 parts by weight of the organic ultraviolet absorbent vesicles and 0.1 to 5.0 parts by weight of the inorganic ultraviolet absorbent vesicles were added to the transparent resin layer 4, the value of ultraviolet absorbance for every additive amount was significantly small, and the ultraviolet absorbance after the 4000 hours weatherability test remained substantially the same as that before the weatherability test. Further, the haze value after the test was small, and the value of color difference (ΔE) before and after the weatherability test was also small. As seen from these results, high transparency was retained and the color change was insignificant. The visual evaluation also showed good results. On the other hand, for the decorative sheet 1 of Comparative Example 1-3, in which 0.5 parts by weight of the organic ultraviolet absorbent having no vesicles and 0.5 parts by weight of the inorganic ultraviolet absorbent having no vesicles were added to the transparent resin layer 4, the value of ultraviolet absorbance was 1.32, the haze value was 16.30%, and the value of color difference (ΔE) was 6.21. These large values show that the ultraviolet absorbance decreased during the 4000 hours weatherability test, the transparent layer was deteriorated, and the transparency was reduced. In the visual evaluation, whitening and cracking were observed. These results indicate that use of the organic ultraviolet absorbent having no vesicles and inorganic ultraviolet absorbent having no vesicles induced poor dispersibility in the resin composition which was the main component and occurrence of secondary aggregation, resulting in failure in exhibiting sufficient ultraviolet absorbance. Further, for the decorative sheet 1 of Comparative Example 1-4, in which 50.0 parts by weight of the organic ultraviolet absorbent having no vesicles and 50.0 parts by weight of the inorganic ultraviolet absorbent having no vesicles were added to the transparent resin layer 4, the value of ultraviolet absorbance was significantly small, at 0.01, while the haze value was significantly large, at 26.75% due to the large amount of the ultraviolet absorbent added. In the visual evaluation, severe whitening was observed. These results can be attributed to white turbidity which was caused by bleeding-out due to the large amount of the organic and inorganic ultraviolet absorbents added.

Next, the case where the ultraviolet absorbent was added to both the top coat layer 5 and the transparent resin layer 4 will be described. The evaluation results are shown in Table 3. For the decorative sheet 1 of Examples 1-11, in which 1.25 parts by weight of the organic ultraviolet absorbent vesicles and 1.25 parts by weight of the inorganic ultraviolet absorbent vesicles were added to the top coat layer 5 and the transparent resin layer 4, the value of ultraviolet absorbance was 0.09, the haze value was 7.22%, and the value of color difference (ΔE) was 0.25. These significantly small values show that high ultraviolet absorbance was retained after the 4000 hours weatherability test. Accordingly, it was found that the decorative sheet 1 had high transparency and thus higher designability. On the other hand, for the decorative sheet 1 of Comparative Example 1-5, in which 0.5 parts by weight of the organic ultraviolet absorbent having no vesicles and 0.5 parts by weight of the inorganic ultraviolet absorbent having no vesicles were added to the top coat layer 5 and the transparent resin layer 4, the value of ultraviolet absorbance, the haze value, and the value of color difference (ΔE) were all large values, which indicates that the ultraviolet absorbance and the designability are inferior to those of the decorative sheet 1 of Example 1-11. These results indicate that use of the ultraviolet absorbents having no vesicles induced poor dispersibility in the resin composition which was the main component and occurrence of secondary aggregation, resulting in failure in exhibiting sufficient ultraviolet absorbance.

Further, for the decorative sheet 1 of Comparative Example 1-6, in which no ultraviolet absorbent was added to any of the resin layers, the value of ultraviolet absorbance was 10.80, the haze value was 6.47%, and the value of color difference (ΔE) was 12.20. In the visual evaluation, severe whitening or cracking was observed after the weatherability test, which indicates that the weatherability is poor.

Further, the decorative sheets 1 of Example 1-3 and Example 1-11 will be described. In comparison of the decorative sheet 1 of Example 1-3 in which 5.0 parts by weight of the organic and inorganic ultraviolet absorbent vesicles are added to the top coat layer 5 and the decorative sheet 1 of Example 1-11 in which 1.25 parts by weight of the organic and inorganic ultraviolet absorbent vesicles are added to the top coat layer 5 and the transparent resin layer 4, all the evaluation results showed that the decorative sheet 1 of Example 1-11 was superior. It was found that a decorative sheet 1 having more favorable ultraviolet absorbance can be obtained by adding a small amount of ultraviolet absorbent vesicles to the top coat layer 5 and the transparent resin layer 4, rather than by adding a large amount of ultraviolet absorbent vesicles only to the top coat layer 5.

From the above evaluation results, as shown in the decorative sheets 1 of Examples 1-1 to 1-5, it was found that a decorative sheet 1 having weatherability and higher designability over a long period of time can be achieved by adding 0.5 to 20.0 parts by weight of the organic ultraviolet absorbent vesicles and the inorganic ultraviolet absorbent vesicles to the top coat layer 5.

Further, as shown in the decorative sheets 1 of Examples 1-6 to 1-10, it was found that the decorative sheet 1 having weatherability and higher designability over a long period of time can be achieved by adding 0.1 to 5.0 parts by weight of the organic ultraviolet absorbent vesicles and the inorganic ultraviolet absorbent vesicles to the transparent resin layer 4.

Furthermore, as shown in the decorative sheet 1 of Example 1-11, it was found that the decorative sheet 1 having high ultraviolet absorbance can be achieved by adding the organic ultraviolet absorbent vesicles and the inorganic ultraviolet absorbent vesicles to both the resin layers, the top coat layer 5 and the transparent resin layer 4, rather than by adding a large amount of ultraviolet absorbent to either the top coat layer 5 or the transparent resin layer 4.

REFERENCE EXAMPLES

Decorative sheets other than those described in the present embodiment will be briefly described as reference examples of the present invention.

In recent years, a number of decorative sheets in which olefin-based resin is used have been proposed as alternative decorative sheets to polyvinyl chloride decorative sheets. The soft polyolefin sheets made of olefin-based resin, which are typically used as decorative sheets, have a problem that highly crystalline and high isotacticity resins which are used to improve scratch resistance may cause poor weatherability.

As a solution to improve weatherability of polyolefin-based resin, PTL 1 discloses providing a top coat layer made of a resin containing triazine-based organic ultraviolet absorbent on the surface of the polyolefin sheet.

Adding the triazine ultraviolet absorbent, which is an organic ultraviolet absorbent, can maintain the transparency of the substrate resin, while temporal change cannot be avoided. Accordingly, there have been issues on the sustainability of ultraviolet absorbance over a long period of time.

Further, when zinc oxide, which is an inorganic ultraviolet absorbent, is added, a smaller temporal change occurs and good ultraviolet absorbance is performed over a long period of time. However, there is a problem that adding a large amount may decrease in transparency and reduce the designability of the decorative sheet.

In addition, there are other problems for both the organic and inorganic ultraviolet absorbents that increasing the additive amount to improve weatherability may cause aggregation of the ultraviolet absorbent in the resin and bleeding-out, leading to stickiness on the sheet surface and decrease in adhesiveness.

Further, when an embossed pattern is formed on the transparent resin layer to improve the designability of the decorative sheet, recessed portions of the embossed pattern have a reduced thickness compared to the remaining portion, which causes particularly reduced weatherability. As a result, there is a problem that deterioration starts from these recesses, and whitening and cracking may occur.

The present inventors have diligently studied and found that using the organic ultraviolet absorbent vesicles and the inorganic ultraviolet absorbent vesicles prepared by a supercritical reverse phase evaporation method can achieve good weatherability with an additive amount similar to the conventional one.

The supercritical reverse phase evaporation method refers to the method disclosed in the publications of JP-T-2002/032564, JP-A-2003-119120, JP-A-2005-298407, and JP-A-2008-063274 (hereinafter, collectively referred to as "supercritical reverse phase evaporation method publications") proposed by the present inventors, and the method and apparatus described in the supercritical reverse phase evaporation method publications have been used.

Second Embodiment

A decorative sheet of the present embodiment includes a top coat layer as an outermost layer and a transparent resin layer made of a transparent olefin-based resin as an underlayer of the top coat layer, wherein an organic ultraviolet absorbent and an inorganic ultraviolet absorbent are added to at least one of the top coat layer and the transparent resin layer.

In the decorative sheet of the present embodiment, it is particularly important that the organic ultraviolet absorbent and the inorganic ultraviolet absorbent are together encapsulated in each vesicle having a monolayer outer membrane and provided as organic-inorganic ultraviolet absorbent vesicles. These vesicles can exhibit significantly high dispersibility in the resin composition which is the main component of at least one of the top coat layer and the transparent resin layer. Accordingly, the decorative sheet which includes at least one of the top coat layer and the transparent resin layer having high ultraviolet absorbance can be provided.

When the organic ultraviolet absorbent and the inorganic ultraviolet absorbent are added to the top coat layer, it is preferred that the organic-inorganic ultraviolet absorbent vesicles to be added are prepared to contain the organic ultraviolet absorbent in the range of 0.5 to 20 parts by weight and the inorganic ultraviolet absorbent in the range of 0.5 to 20 parts by weight per 100 parts by weight of the resin composition which is the main component of the top coat layer. If the additive amount of these ultraviolet absorbents is less than 0.5 parts by weight, ultraviolet absorbance will be less effective. On the other hand, if the additive amount is more than 20 parts by weight, blocking will be more likely to occur. More preferably, the organic-inorganic ultraviolet absorbent vesicles are prepared to contain the organic ultraviolet absorbent in the range of 1 to 10 parts by weight and the inorganic ultraviolet absorbent in the range of 1 to 10 parts by weight per 100 parts by weight of the resin composition which is the main component of the top coat layer. Still more preferably, the organic-inorganic ultraviolet absorbent vesicles are prepared to contain the organic ultraviolet absorbent in the range of 3 to 5 parts by weight and the inorganic ultraviolet absorbent in the range of 3 to 5 parts by weight per 100 parts by weight of the resin composition which is the main component of the top coat layer.

When the organic ultraviolet absorbent and the inorganic ultraviolet absorbent are added to the transparent resin layer, it is preferred that the organic-inorganic ultraviolet absorbent vesicles to be added are prepared to contain the organic ultraviolet absorbent in the range of 0.1 to 5 parts by weight and the inorganic ultraviolet absorbent in the range of 0.1 to 5 parts by weight per 100 parts by weight of the resin composition which is the main component of the transparent resin layer. If the additive amount of these ultraviolet absorbents is less than 0.1 parts by weight, ultraviolet absorbance will be less effective. On the other hand, if the additive amount is more than 5 parts by weight, bleeding-out will be more likely to occur. More preferably, the organic-inorganic ultraviolet absorbent vesicles are prepared to contain the organic ultraviolet absorbent in the range of 0.2 to 3 parts by weight and the inorganic ultraviolet absorbent in the range of 0.2 to 3 parts by weight per 100 parts by weight of the resin composition which is the main component of the transparent resin layer.

Further, in the decorative sheet of the present embodiment, it is important that an embossed pattern is formed on the transparent resin layer and the recesses of the embossed pattern are filled with the top coat layer. More preferably, the recesses are filled with the top coat layer by wiping.

Further, it is important that an underlayer of the transparent resin layer is an ink layer made of ink to which at least a photostabilizer is added. As the photostabilizer, a hindered amine-based material is preferably used. Adding the photostabilizer to the ink layer can prevent radicals generated in the ink layer binder resin or generated by degradation of the resin in other layers from reducing the chemical components of the ink pigment to thereby prevent discoloration of the pigment.

The organic ultraviolet absorbent and the inorganic ultraviolet absorbent used in the present embodiment may be the same as those of the first embodiment, and the description thereof is omitted herein.

Further, the organic-inorganic ultraviolet absorbent vesicles used in the present embodiment are prepared by the same supercritical reverse phase evaporation method as that of the first embodiment. Accordingly, the description of the preparation method of the organic-inorganic ultraviolet absorbent vesicles is omitted herein.

Further, the phospholipid constituting the outer membrane of vesicles and other substances constituting the outer membrane of vesicles used in the present embodiment can be the same as those of the first embodiment, and the description thereof is omitted herein.

With reference to FIG. 1, a specific configuration of the decorative sheet of the present embodiment will be described.

(Overall Configuration)

FIG. 1 illustrates a specific configuration of the decorative sheet 1 of the present embodiment, and the decorative sheet 1 is composed of a plurality of resin layers. The decorative sheet 1 of the present embodiment includes a top coat layer 5, a transparent resin layer 4, an adhesive layer 7, an ink layer 3, a primary film layer 2, a concealing layer 8, and a primer layer 6, which are laminated in this order from the outermost surface of the decorative sheet 1. Further, in order to improve designability, an embossed pattern 4a is formed on the surface of the transparent resin layer 4 which faces the top coat layer 5. The recesses of the embossed pattern 4a are filled with part of the resin composition which constitutes the top coat layer 5 by wiping. The adhesive layer 7 is composed of, for example, a thermosensitive adhesive, an anchor coat, an adhesive for dry lamination, and the like. Moreover, the decorative sheet 1 is bonded to a substrate B to thereby form a decorative board. Examples of the substrate B include wooden boards, inorganic boards and metal plates.

That is, the configuration of the decorative sheet 1 of the present embodiment is the same as the configuration of the decorative sheet 1 of the aforementioned first embodiment. In addition, the resin compositions and the like which constitute the above layers may be substantially the same as those of the layers described in the first embodiment. Accordingly, the resin compositions and the like which are the same as the first embodiment will not be further described.

The top coat layer 5 is formed by adding the organic-inorganic ultraviolet absorbent vesicles to the resin composition that serves to protect the surface and adjust the gloss.

More preferably, in the decorative sheet 1 of the present invention, the organic-inorganic ultraviolet absorbent vesicles are added to the transparent resin layer 4. This enables the transparent resin layer 4 to have weatherability, which prevents the olefin-based resin composition which is the main component of the transparent resin layer 4 from being degraded and prevents a pattern printed on the ink layer 3, which is an underlayer of the resin layer 4, from being discolored due to UV exposure. Accordingly, higher designability can be maintained over a long period of time.

Further, in the decorative sheet 1 of the present embodiment, the primary film layer 2 is preferably in the range of 20 to 150 μm considering print workability, cost, and the like, the adhesive layer 7 is in the range of 1 to 20 μm, the transparent resin layer 4 is in the range of 20 to 200 μm, and the top coat layer 5 is in the range of 3 to 20 μm, and the total thickness of the decorative sheet 1 is preferably in the range of 45 to 400 μm.

Advantageous Effect of the Present Embodiment

According to the decorative sheet 1 of the present embodiment, the organic-inorganic ultraviolet absorbent vesicles are added to at least one of the top coat layer 5 and the transparent resin layer 4. Accordingly, high transparency can be maintained to ensure higher designability, and higher weatherability can be achieved over a long period of time.

Further, according to the decorative sheet 1 of the present embodiment, the organic-inorganic ultraviolet absorbent vesicles that encapsulate both the organic and inorganic ultraviolet absorbents together are used. Accordingly, they can exhibit significantly high dispersibility in the resin composition which is the main component, and express high ultraviolet absorbance without increase in the additive amount of the ultraviolet absorbent to thereby ensure higher weatherability. Moreover, the surface of the sheet does not become sticky since bleeding-out due to aggregation of an additive in the resin composition or white turbidity of the resin composition does not occur. Accordingly, the decorative sheet 1 having high adhesiveness and designability can be provided. Specifically, since the vesicles have a phospholipid outer membrane, particularly good miscibility with the resin composition which is the main component of the top coat layer 5 and the transparent resin layer 4 can be achieved.

Moreover, according to the decorative sheet 1 of the present embodiment, the recesses of the embossed pattern 4a are filled with the top coat layer 5. Accordingly, the recesses having a decreased layer thickness can also maintain higher weatherability.

Further, providing the ink layer 3 using ink to which a photostabilizer is added can prevent discoloration of the ink layer 3 due to UV exposure. Accordingly, the decorative sheet 1 having higher designability can be provided while maintaining a beautiful design print over a long period of time.

The more detailed effects of the present embodiment will be described below.

(1) The decorative sheet 1 of the present embodiment is characterized in that the decorative sheet 1 includes the top coat layer 5 as an outermost layer, and the transparent resin layer 4 as an underlayer of the top coat layer 5, wherein at least one of the top coat layer 5 and the transparent resin layer 4 contains an organic ultraviolet absorbent and an inorganic ultraviolet absorbent, and the organic ultraviolet absorbent and the inorganic ultraviolet absorbent contained are together encapsulated in each vesicle having a monolayer outer membrane and provided as organic-inorganic ultraviolet absorbent vesicles.

With this configuration, the organic ultraviolet absorbent having high transparency and the inorganic ultraviolet absorbent having higher weatherability are added to at least one of the top coat layer 5 and the transparent resin layer 4. Accordingly, a decorative sheet that enables higher designability and weatherability over a long period of time can be provided. Further, since the organic-inorganic ultraviolet absorbent vesicles that encapsulate both the organic and inorganic ultraviolet absorbents together are used, these vesicles can exhibit high dispersibility in the resin composition which is the main component of at least one of the top coat layer and the transparent resin layer. Accordingly, the decorative sheet having high ultraviolet absorbance can be provided.

(2) In the decorative sheet 1 of the present embodiment, the outer membrane of the vesicles may be made of phospholipid.

With this configuration, good miscibility with the resin composition which is the main component of the top coat layer 5 and the transparent resin layer 4 can be achieved. Accordingly, vesicles can exhibit high dispersibility in the resin composition which is the main component, and prevent occurrence of secondary aggregation.

(3) In the decorative sheet 1 of the present embodiment, the organic ultraviolet absorbent may be at least one selected from the group consisting of, for example, benzotriazole, triazine, benzophenone, benzoate, and cyanoacrylate-based absorbents.

With this configuration, a decorative sheet with high transparency and higher designability can be provided.

(4) In the decorative sheet 1 of the present embodiment, the inorganic ultraviolet absorbent may be zinc oxide.

With this configuration, a decorative sheet with high transparency and higher designability can be provided.

(5) In the decorative sheet 1 of the present embodiment, the embossed pattern 4a is formed on the surface of the transparent resin layer 4 which faces the top coat layer 5, and the recesses of the embossed pattern 4a may be filled with the top coat layer 5.

With this configuration, although the transparent resin layer 4 having the embossed pattern 4a has a reduced thickness at positions of the recesses of the embossed pattern 4a, the recesses are filled with the top coat layer 5 to which the organic-inorganic ultraviolet absorbent vesicles have been added. Accordingly, a decorative sheet in which the recesses of the embossed pattern 4a have no less weatherability than the remaining portion of the transparent resin layer 4 can be provided.

EXAMPLES

Specific examples of the decorative sheet 1 of the present embodiment will be described below.

<Preparation of Organic-Inorganic Ultraviolet Absorbent Vesicles>

A preparation method of organic-inorganic ultraviolet absorbent vesicles using a supercritical reverse phase evaporation method according to the present embodiment will be detailed below. In preparation of these vesicles, a supercritical reverse phase evaporation method was used.

Vesicles were prepared as follows: 100 parts by weight of hexane, 35 parts by weight of hydroxyphenyl triazine (TINUVIN 400; manufactured by BASF Corp.) containing triazine-based ultraviolet absorbent 2-[4-[(2-Hydroxy-3-dodecyloxypropyl)oxy]-2-hydroxyphenyl]-4,6-bis(2,4-dimethylphenyl)-1,3,5-triazine as the main component as an organic ultraviolet absorbent and 35 parts by weight of zinc oxide (the average grain size 20 nm) as an inorganic ultraviolet absorbent, and 5 parts by weight of a phosphatidylcholine as the phospholipid were placed in a high-pressure stainless steel vessel kept at 60° C., and sealed therein. Carbon dioxide was injected into the vessel so that the vessel pressure becomes 20 MPa at a supercritical state. 100 parts by weight of ethyl acetate was injected while vigorously stirring the vessel contents. After stirring for 15 minutes at constant temperature and the pressure, carbon dioxide was exhausted for returning to atmospheric pressure. Thus, the organic-inorganic ultraviolet absorbent vesicles having a monolayer outer membrane made of phospholipid were obtained.

Examples 2-1 to 2-5

In Examples 2-1 to 2-5, the decorative sheet 1 was provided by adding 1.07, 2.13, 10.66, 21.32, and 42.64 parts by weight of the organic-inorganic ultraviolet absorbent vesicles prepared by the method described above to the urethane-based resin composition which is the main component of the top coat layer 5. The added organic-inorganic ultraviolet absorbent vesicles were prepared to contain 0.5, 1.0, 5.0, 10.0, or 20.0 parts by weight of the organic ultraviolet absorbent and 0.5, 1.0, 5.0, 10.0, or 20.0 parts by weight of the inorganic ultraviolet absorbent.

Specifically, a resin prepared by adding 0.05 parts by weight of a hindered phenol-based antioxidant (IRGANOX 1010; manufactured by BASF Corp.) and 0.2 parts by weight of a hindered amine-based photostabilizer (CHIMASSORB 944; manufactured by BASF Corp.) to a highly crystalline homopolypropylene resin was melt-extruded by an extruder to thereby form a transparent highly crystalline polypropylene sheet having 80 μm thickness as the transparent resin layer 4. The highly crystalline polypropylene sheet thus obtained was subjected to corona treatment on both surfaces to achieve a sheet surface wet tension of 40 dyn/cm or more. Then, a pattern was printed on one of the surfaces of the primary film layer 2, which was a 70 μm thick polyethylene sheet (primary film layer 2) having concealing properties, by gravure printing using a two-part type urethane ink (V180; manufactured by Toyo Ink Co., Ltd.) to thereby provide the ink layer 3 of 3 μm thickness. Further, primer coating was applied on the other of the surfaces of the polyethylene sheet which was the primary film layer 2 to thereby provide the primer layer 6 of 1 μm thickness. After that, the transparent resin layer 4 was bonded to the surface of the ink layer 3 formed on the polyethylene sheet via a dry lamination adhesive (TAKELAC A540; manufactured by Mitsui Chemicals, Inc.) which is an adhesive layer 7 having a thickness of 3 μm. Thus, a laminate resin sheet of 157 μm thickness made up of the primary film layer 2, the ink layer 3, the adhesive layer 7, the primer layer 6 and the transparent resin layer 4 was obtained. The embossed pattern 4a was formed on the surface of the transparent resin layer 4 of the laminate resin sheet. Then, a two-part type urethane top coat (W184; manufactured by DIC Graphics Corp., applied amount 3 g/m2) to which the organic-inorganic ultraviolet absorbent vesicles combined as specified in Table 4 were added was applied on the surface of the transparent resin layer 4 to thereby form the top coat layer 5. Thus, the decorative sheets 1 of Examples 2-1 to 2-5 having a total thickness of 160 μm were obtained.

Examples 2-6 to 2-10

In Examples 2-6 to 2-10, the decorative sheet 1 was provided by adding 0.21, 1.07, 2.13, 5.33, and 10.66 parts by weight of the organic-inorganic ultraviolet absorbent vesicles prepared by the method described above to the crystalline homopolypropylene resin composition which is the main component of the transparent resin layer 4. The added organic-inorganic ultraviolet absorbent vesicles were prepared to contain 0.1, 0.5, 1.0, 2.5, or 5.0 parts by weight of the organic ultraviolet absorbent and 0.1, 0.5, 1.0, 2.5, or 5.0 parts by weight of the inorganic ultraviolet absorbent.

Specifically, a resin prepared by adding 0.05 parts by weight of a hindered phenol-based antioxidant (IRGANOX 1010; manufactured by BASF Corp.), 0.2 parts by weight of a hindered amine-based photostabilizer (CHIMASSORB 944; manufactured by BASF Corp.), and the organic-inorganic ultraviolet absorbent vesicles combined as specified in Table 5 to a highly crystalline homopolypropylene resin was melt-extruded by an extruder to thereby form a transparent highly crystalline polypropylene sheet having 80 μm thickness as the transparent resin layer 4. The highly crystalline polypropylene sheet thus obtained was subjected to corona treatment on both surfaces to achieve a sheet surface wet tension of 40 dyn/cm or more. Then, a pattern was printed on one of the surfaces of the primary film layer 2, which was a 70 μm thick polyethylene sheet having concealing properties, by gravure printing using a two-part type urethane ink (V180; manufactured by Toyo Ink Co., Ltd.) to thereby provide the ink layer 3 of 3 μm thickness. Further, primer coating was applied on the other of the surfaces of the polyethylene sheet which was the primary film layer 2 to thereby provide the primer layer 6 of 1 μm thickness. After that, the transparent resin layer 4 was bonded to the surface of the ink layer 3 formed on the polyethylene sheet via a dry lamination adhesive (TAKELAC A540; manufactured by Mitsui Chemicals, Inc.) which is an adhesive layer 7 having a thickness of 3 μm. Thus, a laminate resin sheet of 157 μm thickness made up of the primary film layer 2, the ink layer 3, the adhesive layer 7, the primer layer 6 and the transparent resin layer 4 was obtained. The embossed pattern 4a was formed on the surface of the transparent resin layer 4 of the laminate resin sheet. Then, a two-part type urethane top coat (W184; manufactured by DIC Graphics Corp., applied amount 3 g/m2) was applied on the surface of the transparent resin layer 4 to thereby form the top coat layer 5. Thus, the decorative sheets 1 of Examples 2-6 to 2-10 having a total thickness of 160 μm were obtained.

Example 2-11

In Example 2-11, the decorative sheet 1 was provided by adding 2.67 parts by weight of the organic-inorganic ultraviolet absorbent vesicles prepared by the method described above to the urethane-based resin composition which is the main component of the top coat layer 5, and adding 2.67 parts by weight of the organic-inorganic ultraviolet absorbent vesicles prepared by the method described above to the crystalline homopolypropylene resin composition which is the main component of the transparent resin layer 4. The organic-inorganic ultraviolet absorbent vesicles added to the top coat layer 5 were prepared to contain 1.25 parts by weight of the organic ultraviolet absorbent and 1.25 parts by weight of the inorganic ultraviolet absorbent. Further, the organic-inorganic ultraviolet absorbent vesicles added to the transparent resin layer 4 were prepared to contain 1.25 parts by weight of the organic ultraviolet absorbent and 1.25 parts by weight of the inorganic ultraviolet absorbent.

Specifically, a resin prepared by adding 0.05 parts by weight of a hindered phenol-based antioxidant (IRGANOX 1010; manufactured by BASF Corp.), 0.2 parts by weight of a hindered amine-based photostabilizer (CHIMASSORB 944; manufactured by BASF Corp.), and 2.67 parts by weight of the organic-inorganic ultraviolet absorbent vesicles to a highly crystalline homopolypropylene resin was melt-extruded by an extruder to thereby form a transparent highly crystalline polypropylene sheet having 80 μm thickness as the transparent resin layer 4. The highly crystalline polypropylene sheet thus obtained was subjected to corona treatment on both surfaces to achieve a sheet surface wet tension of 40 dyn/cm or more. Then, a pattern was printed on one of the surfaces of the primary film layer 2, which was a 70 μm thick polyethylene sheet having concealing properties, by gravure printing using a two-part type urethane ink (V180; manufactured by Toyo Ink Co., Ltd.) to thereby provide the ink layer 3 of 3 μm thickness. Further, primer coating was applied on the other of the surfaces of the polyethylene sheet which was the primary film layer 2 to thereby provide the primer layer 6 of 1 μm thickness. After that, the transparent resin layer 4 was bonded to the surface of the ink layer 3 formed on the polyethylene sheet via a dry lamination adhesive (TAKELAC A540; manufactured by Mitsui Chemicals, Inc.) which is an adhesive layer 7 having a thickness of 3 μm. Thus, a laminate resin sheet of 157 μm thickness made up of the primary film layer 2, the ink layer 3, the adhesive layer 7, the primer layer 6 and the transparent resin layer 4 was obtained. The embossed pattern 4a was formed on the surface of the transparent resin layer 4 of the laminate resin sheet. Then, a two-part type urethane top coat (W184; manufactured by DIC Graphics Corp., applied amount 3 g/m2) to which 2.67 parts by weight of the organic-inorganic ultraviolet absorbent vesicles were added was applied on the surface of the transparent resin layer 4 to thereby form the top coat layer 5. Thus, the decorative sheet 1 of Example 2-11 having a total thickness of 160 μm was obtained.

Comparative Examples 2-1 and 2-2

In Comparative Examples 2-1 and 2-2, the decorative sheet 1 was provided by adding 0.5 or 50.0 parts by weight of the organic ultraviolet absorbent having no vesicles, respectively, and 0.5 or 50.0 parts by weight of the inorganic ultraviolet absorbent having no vesicles, respectively, to urethane-based resin composition which is the main component of the top coat layer 5. The other configurations are the same as those of the decorative sheets 1 of Examples 2-1 to 2-5.

Comparative Examples 2-3 and 2-4

In Comparative Examples 2-3 and 2-4, the decorative sheet 1 was provided by adding 0.5 or 50.0 parts by weight of the organic ultraviolet absorbent having no vesicles and 0.5 or 50.0 parts by weight of the inorganic ultraviolet absorbent having no vesicles to crystalline homopolypropylene resin composition which is the main component of the transparent resin layer 4. The other configurations are the same as those of the decorative sheets 1 of Examples 2-6 to 2-10.

Comparative Example 2-5

In Comparative Example 2-5, the decorative sheet 1 was provided by adding 0.5 parts by weight of the organic ultraviolet absorbent having no vesicles and 0.5 parts by weight of the inorganic ultraviolet absorbent having no vesicles to the urethane-based resin composition which is the main component of the top coat layer 5, and adding 0.5 parts by weight of the organic ultraviolet absorbent having no vesicles and 0.5 parts by weight of the inorganic ultraviolet absorbent having no vesicles to the crystalline homopolypropylene resin composition which is the main component of the transparent resin layer 4. The other configurations are the same as those of the decorative sheet 1 of Example 2-11.

Comparative Example 2-6

In Comparative Example 2-6, the decorative sheet 1 was provided without an ultraviolet absorbent being added to any of the resin layers. The other configurations are the same as those of the decorative sheet 1 of Example 2-1.

<Evaluations>

For the decorative sheets 1 of Examples 2-1 to 2-11 and Comparative Examples 2-1 to 2-6 obtained by the above processes, the ultraviolet absorbance, haze value, color difference (ΔE), and the change in appearance after the weatherability test were evaluated similar to the first embodiment. Table 4 shows the evaluation results for Examples 2-1 to 2-5 and Comparative Examples 2-1 and 2-2, Table 5 shows the evaluation results for Examples 2-6 to 2-10 and Comparative Examples 2-3 and 2-4, and Table 6 shows the evaluation results for Example 2-11 and Comparative Examples 2-5 and 2-6. The symbols for appearance change represent the same meaning as those of the first embodiment.

TABLE 4

Ultraviolet absorbent added to the top coat layer

| | Additive amount of | Ultraviolet absorbent content | | | Test time: 4000 hours | | | |
|---|---|---|---|---|---|---|---|---|
| | vesicles [parts by weight] | Organic [parts by weight] | Inorganic [parts by weight] | Vesicle formation | ultraviolet absorbance | Haze value [%] | Color difference (ΔE) | Appearance change |
| Example 2-1 | 1.07 | 0.5 | 0.5 | Yes | 0.20 | 5.75 | 0.87 | ○ |
| Example 2-2 | 2.13 | 1.0 | 1.0 | Yes | 0.16 | 5.81 | 0.81 | ◎ |
| Example 2-3 | 10.66 | 5.0 | 5.0 | Yes | 0.08 | 6.11 | 0.47 | ○ |
| Example 2-4 | 21.32 | 10.0 | 10.0 | Yes | 0.05 | 6.25 | 0.27 | ○ |
| Example 2-5 | 42.64 | 20.0 | 20.0 | Yes | 0.02 | 6.42 | 0.17 | ◎ |
| Comparative Example 2-1 | — | 0.5 | 0.5 | No | 1.54 | 17.20 | 7.43 | Δ |
| Comparative Example 2-2 | — | 50.0 | 50.0 | No | 0.01 | 21.79 | 3.23 | X |

TABLE 5

Ultraviolet absorbent added to the transparent resin layer

| | Additive amount of | Ultraviolet absorbent content | | | Test time: 4000 hours | | | |
|---|---|---|---|---|---|---|---|---|
| | vesicles [parts by weight] | Organic [parts by weight] | Inorganic [parts by weight] | Vesicle formation | ultraviolet absorbance | Haze value [%] | Color difference (ΔE) | Appearance change |
| Example 2-6 | 0.21 | 0.1 | 0.1 | Yes | 0.06 | 5.18 | 0.75 | ○ |
| Example 2-7 | 1.07 | 0.5 | 0.5 | Yes | 0.04 | 5.95 | 0.59 | ○ |
| Example 2-8 | 2.13 | 1.0 | 1.0 | Yes | 0.03 | 6.08 | 0.55 | ◎ |
| Example 2-9 | 5.33 | 2.5 | 2.5 | Yes | 0.02 | 6.26 | 0.41 | ◎ |
| Example 2-10 | 10.66 | 5.0 | 5.0 | Yes | 0.01 | 6.50 | 0.29 | ◎ |
| Comparative Example 2-3 | — | 0.5 | 0.5 | No | 1.32 | 16.30 | 6.21 | Δ |
| Comparative Example 2-4 | — | 50.0 | 50.0 | No | 0.01 | 26.75 | 3.56 | X |

TABLE 6

Ultraviolet absorbent added (not added) to the top coat layer and the transparent resin layer

| | Layer to which ultraviolet absorbent added | Additive amount of vesicles [parts by weight] | Ultraviolet absorbent content | | | Test time: 4000 hours | | | |
|---|---|---|---|---|---|---|---|---|---|
| | | | Organic [parts by weight] | Inorganic [parts by weight] | Vesicle formation | ultraviolet absorbance | Haze value [%] | Color difference (ΔE) | Appearance change |
| Example 2-11 | Top coat layer | 2.67 | 1.25 | 1.25 | Yes | 0.07 | 5.88 | 0.37 | ◎ |
| | Transparent resin layer | 2.67 | 1.25 | 1.25 | Yes | | | | |
| Comparative Example 2-5 | Top coat layer | — | 0.50 | 0.50 | No | 1.61 | 24.60 | 7.68 | Δ |
| | Transparent resin layer | — | 0.50 | 0.50 | No | | | | |
| Comparative Example 2-6 | Top coat layer | — | — | — | | 10.80 | 6.47 | 12.20 | X |
| | Transparent resin layer | — | — | — | | | | | |

First, the case where the ultraviolet absorbent was added to the top coat layer 5 will be described. The evaluation results are shown in Table 4. For the decorative sheets 1 of Examples 2-1 to 2-5, in which 1.07 to 42.64 parts by weight of the organic-inorganic ultraviolet absorbent vesicles were added to the top coat layer 5, the value of ultraviolet absorbance for every additive amount was small, and the ultraviolet absorbance after the 4000 hours weatherability test remained substantially the same as that before the weatherability test. Further, the haze value after the test was small, and the value of color difference (ΔE) before and after the weatherability test was also small. As seen from these results, high transparency was retained and the color change was insignificant. The visual evaluation also showed good results. On the other hand, for the decorative sheet 1 of Comparative Example 2-1, in which 0.5 parts by weight of the organic ultraviolet absorbent having no vesicles and 0.5 parts by weight of the inorganic ultraviolet absorbent having no vesicles were added to the top coat layer 5, the value of ultraviolet absorbance was 1.54, the haze value was 17.20%, and the value of color difference (ΔE) was 7.43. These large values show that the ultraviolet absorbance decreased during the 4000 hours weatherability test, the transparent layer was deteriorated, and the transparency was reduced. In the visual evaluation, whitening and cracking were observed. These results indicate that use of the organic ultraviolet absorbent having no vesicles and inorganic ultraviolet absorbent having no vesicles induced poor dispersibility in the resin composition which was the main component and occurrence of secondary aggregation, resulting in failure in exhibiting sufficient ultraviolet absorbance. Further, for the decorative sheet 1 of Comparative Example 2-2, in which 50.0 parts by weight of the organic ultraviolet absorbent having no vesicles and 50.0 parts by weight of the inorganic ultraviolet absorbent having no vesicles were added to the top coat layer 5, the value of ultraviolet absorbance was significantly small, at 0.01, while the haze value was significantly large, at 21.79% due to the large amount of the ultraviolet absorbent added. In the visual evaluation, severe whitening was observed. These results can be attributed to white turbidity which was caused by blocking due to the large amount of the organic and inorganic ultraviolet absorbents added.

Next, the case where the ultraviolet absorbent was added to the transparent resin layer 4 will be described. The evaluation results are shown in Table 5. For the decorative sheets 1 of Examples 2-6 to 2-10, in which 0.21 to 10.66 parts by weight of the organic-inorganic ultraviolet absorbent vesicles were added to the transparent resin layer 4, the value of ultraviolet absorbance for every additive amount was significantly small, and the ultraviolet absorbance after the 4000 hours weatherability test remained substantially the same as that before the weatherability test. Further, the haze value after the test was small, and the value of color difference (ΔE) before and after the weatherability test was also small. As seen from these results, high transparency was retained and the color change was insignificant. The visual evaluation also showed good results. On the other hand, for the decorative sheet 1 of Comparative Example 2-3, in which 0.5 parts by weight of the organic ultraviolet absorbent having no vesicles and 0.5 parts by weight of the inorganic ultraviolet absorbent having no vesicles were added to the transparent resin layer 4, the value of ultraviolet absorbance was 1.32, the haze value was 16.30%, and the value of color difference (ΔE) was 6.21. These large values show that the ultraviolet absorbance decreased during the 4000 hours weatherability test, the transparent layer was deteriorated, and the transparency was reduced. In the visual evaluation, whitening and cracking were observed. These results indicate that use of the organic ultraviolet absorbent having no vesicles and inorganic ultraviolet absorbent having no vesicles induced poor dispersibility in the resin composition which was the main component and occurrence of secondary aggregation, resulting in failure in exhibiting sufficient ultraviolet absorbance. Further, for the decorative sheet 1 of Comparative Example 2-4, in which 50.0 parts by weight of the organic ultraviolet absorbent having no vesicles and 50.0 parts by weight of the inorganic ultraviolet absorbent having no vesicles were added to the transparent resin layer 4, the value of ultraviolet absorbance was significantly small, at 0.01, while the haze value was significantly large, at 26.75% due to the large amount of the ultraviolet absorbent added. In the visual evaluation, severe whitening was observed. These results can be attributed to white turbidity which was caused by bleeding-out due to the large amount of the organic and inorganic ultraviolet absorbents added.

Next, the case where the ultraviolet absorbent was added to both the top coat layer 5 and the transparent resin layer 4 will be described. The evaluation results are shown in Table 6. For the decorative sheet 1 of Example 2-11, in which 2.67 parts by weight of the organic-inorganic ultraviolet absorbent vesicles were added to the top coat layer 5 and the transparent resin layer 4, the value of ultraviolet absorbance was 0.07, the haze value was 5.88%, and the value of color difference (ΔE) was 0.37. These significantly small values show that high ultraviolet absorbance was retained after the 4000 hours weatherability test. Accordingly, it was found that the decorative sheet 1 had high transparency and thus higher designability. On the other hand, for the decorative sheet 1 of Comparative Example 2-5, in which 0.5 parts by weight of the organic ultraviolet absorbent having no vesicles and 0.5 parts by weight of the inorganic ultraviolet absorbent having no vesicles were added to the top coat layer 5 and the transparent resin layer 4, the value of ultraviolet absorbance, the haze value, and the value of color difference (ΔE) were all large values, which indicates that the ultraviolet absorbance and the designability are inferior to those of the decorative sheet 1 of Example 2-11. These results indicate that use of the ultraviolet absorbents having no vesicles induced poor dispersibility in the resin composition which was the main component and occurrence of secondary aggregation, resulting in failure in exhibiting sufficient ultraviolet absorbance.

Further, for the decorative sheet 1 of Comparative Example 2-6, in which no ultraviolet absorbent was added to any of the resin layers, the value of ultraviolet absorbance was 10.80, the haze value was 6.47%, and the value of color difference (ΔE) was 12.20. In the visual evaluation, severe whitening or cracking was observed after the weatherability test, which indicates that the weatherability is poor.

Further, the decorative sheets 1 of Example 2-3 and Example 2-11 will be described. In comparison of the decorative sheet 1 of Example 2-3 in which 10.66 parts by weight of the organic-inorganic ultraviolet absorbent vesicles are added to the top coat layer 5 and the decorative sheet 1 of Example 2-11 in which 2.67 parts by weight of the organic-inorganic ultraviolet absorbent vesicles are added to the top coat layer 5 and the transparent resin layer 4, all the evaluation results showed that the decorative sheet 1 of Example 2-11 was superior. It was found that the decorative sheet 1 having more favorable ultraviolet absorbance can be obtained by adding a small amount of ultraviolet absorbent vesicles to the top coat layer 5 and the transparent resin layer 4, rather than by adding a large amount of ultraviolet absorbent vesicles only to the top coat layer 5.

From the above evaluation results, as shown in the decorative sheets 1 of Examples 2-1 to 2-5, it was found that the decorative sheet 1 having weatherability and higher designability over a long period of time can be achieved by adding 1.07 to 42.64 parts by weight of the organic-inorganic ultraviolet absorbent vesicles to the top coat layer 5. The organic-inorganic ultraviolet absorbent vesicles added to the top coat layer 5 were prepared to contain 0.5 to 20.0 parts by weight of the organic ultraviolet absorbent and 0.5 to 20.0 parts by weight of the inorganic ultraviolet absorbent.

Further, as shown in the decorative sheets 1 of Examples 2-6 to 2-10, it was found that the decorative sheet 1 having weatherability and higher designability over a long period of time can be achieved by adding 0.21 to 10.66 parts by weight of the organic-inorganic ultraviolet absorbent vesicles to the transparent resin layer 4. The organic-inorganic ultraviolet absorbent vesicles added to the transparent resin layer 4 were prepared to contain 0.1 to 5.0 parts by weight of the organic ultraviolet absorbent and 0.1 to 5.0 parts by weight of the inorganic ultraviolet absorbent.

Furthermore, as shown in the decorative sheet 1 of Example 2-11, it was found that the decorative sheet 1 having high ultraviolet absorbance can be achieved by adding the organic-inorganic ultraviolet absorbent vesicles to both the resin layers, the top coat layer 5 and the transparent resin layer 4, rather than by adding a large amount of ultraviolet absorbent to either the top coat layer 5 or the transparent resin layer 4.

Third Embodiment

A decorative sheet of the present embodiment includes a top coat layer as an outermost layer and a transparent resin layer made of a transparent olefin-based resin as an underlayer of the top coat layer, wherein one of the resin layers, the top coat layer or the transparent resin layer, contains an organic ultraviolet absorbent and an inorganic ultraviolet absorbent.

It is important that one of the organic ultraviolet absorbent and the inorganic ultraviolet absorbent is encapsulated in vesicles having a monolayer outer membrane and provided as organic ultraviolet absorbent vesicles or inorganic ultraviolet absorbent vesicles.

Further, the decorative sheet 1 of a first modified example of the present embodiment has the same configuration as that of the above embodiment, wherein the other of the resin layers, which is the one not selected in the above embodiment, contains an organic ultraviolet absorbent or an inorganic ultraviolet absorbent, and the organic ultraviolet absorbent or the inorganic ultraviolet absorbent is encapsulated in vesicles having a monolayer outer membrane and provided as organic ultraviolet absorbent vesicles or inorganic ultraviolet absorbent vesicles.

Further, the decorative sheet 1 of a second modified example of the present embodiment has the same configuration as that of the above embodiment, wherein the other of the resin layers, which is the one not selected in the above embodiment, contains an organic ultraviolet absorbent and an inorganic ultraviolet absorbent, and one of the organic ultraviolet absorbent and the inorganic ultraviolet absorbent is encapsulated in vesicles having a monolayer outer membrane and provided as organic ultraviolet absorbent vesicles or inorganic ultraviolet absorbent vesicles.

The organic ultraviolet absorbent vesicles and the inorganic ultraviolet absorbent vesicles of the present embodiment and the modified examples thereof have a configuration of small sac-like capsules having a layer structure closed in the form of a spherical shell in which the organic ultraviolet absorbent or the inorganic ultraviolet absorbent is encapsulated. The organic ultraviolet absorbent vesicles and the inorganic ultraviolet absorbent vesicles have significantly high dispersibility since their outer membranes have a repelling effect, which prevents particle aggregation.

As a consequence, in the resin compositions which constitute at least one of the top coat layer and the transparent resin layer of the decorative sheet of the present embodiment and the modified examples thereof, the organic and inorganic ultraviolet absorbents are highly homogeneously dispersed since the dispersibility of the organic ultraviolet absorbent vesicles or the inorganic ultraviolet absorbent vesicles al so prevents aggregation of the inorganic ultraviolet absorbent or the organic ultraviolet absorbent having no vesicles.

As a result of high dispersibility of the organic and inorganic ultraviolet absorbents in the resin compositions being achieved, white turbidity of the resin composition caused by aggregation of the organic and inorganic ultraviolet absorbents can be prevented, and at least one of the top coat layer and the transparent resin layer having high transparency can be achieved.

Moreover, bleeding-out such as bloom (powder bloom) or bleed (liquid bleed), which is caused by the organic and inorganic ultraviolet absorbents aggregated appearing on the surface of the resin composition, does not occur. As a result, content of the organic and inorganic ultraviolet absorbents in the resin composition does not decrease due to leakage of the organic and inorganic ultraviolet absorbents. Accordingly, at least one of the top coat layer and the transparent resin layer having higher weatherability over a long period of time can be achieved.

Further, one of the surfaces of the top coat layer which is the outermost surface of the decorative sheet and also the surface which directly touches the human skin or the like when in use does not undergo whitening due to bloom or stickiness due to bleed. Accordingly, ease of use can be maintained. Further, the other of the surfaces of the top coat layer which is the surface adhered to the other resin layer, and both surfaces of the transparent resin layer do not undergo bloom or bleed. Accordingly, high adhesiveness between the resin layers can be ensured over a long period of time.

Examples of the method for obtaining organic ultraviolet absorbent vesicles or inorganic ultraviolet absorbent vesicles of the present embodiment (vesicle formation method) include the Bangham method, extrusion, hydration, reverse phase evaporation, freeze-thaw, and supercritical reverse phase evaporation. These vesicle formation methods will be briefly described. In the Bangham method, chloroform or chloroform/methanol mixture solvent is placed in a vessel such as a flask, phospholipid is added thereto and dissolved. Then, the solvent is removed by using an evaporator to form a thin film made of lipid. After dispersion of an additive is added thereto, the mixture is hydrated and dispersed by using a vortex mixer to thereby obtain vesicles. The extrusion method is a method for obtaining vesicles by preparing a solution of thin film phospholipid, and passing the solution through a filter instead of using a mixer which is used in the Bangham method as external perturbation. The hydration method is a preparation method which is substantially the same as the Bangham method except that the mixture is dispersed by gently stirring without using a mixer for obtaining vesicles. The reverse phase evaporation method is a method for obtaining vesicles by dissolving phospholipid in diethylether or chloroform, adding a solution containing an additive to prepare a W/O emulsion, removing an organic solvent from the emulsion under reduced pressure, and adding water thereto. The freeze-thaw method uses cooling and heating as external perturbation. Vesicles are obtained by repeating the cooling and heating cycle.

In particular, as a method for obtaining ultraviolet absorbent vesicles having a monolayer outer membrane, the supercritical reverse phase evaporation method is used. The supercritical reverse phase evaporation method refers to the method disclosed in the publications of JP-T-2002/032564, JP-A-2003-119120, JP-A-2005-298407, and JP-A-2008-063274 (hereinafter, collectively referred to as "supercritical reverse phase evaporation method publications") proposed by the present inventors, and the method and apparatus described in the supercritical reverse phase evaporation method publications can be used.

Hereinafter, organic ultraviolet absorbent vesicles or inorganic ultraviolet absorbent vesicles having the outer membrane made of a substance containing biological lipid such as phospholipid are referred to as organic ultraviolet absorbent liposomes or inorganic ultraviolet absorbent liposomes.

The outer membrane of the liposomes may be made of a mixture of phospholipid and a dispersant. In the decorative sheet of the present embodiment, the ultraviolet absorbent vesicles are preferably ultraviolet absorbent liposomes having an outer membrane made of phospholipid. The outer membrane made of phospholipid ensures good miscibility with the resin material which is the main component of the top coat layer and the transparent resin layer.

In the present embodiment, the organic ultraviolet absorbent vesicles and the inorganic ultraviolet absorbent vesicles are preferably added to at least one of the top coat layer and the transparent resin layer in the following ratios.

The ratios of amounts to be added will be further described below. When the organic ultraviolet absorbent vesicles and the inorganic ultraviolet absorbent vesicles are added to the top coat layer, a preferred ratio of the additive amount of the organic ultraviolet absorbent vesicles is in the range of 0.5 to 20 parts by weight and a preferred ratio of the additive amount of the inorganic ultraviolet absorbent vesicles is in the range of 0.5 to 20 parts by weight per 100 parts by weight of the resin composition which is the main component of the top coat layer. If the ratios of these ultraviolet absorbents are less than 0.5 parts by weight, ultraviolet absorbance will be less effective. On the other hand, if the ratios are more than 20 parts by weight, blocking will be more likely to occur. More preferably, the ratio of the additive amount of the organic ultraviolet absorbent vesicles is in the range of 1 to 10 parts by weight and the ratio of the inorganic ultraviolet absorbent vesicles is in the range of 1 to 10 parts by weight. Still more preferably, the ratio of the additive amount of the organic ultraviolet absorbent vesicles is in the range of 3 to 5 parts by weight and the ratio of the additive amount of the inorganic ultraviolet absorbent vesicles is in the range of 3 to 5 parts by weight.

When the organic ultraviolet absorbent vesicles and the inorganic ultraviolet absorbent vesicles are added to the transparent resin layer, a preferred ratio of the additive amount of the organic ultraviolet absorbent vesicles is in the range of 0.1 to 5 parts by weight and a preferred ratio of the additive amount of the inorganic ultraviolet absorbent vesicles is in the range of 0.1 to 5 parts by weight per 100 parts by weight of the resin composition which is the main component of the transparent resin layer. If the ratios of these ultraviolet absorbents are less than 0.1 parts by weight, ultraviolet absorbance will be less effective. On the other hand, if the ratios are more than 5 parts by weight, bleeding-out will be more likely to occur. More preferably, the ratio of the additive amounts of the organic ultraviolet absorbent vesicles is in the range of 0.2 to 3 parts by weight and the ratio of the additive amounts of the inorganic ultraviolet absorbent vesicles is in the range of 0.2 to 3 parts by weight.

The ratios of the additive amounts of the organic ultraviolet absorbent and the inorganic ultraviolet absorbent to the resin composition which constitutes at least one of the top coat layer and transparent resin layer may be different from each other. For example, the additive amount of the organic ultraviolet absorbent can be decreased and the additive amount of the inorganic ultraviolet absorbent can be increased to maintain ultraviolet absorbance for a longer period of time. On the other hand, the additive amount of the organic ultraviolet absorbent can be increased and the additive amount of the inorganic ultraviolet absorbent can be decreased to improve transparency of the top coat layer and transparent resin layer and thus further improve designability.

When the organic and inorganic ultraviolet absorbents are added to one of the resin layers, the top coat layer or the transparent resin layer, at the above ratio and the organic ultraviolet absorbent vesicles or the inorganic ultraviolet absorbent vesicles are added to the other of the resin layers, a preferred ratio of the additive amount of the ultraviolet absorbent vesicles is in the range of 0.5 to 20 parts by weight per 100 parts by weight of the resin composition which is the main component of the top coat layer and in the range of 0.1 to 5 parts by weight per 100 parts by weight of the resin composition which is the main component of the transparent resin layer.

Further, it is important that an underlayer of the transparent resin layer is an ink layer which at least includes a photostabilizer. As the photostabilizer, a hindered amine-based material is preferably used. Providing the photostabilizer in the ink layer can prevent radicals generated by degradation of the binder resin itself which forms the ink layer or the resin of other layers from reducing the chemical components of the ink pigment to thereby prevent discoloration of the pigment. Accordingly, a vivid color pattern can be maintained over a long period of time.

The organic ultraviolet absorbent and the inorganic ultraviolet absorbent used in the present embodiment may be the same as those of the first embodiment, and the description thereof is omitted herein.

Further, the organic ultraviolet absorbent vesicles and the inorganic ultraviolet absorbent vesicles used in the present embodiment are prepared by the same supercritical reverse phase evaporation method as that of the first embodiment. Accordingly, the description of the preparation method of the organic ultraviolet absorbent vesicles and the inorganic ultraviolet absorbent vesicles is omitted herein.

Further, the phospholipid constituting the outer membrane of vesicles and other substances constituting the outer membrane of vesicles used in the present embodiment can be the same as those of the first embodiment, and the description thereof is omitted herein.

With reference to FIG. 1, a specific configuration of the decorative sheet of the present embodiment will be described.

The following (1) to (10) are specific examples of the aforementioned present embodiment and the modified examples thereof.

(1) The top coat layer contains both the organic and inorganic ultraviolet absorbents, and the organic ultraviolet absorbent is in the form of vesicles.

(2) The top coat layer contains both the organic and inorganic ultraviolet absorbents, and the inorganic ultraviolet absorbent is in the form of vesicles.

(3) The transparent resin layer contains both the organic and inorganic ultraviolet absorbents, and the organic ultraviolet absorbent is in the form of vesicles.

(4) The transparent resin layer contains both the organic and inorganic ultraviolet absorbents, and the inorganic ultraviolet absorbent is in the form of vesicles.

(5) Besides the configuration of (1) or (2), the transparent resin layer also contains organic ultraviolet absorbent vesicles.

(6) Besides the configuration of (1) or (2), the transparent resin layer also contains inorganic ultraviolet absorbent vesicles.

(7) Besides the configuration of (3) or (4), the top coat layer also contains organic ultraviolet absorbent vesicles.

(8) Besides the configuration of (3) or (4), the top coat layer also contains inorganic ultraviolet absorbent vesicles.

(9) Besides the configuration of (1) or (2), the configuration of (3) is also provided.

(10) Besides the configuration of (1) or (2), the configuration of (4) is also provided.

(Overall Configuration)

FIG. 1 illustrates a specific configuration of the decorative sheet 1 of the present embodiment, which is the configuration in combination of (1) and (3).

The decorative sheet 1 of the present embodiment is composed of a plurality of resin layers. The decorative sheet 1 of the present embodiment includes a top coat layer 5, a transparent resin layer 4, an adhesive layer 7, an ink layer 3, a primary film layer 2, a concealing layer 8, and a primer layer 6, which are laminated in this order from the outermost surface of the decorative sheet 1. Further, in order to improve designability, an embossed pattern 4a is formed on the surface of the transparent resin layer 4 which faces the top coat layer 5. The recesses of the embossed pattern 4a are filled with part of the resin composition which constitutes the top coat layer 5 by wiping. Specifically, in the decorative sheet 1 of the present embodiment, the top coat layer 5 and the transparent resin layer 4 are composed of the resin composition which contains the organic ultraviolet absorbent vesicles and the inorganic ultraviolet absorbent. The adhesive layer 7 is composed of, for example, a thermosensitive adhesive, an anchor coat, an adhesive for dry lamination, and the like. Moreover, the decorative sheet 1 is bonded to a substrate B to thereby form a decorative board.

That is, the configuration of the decorative sheet 1 of the present embodiment is the same as the configuration of the decorative sheet 1 of the aforementioned first embodiment. In addition, the resin compositions and the like which constitute the above layers may be substantially the same as those of the layers described in the first embodiment. Accordingly, the resin compositions and the like which are the same as the first embodiment will not be further described.

The top coat layer 5 is made of the resin composition that serves to protect the surface and adjust the gloss, and the composition contains the organic ultraviolet absorbent vesicles and the inorganic ultraviolet absorbent.

Further, in the transparent resin layer 4 of the decorative sheet 1 of the present embodiment, the resin component contains the organic ultraviolet absorbent vesicles and the inorganic ultraviolet absorbent to impart further ultraviolet absorbance. Since the resin component contains the organic ultraviolet absorbent vesicles and the inorganic ultraviolet absorbent, the olefin-based resin material which is the main component of the transparent resin layer 4 is prevented from being degraded, and a pattern printed on the ink layer 3, which is an underlayer of the resin layer 4, is prevented from being discolored due to UV exposure. Accordingly, higher designability can be maintained over a long period of time.

In the decorative sheet 1 of the present embodiment, the primary film layer 2 is preferably in the range of 20 to 150 µm considering print workability, cost, and the like, the ink layer 3 is in the range of 5 to 20 µm, the adhesive layer 7 is in the range of 1 to 20 µm, the transparent resin layer 4 is in the range of 20 to 200 µm, and the top coat layer 5 is in the range of 3 to 20 µm, and the total thickness of the decorative sheet 1 is preferably in the range of 49 to 410 µm.

Advantageous Effect of the Present Embodiment

In the decorative sheet 1 of the present embodiment, the top coat layer 5 and the transparent resin layer 4 are composed of the resin composition which contains the organic ultraviolet absorbent vesicles and the inorganic ultraviolet absorbent. Accordingly, the decorative sheet 1 having high transparency and high ultraviolet absorbance can be achieved.

Specifically, since the organic ultraviolet absorbent is added in the form of vesicles, the dispersibility of the organic ultraviolet absorbent vesicles contributes to homogeneous dispersion of the inorganic ultraviolet absorbent as well as the organic ultraviolet absorbent while preventing aggregation in the resin composition which constitutes the top coat layer 5 and the transparent resin layer 4. Accordingly, light scattering due to aggregated ultraviolet absorbent is reduced to thereby achieve high transparency.

Moreover, bleeding-out such as bloom (powder bloom) or bleed (liquid bleed), which is caused by aggregated ultraviolet absorbents does not occur since both the organic and inorganic ultraviolet absorbents are homogeneously dispersed in the resin composition.

Further, providing the ink layer 3 to which a photostabilizer is added can prevent discoloration of the ink layer 3 due to UV exposure. Accordingly, the decorative sheet 1 having higher designability can be provided while maintaining a beautiful design print over a long period of time.

The more detailed effects of the present embodiment will be described below.

(1) The decorative sheet 1 of the present embodiment is characterized in that the decorative sheet 1 includes the top coat layer 5 as an outermost layer, and the transparent resin layer 4 as an underlayer of the top coat layer 5, wherein one of the resin layers, the top coat layer 5 or the transparent resin layer 4, contains an organic ultraviolet absorbent and an inorganic ultraviolet absorbent, and one of the organic ultraviolet absorbent and the inorganic ultraviolet absorbent is encapsulated in vesicles having a monolayer outer membrane and provided as organic ultraviolet absorbent vesicles or inorganic ultraviolet absorbent vesicles.

(2) In the decorative sheet 1 of the present embodiment, the other of the resin layers, which is the one not selected in the above embodiment, contains at least one of an organic ultraviolet absorbent and an inorganic ultraviolet absorbent, and one of the ultraviolet absorbent contained may be organic ultraviolet absorbent vesicles or inorganic ultraviolet absorbent vesicles encapsulated in vesicles having a monolayer outer membrane.

Thus, since one of the resin layers, the top coat layer 5 or the transparent resin layer 4, contains an organic ultraviolet absorbent and an inorganic ultraviolet absorbent, the decorative sheet having higher designability and higher weatherability over a long period of time can be provided.

Further, since one of the organic ultraviolet absorbent and the inorganic ultraviolet absorbent is contained in the form of vesicles, the organic ultraviolet absorbent and the inorganic ultraviolet absorbent are homogeneously dispersed without aggregation in the resin composition which constitutes the top coat layer 5 or the transparent resin layer 4.

Moreover, as a result of high dispersibility achieved, bleeding-out such as bloom (powder bloom) or bleed (liquid bleed), which is caused by the organic ultraviolet absorbent and the inorganic ultraviolet absorbent aggregated, does not occur. Accordingly, whitening or stickiness of the decorative sheet does not occur on the surface located on the outermost surface of the decorative sheet, and high adhesiveness to other resin layer can be achieved on the surface to be adhered to other resin layer.

Further, according to the decorative sheet 1 of the present embodiment, since the other of the resin layers contains at least one of the organic ultraviolet absorbent and the inorganic ultraviolet absorbent, and one of the ultraviolet absorbents contained is contained in the form of vesicles, the decorative sheet having further improved weatherability can be provided without occurrence of the above-mentioned bloom (powder bloom) or bleed (liquid bleed).

(3) In the decorative sheet 1 of the present embodiment, the outer membrane of the vesicles may be made of phospholipid.

With this configuration, good miscibility with the resin composition which is the main component of the top coat layer 5 and the transparent resin layer 4 can be achieved. Accordingly, vesicles can exhibit high dispersibility in the resin composition which is the main component, and prevent occurrence of secondary aggregation.

(4) In the decorative sheet 1 of the present embodiment, the organic ultraviolet absorbent may be at least one selected from the group consisting of, for example, benzotriazole, triazine, benzophenone, benzoate, and cyanoacrylate-based absorbents.

With this configuration, a decorative sheet with high transparency and higher designability can be provided.

(5) In the decorative sheet 1 of the present embodiment, the inorganic ultraviolet absorbent may be zinc oxide.

With this configuration, a decorative sheet with high functionality, having ultraviolet absorbance over a long period of time can be provided.

(6) In the decorative sheet 1 of the present embodiment, the embossed pattern 4a is formed on the surface of the transparent resin layer 4 which faces the top coat layer 5, and the recesses of the embossed pattern 4a may be filled with the top coat layer 5.

With this configuration, although the transparent resin layer 4 having the embossed pattern 4a has a reduced thickness at positions of the recesses of the embossed pattern 4a, the recesses are filled with the top coat layer 5 to which the organic ultraviolet absorbent vesicles or the inorganic ultraviolet absorbent vesicles have been added. Accordingly, the decorative sheet in which the recesses of the embossed pattern 4a have no less weatherability than the remaining portion of the transparent resin layer 4 can be provided.

EXAMPLES

Specific examples of the decorative sheet 1 of the present embodiment will be described below.

<Preparation of Organic Ultraviolet Absorbent Vesicles and Inorganic Ultraviolet Absorbent Vesicles>

A detailed preparation method of organic ultraviolet absorbent vesicles or inorganic ultraviolet absorbent vesicles used in Examples 3-1 to 3-15 below will be described. In preparation of these vesicles, a supercritical reverse phase evaporation method was used.

Vesicles were prepared as follows: 100 parts by weight of hexane, 70 parts by weight of hydroxyphenyl triazine (TINUVIN 400; manufactured by BASF Corp.) containing triazine-based ultraviolet absorbent 2-[4-[(2-Hydroxy-3-dodecyloxypropyl)oxy]-2-hydroxyphenyl]-4,6-bis(2,4-dimethylphenyl)-1,3,5-triazine as the main component as an organic ultraviolet absorbent or 70 parts by weight of zinc oxide (the average grain size 20 nm) as an inorganic ultraviolet absorbent, and 5 parts by weight of a phosphatidylcholine as the phospholipid were placed in a high-pressure stainless steel vessel kept at 60° C., and sealed therein. Carbon dioxide was injected into the vessel so that the vessel pressure becomes 20 MPa at a supercritical state. 100 parts by weight of ethyl acetate was injected while vigorously stirring the vessel contents. After stirring for 15 minutes at constant temperature and the pressure, carbon dioxide was exhausted for returning to atmospheric pressure. Thus, the organic ultraviolet absorbent vesicles or the inorganic ultraviolet absorbent vesicles having a monolayer outer membrane made of phospholipid were obtained.

Example 3-1

In Example 3-1, the decorative sheet 1 in the embodiment of the above (1) was analyzed. In Example 3-1, the decorative sheet 1 was provided by adding 0.5, 1.0, 5.0, 10.0, 20.0, and 50.0 parts by weight of the organic ultraviolet absorbent vesicles and 0.5, 1.0, 5.0, 10.0, 20.0, and 0.5 parts by weight of the inorganic ultraviolet absorbent per 100 parts by weight of the urethane resin composition which is the main component of the top coat layer 5.

Specifically, a resin prepared by adding 0.05 parts by weight of a hindered phenol-based antioxidant (IRGANOX 1010; manufactured by BASF Corp.) and 0.2 parts by weight of a hindered amine-based photostabilizer (CHIMASSORB 944; manufactured by BASF Corp.) to a highly crystalline homopolypropylene resin was melt-extruded by an extruder to thereby form a transparent highly crystalline polypropylene sheet having 80 μm thickness as the transparent resin layer 4. The highly crystalline polypropylene sheet thus obtained was subjected to corona treatment on both surfaces to achieve a sheet surface wet tension of 40 dyn/cm or more. Then, a pattern was printed on one of the surfaces of the primary film layer 2, which was a 70 μm thick polyethylene sheet having concealing properties, by gravure printing using a two-part type urethane ink (V180; manufactured by Toyo Ink Co., Ltd.) to thereby provide the ink layer 3 of 3 μm thickness. Further, primer coating was applied on the other of the surfaces of the polyethylene sheet which was the primary film layer 2 to thereby provide the primer layer 6 of 1 μm thickness. After that, the transparent resin layer 4 was bonded to the surface of the ink layer 3 formed on the polyethylene sheet via a dry lamination adhesive (TAKELAC A540; manufactured by Mitsui Chemicals, Inc.) which is an adhesive layer 7 having a thickness of 3 μm. Thus, a laminate resin sheet of 157 μm thickness made up of the primary film layer 2, the ink layer 3, the adhesive layer 7, the primer layer 6 and the transparent resin layer 4 was obtained. The embossed pattern 4a was formed on the surface of the transparent resin layer 4 of the laminate resin sheet. Then, a two-part type urethane top coat (W184; manufactured by DIC Graphics Corp., applied amount 3 g/m2) to which 0.5, 1.0, 5.0, 10.0, 20.0, and 50.0 parts by weight of the organic ultraviolet absorbent vesicles and 0.5, 1.0, 5.0, 10.0, 20.0, and 0.5 parts by weight of the inorganic ultraviolet absorbent were added was applied to thereby form the top coat layer 5. Thus, the decorative sheet 1 of Example 3-1 having a total thickness of 160 μm was obtained.

Example 3-2

In Example 3-2, the decorative sheet 1 in the embodiment of the above (2) was analyzed. In Example 3-2, the decorative sheet 1 was provided by adding 0.5, 1.0, 5.0, 10.0, and 20.0 parts by weight of the organic ultraviolet absorbent and 0.5, 1.0, 5.0, 10.0, and 20.0 parts by weight of the inorganic ultraviolet absorbent vesicles per 100 parts by weight of the urethane resin composition which is the main component of the top coat layer 5. The other configurations of the decorative sheet 1 were the same as those of Example 3-1.

Example 3-3

In Example 3-3, the decorative sheet 1 in the embodiment of the above (3) was analyzed. In Example 3-3, the decorative sheet 1 was provided by adding 0.1, 0.5, 1.0, 2.5, and 5.0 parts by weight of the organic ultraviolet absorbent vesicles and 0.1, 0.5, 1.0, 2.5, and 5.0 parts by weight of the inorganic ultraviolet absorbent per 100 parts by weight of the highly crystalline homopolypropylene resin composition which is the main component of the transparent resin layer 4.

Specifically, a resin prepared by adding 0.05 parts by weight of a hindered phenol-based antioxidant (IRGANOX 1010; manufactured by BASF Corp.), 0.2 parts by weight of a hindered amine-based photostabilizer (CHIMASSORB 944; manufactured by BASF Corp.) and 0.1, 0.5, 1.0, 2.5, and 5.0 parts by weight of the organic ultraviolet absorbent vesicles and 0.1, 0.5, 1.0, 2.5, and 5.0 parts by weight of the inorganic ultraviolet absorbent to a highly crystalline homopolypropylene resin was melt-extruded by an extruder to thereby form a transparent highly crystalline polypropylene sheet having 80 μm thickness as the transparent resin layer 4. The highly crystalline polypropylene sheet thus obtained was subjected to corona treatment on both surfaces to achieve a sheet surface wet tension of 40 dyn/cm or more. Then, a pattern was printed on one of the surfaces of the primary film layer 2, which was a 70 μm thick polyethylene sheet having concealing properties, by gravure printing using a two-part type urethane ink (V180; manufactured by Toyo Ink Co., Ltd.) to thereby provide the ink layer 3 of 3 μm thickness. Further, primer coating was applied on the other of the surfaces of the polyethylene sheet which was the primary film layer 2 to thereby provide the primer layer 6 of 1 μm thickness. After that, the transparent resin layer 4 was bonded to the surface of the ink layer 3 formed on the polyethylene sheet via a dry lamination adhesive (TAKELAC A540; manufactured by Mitsui Chemicals, Inc.) which is an adhesive layer 7 having a thickness of 3 μm. Thus, a laminate resin sheet of 157 μm thickness made up of the primary film layer 2, the ink layer 3, the adhesive layer 7, the primer layer 6 and the transparent resin layer 4 was obtained. The embossed pattern 4a was formed on the surface of the transparent resin layer 4 of the laminate resin sheet. Then, a two-part type urethane top coat (W184; manufactured by DIC Graphics Corp., applied amount 3 g/m2) was applied on the surface of the transparent resin layer 4 to thereby form the top coat layer 5. Thus, the decorative sheet 1 of Example 3-3 having a total thickness of 160 μm was obtained.

Example 3-4

In Example 3-4, the decorative sheet 1 in the embodiment of the above (4) was analyzed. In Example 3-4, the decorative sheet 1 was provided by adding 0.1, 0.5, 1.0, 2.5, 5.0, and 0.5 parts by weight of the organic ultraviolet absorbent and 0.1, 0.5, 1.0, 2.5, 5.0, and 20.0 parts by weight of the inorganic ultraviolet absorbent vesicles per 100 parts by weight of the highly crystalline homopolypropylene resin composition which is the main component of the transparent resin layer 4. The other configurations of the decorative sheet 1 were the same as those of Example 3-3.

Example 3-5

In Example 3-5, the decorative sheet 1 using the embodiment (2) in the embodiment of the above (5) was analyzed. In Example 3-5, the decorative sheet 1 was provided by adding 0.5 parts by weight of the organic ultraviolet absorbent and 0.5 parts by weight of the inorganic ultraviolet absorbent vesicles per 100 parts by weight of the urethane-based resin composition which is the main component of the top coat layer 5, and adding 0.5 parts by weight of the organic ultraviolet absorbent vesicles per 100 parts by weight of the highly crystalline homopolypropylene resin composition which is the main component of the transparent resin layer 4.

Specifically, a resin prepared by adding 0.05 parts by weight of a hindered phenol-based antioxidant (IRGANOX 1010; manufactured by BASF Corp.), 0.2 parts by weight of a hindered amine-based photostabilizer (CHIMASSORB 944; manufactured by BASF Corp.), and 0.5 parts by weight of the organic ultraviolet absorbent vesicles to a highly crystalline homopolypropylene resin was melt-extruded by an extruder to thereby form a transparent highly crystalline polypropylene sheet having 80 μm thickness as the transparent resin layer 4. Then, the highly crystalline polypropylene sheet thus obtained was subjected to corona treatment on both surfaces to achieve a sheet surface wet tension of 40 dyn/cm or more. Then, a pattern was printed on one of the surfaces of the primary film layer 2, which was a 70 μm thick polyethylene sheet having concealing properties, by gravure printing using a two-part type urethane ink (V180; manufactured by Toyo Ink Co., Ltd.) to thereby provide the ink layer 3 of 3 μm thickness. Further, primer coating was applied on the other of the surfaces of the polyethylene sheet which was the primary film layer 2 to thereby provide the primer layer 6 of 1 μm thickness. After that, the transparent resin layer 4 was bonded to the surface of the ink layer 3 formed on the polyethylene sheet via a dry lamination adhesive (TAKELAC A540; manufactured by Mitsui Chemicals, Inc.) which is an adhesive layer 7 having a thickness of 3 μm. Thus, a laminate resin sheet of 157 μm thickness made up of the primary film layer 2, the ink layer 3, the adhesive layer 7, the primer layer 6 and the transparent resin layer 4 was obtained. The embossed pattern 4a was formed on the surface of the transparent resin layer 4 of the laminate resin sheet. Then, a two-part type urethane top coat (W184; manufactured by DIC Graphics Corp., applied amount 3 g/m2) to which the organic ultraviolet absorbent were added in the ratio of 0.5 parts by weight and the inorganic ultraviolet absorbent vesicles were added in the ratio of 0.5 parts by weight was applied to thereby form the top coat layer 5. Thus, the decorative sheet 1 of Example 3-5 having a total thickness of 160 μm was obtained.

Example 3-6

In Example 3-6, the decorative sheet 1 using the embodiment (2) in the embodiment of the above (6) was analyzed. In Example 3-6, the decorative sheet 1 was provided by adding 0.5 parts by weight of the organic ultraviolet absorbent and 0.5 parts by weight of the inorganic ultraviolet absorbent vesicles per 100 parts by weight of the urethane-based resin composition which is the main component of the top coat layer 5, and adding 0.5 parts by weight of the inorganic ultraviolet absorbent vesicles per 100 parts by weight of the highly crystalline homopolypropylene resin composition which is the main component of the transparent resin layer 4. The other configurations of the decorative sheet 1 were the same as those of Example 3-5.

Example 3-7

In Example 3-7, the decorative sheet 1 using the embodiment (4) in the embodiment of the above (7) was analyzed. In Example 3-7, the decorative sheet 1 was provided by adding 0.5 parts by weight of the organic ultraviolet absorbent vesicles per 100 parts by weight of the urethane-based resin composition which is the main component of the top coat layer 5, and adding 0.5 parts by weight of the organic ultraviolet absorbent and 0.5 parts by weight of the inorganic ultraviolet absorbent vesicles per 100 parts by weight of the highly crystalline homopolypropylene resin composition which is the main component of the transparent resin layer 4.

Specifically, a resin prepared by adding 0.05 parts by weight of a hindered phenol-based antioxidant (IRGANOX 1010; manufactured by BASF Corp.), 0.2 parts by weight of a hindered amine-based photostabilizer (CHIMASSORB 944; manufactured by BASF Corp.) and 0.5 parts by weight of the organic ultraviolet absorbent and 0.5 parts by weight of the inorganic ultraviolet absorbent vesicles to a highly crystalline homopolypropylene resin was melt-extruded by an extruder to thereby form a transparent highly crystalline polypropylene sheet having 80 μm thickness as the transparent resin layer 4. The highly crystalline polypropylene sheet thus obtained was subjected to corona treatment on both surfaces to achieve a sheet surface wet tension of 40 dyn/cm or more. Then, a pattern was printed on one of the surfaces of the primary film layer 2, which was a 70 μm thick polyethylene sheet having concealing properties, by gravure printing using a two-part type urethane ink (V180; manufactured by Toyo Ink Co., Ltd.) to thereby provide the ink layer 3 of 3 μm thickness. Further, primer coating was applied on the other of the surfaces of the polyethylene sheet which was the primary film layer 2 to thereby provide the primer layer 6 of 1 μm thickness. After that, the transparent resin layer 4 was bonded to the surface of the ink layer 3 formed on the polyethylene sheet via a dry lamination adhesive (TAKELAC A540; manufactured by Mitsui Chemicals, Inc.) which is an adhesive layer 7 having a thickness of 3 μm. Thus, a laminate resin sheet of 157 μm thickness made up of the primary film layer 2, the ink layer 3, the adhesive layer 7, the primer layer 6 and the transparent resin layer 4 was obtained. The embossed pattern 4a was formed on the surface of the transparent resin layer 4 of the laminate resin sheet. Then, a two-part type urethane top coat (W184; manufactured by DIC Graphics Corp., applied amount 3 g/m2) to which 0.5 parts by weight of the organic ultraviolet absorbent vesicles were added was applied to thereby form the top coat layer 5. Thus, the decorative sheet 1 of Example 3-7 having a total thickness of 160 μm was obtained.

Example 3-8

In Example 3-8, the decorative sheet 1 using the embodiment (4) in the embodiment of the above (8) was analyzed. In Example 3-8, the decorative sheet 1 was provided by adding 0.5 parts by weight of the inorganic ultraviolet absorbent vesicles per 100 parts by weight of the urethane-based resin composition which is the main component of the top coat layer 5, and adding 0.5 parts by weight of the organic ultraviolet absorbent and 0.5 parts by weight of the inorganic ultraviolet absorbent vesicles per 100 parts by weight of the highly crystalline homopolypropylene resin composition which is the main component of the transparent resin layer 4. The other configurations of the decorative sheet 1 were the same as those of Example 3-7.

Example 3-9

In Example 3-9, the decorative sheet 1 using a combination of the embodiments (1) and (3) in the embodiment of the above (9) was analyzed. In Example 3-9, the decorative sheet 1 was provided by adding 0.5, 1.25, and 5.0 parts by weight of the organic ultraviolet absorbent vesicles and 0.5, 1.25, and 5.0 parts by weight of the inorganic ultraviolet absorbent vesicles per 100 parts by weight of the urethane-based resin composition which is the main component of the top coat layer 5, and adding 0.5, 1.25, and 5.0 parts by weight of the organic ultraviolet absorbent vesicles and 0.5, 1.25, and 5.0 parts by weight of the inorganic ultraviolet absorbent per 100 parts by weight of the highly crystalline homopolypropylene resin composition which is the main component of the transparent resin layer 4.

Specifically, a resin prepared by adding 0.05 parts by weight of a hindered phenol-based antioxidant (IRGANOX 1010; manufactured by BASF Corp.), 0.2 parts by weight of a hindered amine-based photostabilizer (CHIMASSORB 944; manufactured by BASF Corp.) and 0.5, 1.25, and 5.0 parts by weight of the organic ultraviolet absorbent vesicles and 0.5, 1.25, and 5.0 parts by weight of the inorganic ultraviolet absorbent to a highly crystalline homopolypropylene resin was melt-extruded by an extruder to thereby form a transparent highly crystalline polypropylene sheet having 80 μm thickness as the transparent resin layer 4. The highly crystalline polypropylene sheet thus obtained was subjected to corona treatment on both surfaces to achieve a sheet surface wet tension of 40 dyn/cm or more. Then, a pattern was printed on one of the surfaces of the primary film layer 2, which was a 70 μm thick polyethylene sheet having concealing properties, by gravure printing using a two-part type urethane ink (V180; manufactured by Toyo Ink Co., Ltd.) to thereby provide the ink layer 3 of 3 μm thickness. Further, primer coating was applied on the other of the surfaces of the polyethylene sheet which was the primary film layer 2 to thereby provide the primer layer 6 of 1 μm thickness. After that, the transparent resin layer 4 was bonded to the surface of the ink layer 3 formed on the polyethylene sheet via a dry lamination adhesive (TAKELAC A540; manufactured by Mitsui Chemicals, Inc.) which is an adhesive layer 7 having a thickness of 3 μm. Thus, a laminate resin sheet of 157 μm thickness made up of the primary film layer 2, the ink layer 3, the adhesive layer 7, the primer layer 6 and the transparent resin layer 4 was obtained. The embossed pattern 4a was formed on the surface of the transparent resin layer 4 of the laminate resin sheet. Then, a two-part type urethane top coat (W184; manufactured by DIC Graphics Corp., applied amount 3 g/m2) to which 0.5, 1.25, and 5.0 parts by weight of the organic ultraviolet absorbent vesicles and 0.5, 1.25, and 5.0 parts by weight of the inorganic ultraviolet absorbent were added was applied to thereby form the top coat layer 5. Thus, the decorative sheet 1 of Example 3-9 having a total thickness of 160 μm was obtained.

Example 3-10

In Example 3-10, the decorative sheet 1 using a combination of the embodiments (2) and (3) in the embodiment of the above (9) was analyzed. In Example 3-10, the decorative sheet 1 was provided by adding 0.5 parts by weight of the organic ultraviolet absorbent and 0.5 parts by weight of the inorganic ultraviolet absorbent vesicles per 100 parts by weight of the urethane-based resin composition which is the main component of the top coat layer 5, and adding 0.5 parts by weight of the organic ultraviolet absorbent vesicles and 0.5 parts by weight of the inorganic ultraviolet absorbent per 100 parts by weight of the highly crystalline homopolypropylene resin composition which is the main component of the transparent resin layer 4. The other configurations of the decorative sheet 1 were the same as those of Example 3-9.

Example 3-11

In Example 3-11, the decorative sheet 1 using a combination of the embodiments (1) and (4) in the embodiment of the above (10) was analyzed. In Example 3-11, the decorative sheet 1 was provided by adding 0.5 parts by weight of the organic ultraviolet absorbent vesicles and 0.5 parts by weight of the inorganic ultraviolet absorbent per 100 parts by weight of the urethane-based resin composition which is the main component of the top coat layer 5, and adding 0.5 parts by weight of the organic ultraviolet absorbent and 0.5 parts by weight of the inorganic ultraviolet absorbent vesicles per 100 parts by weight of the highly crystalline homopolypropylene resin composition which is the main component of the transparent resin layer 4. The other configurations of the decorative sheet 1 were the same as those of Example 3-9.

Example 3-12

In Example 3-12, the decorative sheet 1 using a combination of the embodiments (2) and (4) in the embodiment of the above (10) was analyzed. In Example 3-12, the decorative sheet 1 was provided by adding 0.5, 1.25, and 5.0 parts by weight of the organic ultraviolet absorbent and 0.5, 1.25, and 5.0 parts by weight of the inorganic ultraviolet absorbent vesicles per 100 parts by weight of the urethane-based resin composition which is the main component of the top coat layer 5, and adding 0.5, 1.25, and 5.0 parts by weight of the organic ultraviolet absorbent and 0.5, 1.25, and 5.0 parts by weight of the inorganic ultraviolet absorbent vesicles per 100 parts by weight of the highly crystalline homopolypropylene resin composition which is the main component of the transparent resin layer 4. The other configurations of the decorative sheet 1 were the same as those of Example 3-9.

Example 3-13

In Example 3-13, the decorative sheet 1 was provided by adding a hindered amine-based photostabilizer (CHIMASSORB 944; manufactured by BASF Corp.) to the ink layer 3 in the decorative sheet 1 of Examples 3-1 to 3-4, 3-9, and 3-12. The other configurations were the same as those of Examples 3-1 to 3-4, 3-9, and 3-12. In the decorative sheet 1, each additive amount of the organic and inorganic ultraviolet absorbents and the organic and inorganic ultraviolet absorbent vesicles was 0.5 parts by weight per 100 parts by weight of the respective resin composition.

Example 3-14

In Example 3-14, the decorative sheet 1 has a configuration in which the organic ultraviolet absorbent was added to the top coat layer 5, which is the other of the resin layers, besides the configuration of Example 3-4. In the specific configuration, the decorative sheet 1 was provided by adding 0.5 parts by weight of the organic ultraviolet absorbent per 100 parts by weight of the urethane resin composition which is the main component of the top coat layer 5, and adding 0.5 parts by weight of the organic ultraviolet absorbent and 0.5 parts by weight of the inorganic ultraviolet absorbent vesicles per 100 parts by weight of the highly crystalline homopolypropylene resin composition which is the main component of the transparent resin layer 4.

Example 3-15

In Example 3-15, the decorative sheet 1 has a configuration in which the organic ultraviolet absorbent vesicles and the inorganic ultraviolet absorbent vesicles were added to the transparent resin layer 4, which is the other of the resin layers, besides the configuration of Example 3-2. In the specific configuration, the decorative sheet 1 was provided by adding 0.5 parts by weight of the organic ultraviolet absorbent and 0.5 parts by weight of the inorganic ultraviolet absorbent vesicles per 100 parts by weight of the urethane resin composition which is the main component of the top coat layer 5, and adding 0.5 parts by weight of the organic ultraviolet absorbent vesicles and 0.5 parts by weight of the inorganic ultraviolet absorbent vesicles per 100 parts by weight of the highly crystalline homopolypropylene resin composition which is the main component of the transparent resin layer 4.

Comparative Example 3-1

In Comparative Example 3-1, the decorative sheet was provided by adding 0.5 and 5.0 parts by weight of the organic ultraviolet absorbent and 0.5 and 5.0 parts by weight of the inorganic ultraviolet absorbent per 100 parts by weight of the urethane resin composition which is the main component of the top coat layer 5. The other configurations of the decorative sheet were the same as those of Example 3-1.

Comparative Example 3-2

In Comparative Example 3-2, the decorative sheet was provided by adding 0.5 and 1.0 parts by weight of the organic ultraviolet absorbent and 0.5 and 1.0 parts by weight of the inorganic ultraviolet absorbent per 100 parts by weight of the highly crystalline homopolypropylene resin composition which is the main component of the transparent resin layer 4. The other configurations of the decorative sheet were the same as those of Example 3-3.

Comparative Example 3-3

In Comparative Example 3-3, the decorative sheet was provided by adding 0.5 parts by weight of the organic ultraviolet absorbent and 0.5 parts by weight of the inorganic ultraviolet absorbent per 100 parts by weight of the urethane resin composition which is the main component of the top coat layer 5, and adding 0.5 parts by weight of the organic ultraviolet absorbent and 0.5 parts by weight of the inorganic ultraviolet absorbent per 100 parts by weight of the highly crystalline homopolypropylene resin composition which is the main component of the transparent resin layer 4. The other configurations of the decorative sheet were the same as those of Example 3-9.

Comparative Example 3-4

In Comparative Example 3-4, the decorative sheet included the top coat layer 5 and the transparent resin layer 4 to which no ultraviolet absorbent was added.

<Evaluations>

For the decorative sheets 1 of Examples 3-1 to 3-15 and Comparative Examples 3-1 to 3-4 obtained by the above processes, the ultraviolet absorbance, haze value, color difference (ΔE), and the change in appearance after the weatherability test were evaluated similar to the first embodiment. Table 7 shows the observation results for Examples 3-1 to 3-4, Table 8 shows the evaluation results for Examples 3-5 to 3-12, Table 9 shows the evaluation results for Examples 3-13 to 3-15, and Table 10 shows the evaluation results for Comparative examples 3-1 to 3-4. The symbols for appearance change represent the same meaning as those of the first embodiment.

TABLE 7

| | | Processing method | | Ultraviolet absorbent | | Top coat layer + transparent resin | | DECORATIVE SHEET | |
| | Layer for addition | Organic | Inorganic | Organic [parts by weight] | Inorganic [parts by weight] | ultraviolet absorbance | Haze value | Color difference (ΔE) | Appearance change |
|---|---|---|---|---|---|---|---|---|---|
| Example 3-1 | Top coat | Vesicle formation | Unprocessed | 0.5 | 0.5 | 0.29 | 6.97 | 1.96 | ○ |
| | | | | 1.0 | 1.0 | 0.27 | 7.55 | 1.49 | ○ |
| | | | | 5.0 | 5.0 | 0.24 | 7.91 | 1.42 | ◎ |
| | | | | 10.0 | 10.0 | 0.23 | 8.39 | 1.38 | ◎ |
| | | | | 20.0 | 20.0 | 0.22 | 9.44 | 1.33 | ○ |
| | | | | 50.0 | 0.5 | 0.10 | 7.20 | 0.88 | ○ |
| Example 3-2 | Top coat | Unprocessed | Vesicle formation | 0.5 | 0.5 | 0.25 | 6.82 | 1.74 | ○ |
| | | | | 1.0 | 1.0 | 0.22 | 7.32 | 0.93 | ○ |
| | | | | 5.0 | 5.0 | 0.18 | 7.77 | 0.87 | ◎ |
| | | | | 10.0 | 10.0 | 0.16 | 8.08 | 0.69 | ◎ |
| | | | | 20.0 | 20.0 | 0.11 | 9.35 | 0.55 | ○ |
| Example 3-3 | Transparent resin | Vesicle formation | Unprocessed | 0.1 | 0.1 | 0.11 | 8.03 | 1.02 | ○ |
| | | | | 0.5 | 0.5 | 0.10 | 9.54 | 0.88 | ◎ |
| | | | | 1.0 | 1.0 | 0.08 | 9.98 | 0.83 | ◎ |
| | | | | 2.5 | 2.5 | 0.06 | 10.32 | 0.65 | ◎ |
| | | | | 5.0 | 5.0 | 0.05 | 11.23 | 0.54 | ○ |
| Example 3-4 | Transparent resin | Unprocessed | Vesicle formation | 0.1 | 0.1 | 0.08 | 7.50 | 0.88 | ○ |
| | | | | 0.5 | 0.5 | 0.07 | 9.13 | 0.71 | ◎ |
| | | | | 1.0 | 1.0 | 0.06 | 9.88 | 0.66 | ◎ |
| | | | | 2.5 | 2.5 | 0.05 | 10.09 | 0.61 | ◎ |
| | | | | 5.0 | 5.0 | 0.04 | 10.51 | 0.45 | ○ |
| | | | | 0.5 | 20.0 | 0.01 | 9.30 | 0.35 | ○ |

TABLE 8

| | | Processing method | | Ultraviolet absorbent | | Top coat layer + transparent resin | | DECORATIVE SHEET | |
| | Layer for addition | Organic | Inorganic | Organic [parts by weight] | Inorganic [parts by weight] | ultraviolet absorbance | Haze value | Color difference (ΔE) | Appearance change |
|---|---|---|---|---|---|---|---|---|---|
| Example 3-5 | Top coat | Unprocessed | Vesicle formation | 0.5 | 0.5 | 0.11 | 6.96 | 1.05 | ◎ |
| | Transparent resin | Vesicle formation | — | 0.5 | — | | | | |
| Example 3-6 | Top coat | Unprocessed | Vesicle formation | 0.5 | 0.5 | 0.20 | 8.80 | 0.48 | ◎ |
| | Transparent resin | — | Vesicle formation | — | 0.5 | | | | |
| Example 3-7 | Top coat | Vesicle formation | — | 0.5 | — | 0.06 | 9.10 | 0.65 | ◎ |
| | Transparent resin | Unprocessed | Vesicle formation | 0.5 | 0.5 | | | | |
| Example 3-8 | Top coat | — | Vesicle formation | — | 0.5 | 0.06 | 9.20 | 0.79 | ◎ |
| | Transparent resin | Unprocessed | Vesicle formation | 0.5 | 0.5 | | | | |
| Example 3-9 | Top coat | Vesicle formation | Unprocessed | 0.5 | 0.5 | 0.09 | 9.86 | 0.99 | ○ |
| | Transparent resin | Vesicle formation | Unprocessed | 0.5 | 0.5 | | | | |
| | Top coat | Vesicle formation | Unprocessed | 1.25 | 1.25 | 0.05 | 10.22 | 0.56 | ◎ |

TABLE 8-continued

| | | | | Ultraviolet absorbent | | Top coat layer + transparent resin | | DECORATIVE SHEET | |
|---|---|---|---|---|---|---|---|---|---|
| | Layer for addition | Processing method Organic | Processing method Inorganic | Organic [parts by weight] | Inorganic [parts by weight] | ultraviolet absorbance | Haze value | Color difference (ΔE) | Appearance change |
| | Transparent resin | Vesicle formation | Unprocessed | 1.25 | 1.25 | | | | |
| | Top coat | Vesicle formation | Unprocessed | 5.0 | 5.0 | 0.02 | 11.68 | 0.44 | ◎ |
| | Transparent resin | Vesicle formation | Unprocessed | 5.0 | 5.0 | | | | |
| Example 3-10 | Top coat | Unprocessed | Vesicle formation | 0.5 | 0.5 | 0.09 | 10.88 | 0.86 | ◎ |
| | Transparent resin | Vesicle formation | Unprocessed | 0.5 | 0.5 | | | | |
| Example 3-11 | Top coat | Vesicle formation | Unprocessed | 0.5 | 0.5 | 0.06 | 10.14 | 0.65 | ◎ |
| | Transparent resin | Unprocessed | Vesicle formation | 0.5 | 0.5 | | | | |
| Example 3-12 | Top coat | Unprocessed | Vesicle formation | 0.5 | 0.5 | 0.06 | 9.33 | 0.70 | ◎ |
| | Transparent resin | Unprocessed | Vesicle formation | 0.5 | 0.5 | | | | |
| | Top coat | Unprocessed | Vesicle formation | 1.25 | 1.25 | 0.03 | 9.79 | 0.42 | ◎ |
| | Transparent resin | Unprocessed | Vesicle formation | 1.25 | 1.25 | | | | |
| | Top coat | Unprocessed | Vesicle formation | 5.0 | 5.0 | 0.02 | 10.66 | 0.38 | ◎ |
| | Transparent resin | Unprocessed | Vesicle formation | 5.0 | 5.0 | | | | |

TABLE 9

| | | | | Ultraviolet absorbent | | Top coat layer + transparent resin | | DECORATIVE SHEET | |
|---|---|---|---|---|---|---|---|---|---|
| | Layer for addition | Processing method Organic | Processing method Inorganic | Organic [parts by weight] | Inorganic [parts by weight] | ultraviolet absorbance | Haze value | Color difference (ΔE) | Appearance change |
| Example 3-13 | Top coat | Vesicle formation | Unprocessed | 0.5 | 0.5 | 0.26 | 6.85 | 1.77 | ◎ |
| | Top coat | Unprocessed | Vesicle formation | 0.5 | 0.5 | 0.23 | 6.81 | 1.54 | ◎ |
| | Transparent resin | Vesicle formation | Unprocessed | 0.5 | 0.5 | 0.08 | 9.66 | 0.80 | ◎ |
| | Transparent resin | Unprocessed | Vesicle formation | 0.5 | 0.5 | 0.05 | 9.08 | 0.63 | ◎ |
| | Top coat | Vesicle formation | Unprocessed | 0.5 | 0.5 | 0.08 | 9.82 | 0.87 | ◎ |
| | Transparent resin | Vesicle formation | Unprocessed | 0.5 | 0.5 | | | | |
| | Top coat | Unprocessed | Vesicle formation | 0.5 | 0.5 | 0.05 | 9.30 | 0.69 | ◎ |
| | Transparent resin | Unprocessed | Vesicle formation | 0.5 | 0.5 | | | | |
| Example 3-14 | Top coat | Unprocessed | — | 0.5 | — | 0.06 | 9.30 | 0.68 | ◎ |
| | Transparent resin | Unprocessed | Vesicle formation | 0.5 | 0.5 | | | | |
| Example 3-15 | Top coat | Unprocessed | Vesicle formation | 0.5 | 0.5 | 0.04 | 9.56 | 0.56 | ◎ |
| | Transparent resin | Vesicle formation | Vesicle formation | 0.5 | 0.5 | | | | |

TABLE 10

| | Layer for addition | Processing method | | Ultraviolet absorbent | | Top coat layer + transparent resin | | DECORATIVE SHEET | |
| | | Organic | Inorganic | Organic [parts by weight] | Inorganic [parts by weight] | ultraviolet absorbance | Haze value | Color difference (ΔE) | Appearance change |
|---|---|---|---|---|---|---|---|---|---|
| Comparative Example 3-1 | Top coat | Unprocessed | Unprocessed | 0.5 | 0.5 | 1.54 | 17.20 | 7.43 | Δ |
| | Top coat | Unprocessed | Unprocessed | 5.0 | 5.0 | 0.88 | 19.54 | 5.66 | Δ |
| Comparative Example 3-2 | Transparent resin | Unprocessed | Unprocessed | 0.5 | 0.5 | 1.32 | 16.30 | 6.21 | Δ |
| | Transparent resin | Unprocessed | Unprocessed | 1.0 | 1.0 | 1.14 | 18.43 | 5.89 | Δ |
| Comparative Example 3-3 | Top coat Transparent resin | Unprocessed Unprocessed | Unprocessed Unprocessed | 0.5 0.5 | 0.5 0.5 | 1.61 | 24.60 | 7.68 | Δ |
| Comparative Example 3-4 | Top coat Transparent resin | — — | — — | 0.0 0.0 | 0.0 0.0 | 10.80 | 6.47 | 12.20 | X |

In Examples 3-1 to 3-4, the decorative sheets 1 of the third embodiment of the present invention were studied.

As shown in Table 7, in the decorative sheet 1 of Example 3-1, the values of ultraviolet absorbance, haze value and color difference (ΔE) were small for every amount of the organic ultraviolet absorbent vesicles and the inorganic ultraviolet absorbent added to the top coat layer 5. This indicates that the decorative sheet 1 had higher weatherability and high transparency. The evaluation of visual appearance change after the weatherability test also indicates that the appearance change before and after the weatherability test was insignificant. However, for the decorative sheet 1 in which 50.0 parts by weight of the organic ultraviolet absorbent vesicles and 0.5 parts by weight of the inorganic ultraviolet absorbent were added, bleed (liquid bleed) was found on the surface of the decorative sheet 1, whereas no appearance change such as color change or cracking was found. This can be attributed to an excessive amount of the organic ultraviolet absorbent vesicles added.

As shown in Table 7, in the decorative sheet 1 of Example 3-2, the ultraviolet absorbance, haze value and color difference (ΔE) were small for every amount of the organic ultraviolet absorbent and the inorganic ultraviolet absorbent vesicles added to the top coat layer 5. This indicates that the decorative sheet 1 had higher weatherability and high transparency. In particular, the test results for the additive amount of 5.0 and 10.0 parts by weight showed significantly small values. Further, in the evaluation of visual appearance change after the weatherability test, no appearance change was found compared to before the weatherability test.

As shown in Table 7, in the decorative sheet 1 of Example 3-3, the ultraviolet absorbance, haze value and color difference (ΔE) were small for every amount of the organic ultraviolet absorbent vesicles and the inorganic ultraviolet absorbent added to the transparent resin layer 4. Further, in the evaluation of visual appearance change after the weatherability test, appearance change compared to before the weatherability test was insignificant or not present. This indicates that the decorative sheet 1 had higher weatherability and high transparency.

As shown in Table 7, in the decorative sheet 1 of Example 3-4, the ultraviolet absorbance, haze value and color difference (ΔE) were significantly small for every amount of the organic ultraviolet absorbent and the inorganic ultraviolet absorbent vesicles added to the transparent resin layer 4. Further, in the evaluation of visual appearance change after the weatherability test, appearance change compared to before the weatherability test was not present. This indicates that the decorative sheet 1 had higher weatherability and high transparency. However, for the decorative sheet 1 in which 0.5 parts by weight of the organic ultraviolet absorbent and 20.0 parts by weight of the inorganic ultraviolet absorbent vesicles were added, bloom (powder bloom) was found on the surface of the decorative sheet 1, whereas no appearance change such as color change or cracking was found. This can be attributed to an excessive amount of the inorganic ultraviolet absorbent vesicles added.

It was found that the decorative sheets 1 of Examples 3-1 to 3-4, in which one of the ultraviolet absorbents was added in the form of vesicles, had small values of ultraviolet absorbance, haze value and color difference (ΔE), and thus higher weatherability and high transparency despite the same additive amount as that of the decorative sheets of Comparative Examples 3-1 and 3-2 shown in Table 10. The reason for this seems to be that providing the organic ultraviolet absorbent vesicles or the inorganic ultraviolet absorbent vesicles improves dispersibility of both the organic and inorganic ultraviolet absorbents and prevents a decrease in the amount of the organic and inorganic ultraviolet absorbents left in the resin composition. Accordingly, sufficient ultraviolet absorbance was performed, and white turbidity caused by aggregation of the organic and inorganic ultraviolet absorbents can be prevented.

In Examples 3-5 to 3-8, the decorative sheets 1 according to the first modified example of the third embodiment of the present invention were studied.

As shown in Table 8, in the decorative sheet 1 of Example 3-5, which was provided by adding the organic ultraviolet absorbent vesicles to the transparent resin layer 4 in the configuration of Example 3-2 in which the organic and inorganic ultraviolet absorbents were added to the top coat layer 5, the values of ultraviolet absorbance and color difference (ΔE) decreased, and the haze value changed little. Further, in the evaluation of visual appearance change after the weatherability test, the result for Example 3-5 was "⊚" indicating no change, whereas the result for Example 3-2 was "○." These results indicate that adding the organic ultraviolet absorbent vesicles to the transparent resin layer 4, which is the other of the resin layers, besides the top coat layer 5, which is one of the resin layer, can further improve weatherability.

As shown in Table 8, in the decorative sheet 1 of Example 3-6, which was provided by adding the inorganic ultraviolet absorbent vesicles to the transparent resin layer 4 in the configuration of Example 3-2 in which the organic and inorganic ultraviolet absorbents were added to the top coat layer 5, the values of ultraviolet absorbance and color difference (ΔE) decreased, and the haze value slightly increased. Further, in the evaluation of visual appearance change after the weatherability test, the result for Example 3-6 was "⊚" indicating no change, whereas the result for Example 3-2 was "○." These results indicate that adding the inorganic ultraviolet absorbent vesicles to the transparent resin layer 4, which is the other of the resin layers, besides the top coat layer 5, which is one of the resin layer, can provide the decorative sheet 1 having significantly higher weatherability, although the transparency was slightly impaired.

As shown in Table 8, in the decorative sheet 1 of Example 3-7, which was provided by adding the organic ultraviolet absorbent vesicles to the top coat layer 5 in the configuration of Example 3-4 in which the organic and inorganic ultraviolet absorbents were added to the transparent resin layer 4, the values of ultraviolet absorbance, the haze value, and color difference (ΔE) decreased. These results indicate that adding the organic ultraviolet absorbent vesicles to the top coat layer 5, which is the other of the resin layers, besides the transparent resin layer 4, which is one of the resin layers, can provide the decorative sheet 1 having significantly higher weatherability.

As shown in Table 8, in the decorative sheet 1 of Example 3-8, which was provided by adding the inorganic ultraviolet absorbent vesicles to the top coat layer 5 in the configuration of Example 3-4 in which the organic and inorganic ultraviolet absorbents were added to the transparent resin layer 4, the value of ultraviolet absorbance decreased, and the haze value and the color difference (ΔE) slightly increased. These results indicate that adding the inorganic ultraviolet absorbent vesicles to the top coat layer 5, which is the other of the resin layers, besides the transparent resin layer 4, which is one of the resin layer, can provide the decorative sheet 1 having significantly higher weatherability, although the transparency was slightly impaired.

In Examples 3-9 to 3-12, the decorative sheets 1 according to the second modified example of the third embodiment of the present invention were studied.

As shown in Table 8, in the decorative sheets 1 of Examples 3-9 to 3-12, the ultraviolet absorbance, haze value and color difference (ΔE) were small for every amount of the organic and inorganic ultraviolet absorbents added to the top coat layer 5 and the transparent resin layer 4. Further, in the observation result of appearance change after the weatherability test, the appearance change was insignificant or not present. This indicates that the decorative sheet 1 had higher weatherability and high transparency.

In particular, in the decorative sheet 1 of Example 3-12 in which the inorganic ultraviolet absorbent in the form of vesicles was added to the top coat layer 5 and the transparent resin layer 4, the values of ultraviolet absorbance, haze value and color difference (ΔE) were the smallest. As a result, it was found that the decorative sheet 1 of Example 3-12 had significantly higher weatherability and transparency compared with the decorative sheets 1 of Examples 3-9 to 3-11. The reason for this seems to be that providing the inorganic ultraviolet absorbent, which was more likely to be aggregated, in the form of vesicles in Example 3-12 improves dispersibility of both the organic and inorganic ultraviolet absorbents in the resin composition and prevents occurrence of bloom (powder bloom) or bleed (liquid bleed) caused by aggregated organic and inorganic ultraviolet absorbents so that a large amount of organic and inorganic ultraviolet absorbents is left in the resin composition which constitutes the top coat layer 5 and the transparent resin layer 4. Accordingly, the decorative sheet 1 of Example 3-12 exhibits higher weatherability compared with those of Examples 3-9 to 3-11. Further, it seems that providing the inorganic ultraviolet absorbent in the form of vesicles improves dispersibility of both the organic and inorganic ultraviolet absorbents compared with the case where the organic ultraviolet absorbent was provided in the form of vesicles to thereby reduce white turbidity and exhibit good haze value.

Further, it was found that the decorative sheets 1 of Examples 3-9 to 3-12 had small values of ultraviolet absorbance, haze value and color difference (ΔE), and thus higher weatherability and high transparency due to one of the organic and inorganic ultraviolet absorbents being added in the form of vesicles to the top coat layer 5 and the transparent resin layer 4 despite the same additive amount as that of the decorative sheet of Comparative Example 3-3 shown in Table 10.

In Example 3-13, the decorative sheets 1 of the third embodiment of the present invention and modified examples having the configuration which includes the ink layer 3 to which a photostabilizer is further added were studied.

As shown in Table 9, in the decorative sheet 1 of Example 3-13, the values of ultraviolet absorbance, haze value and color difference (ΔE) were slightly small compared with the decorative sheets 1 of Examples 3-1 to 3-4, 3-9, and 3-12 having the same additive amount of the organic and inorganic ultraviolet absorbents. It was found that the decorative sheet 1 having the ink layer 3 to which a photostabilizer is added can achieve higher weatherability and transparency than those of the decorative sheets 1 of Examples 3-1 to 3-4, 3-9, and 3-12.

As shown in Table 9, in the decorative sheet 1 of Example 3-14, the values of ultraviolet absorbance and color difference (ΔE) were small compared with the decorative sheet 1 having the configuration of Example 3-4 due to the organic ultraviolet absorbent being added to the top coat layer 5, which was the other of the resin layers. As a result, it was found that the decorative sheet 1 having higher weatherability and transparency can be provided. Further, the values of haze value and color difference (ΔE) were large compared with the decorative sheet 1 of Example 3-7 in which the organic ultraviolet absorbent vesicles were added to the top coat layer 5, which was the other of the resin layers. This can be attributed to aggregation of the organic ultraviolet absorbent occurring in the top coat layer 5 in Example 3-14.

As shown in Table 9, it was found that the decorative sheet 1 of Example 3-15 having higher weatherability compared with the decorative sheet 1 having the configuration of Example 3-2 can be achieved by adding the organic ultraviolet absorbent vesicles and the inorganic ultraviolet absorbent vesicles to the transparent resin layer 4, which was the other of the resin layers.

Further, as shown in Comparative Example 3-4, in the decorative sheet 1 having the top coat layer 5 and the transparent resin layer 4 to which no ultraviolet absorbent is added, the values of ultraviolet absorbance and color difference (ΔE) were large. As is also obvious from the observation result of appearance change after the weatherability test, the decorative sheet 1 had no weatherability.

On the basis of the aforementioned results, the decorative sheet 1 having high transparency and high ultraviolet absorbance can be achieved when one of the resin layers, the top coat layer 5 or the transparent resin layer 4, in the decorative sheet 1 of the present embodiment contains the organic ultraviolet absorbent and the inorganic ultraviolet absorbent, and one of the organic ultraviolet absorbent and the inorganic ultraviolet absorbent is contained in the form of vesicles.

Further, the decorative sheet 1 having further improved transparency and ultraviolet absorbance can be achieved by adding at least one of the organic ultraviolet absorbent vesicles and the inorganic ultraviolet absorbent vesicles to the other of the resin layers.

Moreover, it was found that a beautiful pattern print can be held over a long period of time when the decorative sheet 1 includes the ink layer 3 to which a photostabilizer is added in addition to the above configuration.

REFERENCE EXAMPLES

Decorative sheets other than those described in the present embodiment will be briefly described as reference examples of the present invention.

When only a triazine ultraviolet absorbent, which is an organic ultraviolet absorbent, is added to decorative sheets other than those described in the present embodiment, the transparency of the substrate resin can be maintained. However, temporal change cannot be avoided, which may cause insufficient sustainability of ultraviolet absorbance over a long period of time.

Further, when only zinc oxide, which is an inorganic ultraviolet absorbent, is added, less temporal change occurs and good ultraviolet absorbance is performed over a long period of time. However, there is a problem that adding a large amount may decrease transparency and reduce the designability of the decorative sheet.

Further, increasing the additive amount of the organic or inorganic ultraviolet absorbents in order to improve the weatherability may increase aggregated ultraviolet absorbents. Accordingly, occurrence of bleeding-out such as bloom (powder bloom) or bleed (liquid bleed) which is caused by aggregation of the ultraviolet absorbents may increase. As a result, the sheet surface may have whitening which may impair designability or stickiness which may impair adhesiveness.

The present inventors have diligently studied and found that the dispersibility of the organic ultraviolet absorbent and the inorganic ultraviolet absorbent in the resin material can be drastically improved by containing one of the organic ultraviolet absorbent and the inorganic ultraviolet absorbent encapsulated in vesicles when both the organic ultraviolet absorbent and the inorganic ultraviolet absorbent are added and thus occurrence of bleeding-out can be prevented.

Fourth Embodiment

A decorative sheet of the present embodiment includes a top coat layer as an outermost layer and a transparent resin layer on the underside of the top coat layer, wherein the top coat layer and the transparent resin layer contain an organic ultraviolet absorbent, and it is particularly important that the organic ultraviolet absorbent is encapsulated in vesicles having an outer membrane and provided as organic ultraviolet absorbent vesicles.

Such organic ultraviolet absorbent vesicles have a configuration of small sac-like capsules having a layer structure closed in the form of a spherical shell in which the organic ultraviolet absorbent is encapsulated. The organic ultraviolet absorbent vesicles have significantly high dispersibility since their outer membranes have a repelling effect, which prevents particle aggregation. By virtue of this effect, the organic ultraviolet absorbent can be homogeneously dispersed in the resin composition which constitutes the top coat layer and the transparent resin layer.

Further, in the decorative sheet of the present embodiment, the organic ultraviolet absorbent vesicles are preferably organic ultraviolet absorbent liposomes having an outer membrane made of phospholipid. The outer membrane made of phospholipid ensures good miscibility with the resin material which is the main component of the top coat layer and the transparent resin layer. The outer membrane of the liposomes may be made of a mixture of phospholipid and a dispersant.

In the present embodiment, when the organic ultraviolet absorbent vesicles are added to the top coat layer, the additive amount is preferably in the range of 0.1 parts by weight to 20 parts by weight per 100 parts by weight of the top coat layer forming resin. More preferably, the additive amount is in the range of 0.5 parts by weight to 10 parts by weight. If the additive amount of the organic ultraviolet absorbent vesicles is less than 0.1 parts by weight, ultraviolet absorbance will be less effective. On the other hand, if the additive amount is more than 20 parts by weight, bleeding-out will be more likely to occur. Further, when the organic ultraviolet absorbent vesicles are added to the transparent resin layer, the additive amount is preferably in the range of 0.1 parts by weight to 10 parts by weight per 100 parts by weight of the olefin-based resin which is the main component of the transparent resin layer. More preferably, the additive amount is in the range of 0.2 parts by weight to 5 parts by weight. If the additive amount of the organic ultraviolet absorbent vesicles is less than 0.1 parts by weight, ultraviolet absorbance will be less effective. On the other hand, if the additive amount is more than 10 parts by weight, bleeding-out will be more likely to occur.

Further, in the decorative sheet of the present embodiment, an embossed pattern is formed on the transparent resin layer, and it is important that the top coat layer is embedded in at least recesses of the embossed pattern. The top coat layer is preferably configured to be embedded in the recesses by wiping when the top coat layer is provided on the surface of the transparent resin layer.

Further, it is important that an underlayer of the transparent resin layer is an ink layer which at least includes a photostabilizer. As the photostabilizer, a hindered amine-based material is preferably used. Providing the photostabilizer in the ink layer can prevent radicals generated by degradation of the binder resin itself which forms the ink layer or the resin of other layers from reducing the chemical components of the ink pigment to thereby prevent discoloration of the pigment. Accordingly, a vivid color pattern can be maintained over a long period of time.

The organic ultraviolet absorbent used in the present embodiment may be the same as that of the first embodiment, and the description thereof is omitted herein.

Further, the method for obtaining the organic ultraviolet absorbent vesicles of the present embodiment (vesicle formation method) is the same as that of the third embodiment, and the description thereof is omitted herein. Further, the method for obtaining the organic ultraviolet absorbent vesicles having a monolayer outer membrane is also the same as that of the third embodiment, and the description thereof is omitted herein.

Further, the phospholipid constituting the outer membrane of vesicles and other substances constituting the outer membrane of vesicles used in the present embodiment can be the same as those of the first embodiment, and the description thereof is omitted herein.

With reference to FIG. 2, a specific configuration of the decorative sheet of the present embodiment will be described.

(Overall Configuration)

FIG. 2 illustrates a specific configuration of the decorative sheet 1 of the present embodiment. The decorative sheet 1 includes a primary film resin sheet, which is the primary film layer 2, having the ink layer 3 applied on the primary film layer 2 and the adhesive layer 7 formed on the ink layer 3, and the transparent resin layer 4 containing the organic ultraviolet absorbent vesicles and having a co-extruded adhesive resin layer 4b, and the decorative sheet 1 is obtained by bonding the primary film layer 2 to the transparent resin layer 4 by dry lamination, extrusion lamination, or the like. As shown in FIG. 2, in the decorative sheet 1 of the present embodiment, the top coat layer 5 is embedded in the recesses of the embossed pattern 4a formed on the transparent resin layer 4 by applying the resin composition containing the organic ultraviolet absorbent vesicles on the recesses and wiping off the coating liquid by using a squeegee or the like so that the resin composition is embedded only in the recesses. In other words, the decorative sheet 1 of the present embodiment includes the top coat layer 5, the transparent resin layer 4 (adhesive resin layer 4b), the adhesive layer 7, the ink layer 3, and the primary film layer 2, which are laminated in this order from the outermost surface of the decorative sheet 1. Further, in order to improve designability, the embossed pattern 4a is formed on the surface of the transparent resin layer 4 which faces the top coat layer 5, and part of the resin composition which constitutes the top coat layer 5 is embedded in the recesses of the embossed pattern 4a by wiping. The ink layer 3 includes a pattern layer 3a provided on the surface facing the adhesive layer 7 and a solid ink layer 3b.

Further, the configuration of the decorative sheet 1 of the present embodiment may be the same as the configuration of the decorative sheet of the first embodiment.

In addition, the resin compositions and the like which constitute the above layers may be substantially the same as those of the layers described in the first embodiment. Accordingly, the resin compositions and the like which are the same as the first embodiment will not be further described.

In the top coat layer 5 provided on the outermost surface of the decorative sheet 1 of the present embodiment, 0.1 parts by weight to 20 parts by weight of the organic ultraviolet absorbent vesicles were added per 100 parts by weight of the resin material which is the main component of the top coat layer 5. In particular, in the present embodiment, the organic ultraviolet absorbent vesicles are preferably organic ultraviolet absorbent liposomes having an outer membrane made of phospholipid which are obtained by the supercritical reverse phase evaporation method.

In the present embodiment, the top coat layer 5 is provided only in the recesses of the embossed pattern 4a of the transparent resin layer 4. However, the top coat layer 5 may be embedded at least in the recesses of the embossed pattern 4a, and higher weatherability can be maintained at the recesses having a decreased layer thickness by forming the embossed pattern 4a. Further, the top coat layer 5 may be provided to cover the entire surface of the transparent resin layer 4. The decorative sheet 1 having further improved weatherability can be provided by providing the top coat layer 5 that covers the entire surface.

The embossed pattern 4a is formed on the surface of the transparent resin layer 4 to improve designability. The embossed pattern 4a can be formed by a method by which the embossed pattern 4a is formed by applying heat and pressure by using an embossing plate having an embossed pattern before forming the top coat layer 5, or by a method by which the embossed pattern 4a is formed simultaneously with cooling of the sheet by using a cooling roll having an embossed pattern in forming a film using an extruder. Moreover, ink can be filled in the recesses of the embossed pattern 4a to further improve designability.

When non-polar polypropylene is used for the transparent resin layer 4, the adhesive resin layer 4b is preferably provided if the transparent resin layer 4 and the resin layer provided on the underside thereof have low adhesiveness to each other. The adhesive resin layer 4b is preferably a resin such as polypropylene, polyethylene, and acrylic resin modified with acid, and a layer thickness is preferably in the range of 2 μm or more and 20 μm or less in view of adhesiveness and heat resistance. Further, the adhesive resin layer 4b is preferably formed by co-extrusion with the transparent resin layer 4 in view of improvement in adhesion strength.

As shown in FIG. 2, the adhesive layer 7 is provided on the underside of the transparent resin layer 4 to improve adhesiveness between the ink layer 3 on the underside of the adhesive layer 7 and the transparent resin layer 4. An application method of the adhesive layer 7 can be appropriately selected depending on the viscosity of the adhesive and the like, and gravure coating is typically used. After being applied by gravure coating on the ink layer 3 on the surface of the primary film layer 2, the adhesive layer 7 is laminated on the transparent resin layer 4 or the adhesive resin layer 4b. The adhesive layer 7 may not be necessarily provided when the adhesiveness between the transparent resin layer 4 and the ink layer 3 is sufficient.

Further, the ink layer 3 includes the pattern layer 3a made of ink to which at least a photostabilizer is added. Further, the solid ink layer 3b is provided on the underside of the pattern layer 3a to impart concealing properties.

In the solid ink layer 3b, the same material as that used for the pattern layer 3a can be basically used. When the ink is a transparent material, an opaque pigment, titanium oxide, iron oxide, and the like can be used. In addition, a metal such as gold, silver, copper, or aluminum can be added to impart concealing properties. Typically, aluminum flakes are used.

The ink layer 3 can be formed by gravure printing, offset printing, screen printing, flexographic printing, electrostatic printing, ink jet printing, or the like directly applied onto the primary film layer 2. Further, when concealing properties are imparted by a metal, a comma coater, knife coater, lip coater, metal deposition, or sputtering is preferably used.

Further, taking into consideration the adhesiveness of an interface on which a resin material or ink is laminated, the surface to be laminated is preferably processed with a treatment such as a corona treatment, ozone treatment, plasma treatment, electron beam treatment, ultraviolet ray treatment, or bichromate treatment before the resin material or ink is applied so that the surface is activated before the lamination process to thereby improve adhesiveness between the layers.

In the decorative sheet 1 of the present embodiment, the primary film layer 2 is preferably in the range of 20 to 150 μm thickness considering print workability, cost, and the like, the adhesive layer 7 is in the range of 1 to 20 μm thickness, the transparent resin layer 4 is in the range of 20 to 200 μm thickness, and the top coat layer 5 is in the range of 3 to 20 μm thickness, and the total thickness of the decorative sheet 1 is preferably in the range of 45 to 400 μm.

Advantageous Effect of the Present Embodiment

As described above, the decorative sheet 1 of the present embodiment includes the top coat layer 5 and the transparent resin layer 4 to which the organic ultraviolet absorbent vesicles are added, wherein the organic ultraviolet absorbent is highly homogeneously dispersed in the resin composition of the top coat layer 5 and the transparent resin layer 4. Accordingly, the decorative sheet 1 having higher designability without impairing transparency and ensuring high ultraviolet absorbance with a small additive amount and thus higher weatherability over a long period of time can be provided.

In addition, since high dispersibility of the organic ultraviolet absorbent in the resin composition is achieved, the decorative sheet 1 which prevents occurrence of bleeding-out caused by aggregated additives and which has less stickiness on the surface can be provided.

Further, since the organic ultraviolet absorbent is provided as organic ultraviolet absorbent vesicles in the present embodiment, a desire of adding a large amount of organic ultraviolet absorbents can be fulfilled. Accordingly, the decorative sheet 1 having further improved weatherability ability can be provided. In addition, providing the organic ultraviolet absorbent vesicles is effective in that flexibility, impact strength, and planar smoothness required for the decorative sheet can be maintained. Further, the organic ultraviolet absorbent added to the raw material resin of the top coat layer 5 can prevent thickening so that the recesses of the embossed pattern 4a can be thoroughly filled with the coating liquid. Accordingly, the decorative sheet 1 having higher designability can be achieved.

Moreover, in the present embodiment, the organic ultraviolet absorbent can be highly homogeneously dispersed in the resin composition which constitutes the top coat layer 5 and the transparent resin layer 4 by using the organic ultraviolet absorbent liposomes obtained by the supercritical reverse phase evaporation method as the organic ultraviolet absorbent vesicles. Accordingly, an improved transparency and ultraviolet absorbance can be achieved.

The more detailed effects of the present embodiment will be described below.

(1) The decorative sheet 1 of the present embodiment is characterized in that the decorative sheet 1 includes the top coat layer 5 as an outermost layer, and the transparent resin layer 4 on the underside of the top coat layer 5, wherein the top coat layer 5 and the transparent resin layer 4 contain an organic ultraviolet absorbent, and the contained organic ultraviolet absorbent is encapsulated in vesicles having an outer membrane and provided as organic ultraviolet absorbent vesicles.

With this configuration, a decorative sheet having higher designability and higher weatherability over a long period of time can be provided by having the top coat layer 5 and the transparent resin layer 4 containing the organic ultraviolet absorbent vesicles.

(2) In the decorative sheet 1 of the present embodiment, the organic ultraviolet absorbent vesicles may have a monolayer outer membrane.

With this configuration, the organic ultraviolet absorbent can be homogeneously dispersed in the top coat layer 5 and the transparent resin layer 4. Accordingly, a decorative sheet having high transparency and thus higher designability and higher weatherability can be provided.

(3) In the decorative sheet 1 of the present embodiment, the organic ultraviolet absorbent vesicles may be organic ultraviolet absorbent liposomes having an outer membrane made of phospholipid.

With this configuration, good miscibility with the resin composition which is the main component of the top coat layer 5 and the transparent resin layer 4 can be achieved. Accordingly, vesicles can exhibit high dispersibility in the resin composition which is the main component, and prevent occurrence of secondary aggregation.

(4) In the decorative sheet 1 of the present embodiment, the organic ultraviolet absorbent may be made of at least one selected from the group consisting of benzotriazole, triazine, benzophenone, benzoate, and cyanoacrylate-based absorbents.

With this configuration, a decorative sheet with high transparency and higher designability can be provided.

(5) In the decorative sheet 1 of the present embodiment, the embossed pattern 4a is formed on the transparent resin layer 4, and at least the recesses of the embossed pattern 4a may be filled with the top coat layer 5.

With this configuration, although the transparent resin layer 4 having the embossed pattern 4a has a reduced thickness at positions of the recesses of the embossed pattern 4a, the recesses are filled with the top coat layer 5 to which the organic ultraviolet absorbent vesicles have been added. Accordingly, a decorative sheet in which the recesses of the embossed pattern 4a have no less weatherability than the remaining portion of the transparent resin layer 4 can be provided.

(6) In the decorative sheet 1 of the present embodiment, the ink layer 3 which contains a photostabilizer may be provided as the underlayer of the transparent resin layer 4.

With this configuration, discoloration of the pigment due to radicals generated by degradation of the binder resin itself of the ink layer 3 or the resin of other layers which reduces the chemical components of the ink pigment can be prevented. Accordingly, a decorative sheet having higher designability over a long period of time can be provided.

EXAMPLES

Specific examples of the decorative sheet 1 of the present embodiment will be described below.

<Preparation of Organic Ultraviolet Absorbent Vesicles>

First, a method for preparing the organic ultraviolet absorbent vesicles used in Examples 4-1 and 4-2 will be described. In preparation of the organic ultraviolet absorbent vesicles, a supercritical reverse phase evaporation method was used.

Specifically, 100 parts by weight of hexane, 70 parts by weight of hydroxyphenyl triazine (TINUVIN 400; manufactured by BASF Corp.) having 2-[4-[(2-Hydroxy-3-dodecyloxypropyl)oxy]-2-hydroxyphenyl]-4,6-bis(2,4-dimethylphenyl)-1,3,5-triazine as the main component as an organic ultraviolet absorbent, and 5 parts by weight of a phosphatidylcholine as the phospholipid were placed in a high-pressure stainless steel vessel kept at 60° C., and sealed therein. Carbon dioxide was injected into the vessel so that the vessel pressure becomes 20 MPa at a supercritical state. 100 parts by weight of ethyl acetate was injected while vigorously stirring the vessel contents. After stirring for 15 minutes at constant temperature and the pressure, carbon dioxide was exhausted for returning to atmospheric pressure. Thus, hydroxyphenyl triazine liposomes having a monolayer outer membrane made of phospholipid were obtained.

<Production Method of Decorative Sheet 1>

First, a resin prepared by adding 0.5 parts by weight of a hindered phenol-based antioxidant (IRGANOX 1010; manufactured by BASF Corp.) and 0.2 parts by weight of a hindered amine-based photostabilizer (CHIMASSORB 944; manufactured by BASF Corp.) to 100 parts by weight of a highly crystalline homopolypropylene resin was melt-extruded by using an extruder to thereby form the sheet-shaped transparent resin layer 4 as an 80 μm-thick transparent highly crystalline polypropylene sheet. Corona treatment was applied on both surfaces of the transparent resin sheet 4 thus obtained so that the wetting tension of the sheet surface becomes 40 dyn/cm or higher. On the other hand, a pattern was printed on one of the surfaces of a 70 μm-thick polyethylene sheet having concealing properties (primary film layer 2) by gravure printing using a two-part type urethane ink (V180; manufactured by Toyo Ink Co., Ltd.) to thereby provide the pattern layer 3a. Further, primer coating was applied on the other of the surfaces of the primary film layer 2. After that, the transparent resin layer 4 was bonded to the surface of the pattern layer 3a of the primary film layer 2 by a dry lamination method via a dry lamination adhesive (TAKELAC A540; manufactured by Mitsui Chemicals, Inc., applied amount 2 g/m2) which is the adhesive layer 7. After the embossed pattern 4a was formed on the surface of the transparent resin layer 4 of the laminated sheet, a two-part type urethane top coat (W184; manufactured by DIC Graphics Corp.) was applied at the applied amount 3 g/m2 to thereby form the top coat layer 5. Thus, the decorative sheet 1 of the present embodiment having a total thickness of 157 μm was obtained.

Example 4-1

In Example 4-1, the decorative sheet 1 included the top coat layer 5 and the transparent resin layer 4 which were prepared by adding 0.2, 1.0, 2.5 or 10.0 parts by weight of the above hydroxyphenyl triazine liposomes to each of 100 parts by weight of a two-part type urethane top coat which is the main component of the top coat layer 5 and 100 parts by weight of a highly crystalline homopolypropylene resin which is the main component of the transparent resin layer 4.

Example 4-2

In Example 4-2, the decorative sheet 1 included the top coat layer 5 and the transparent resin layer 4 which were prepared by adding 0.2 or 10.0 parts by weight of the above hydroxyphenyl triazine liposomes to each of 100 parts by weight of a two-part type urethane top coat which is the main component of the top coat layer 5 and 100 parts by weight of a highly crystalline homopolypropylene resin which is the main component of the transparent resin layer 4, and the pattern layer 3a which was prepared by adding 0.2 parts by weight of a hindered amine-based photostabilizer (CHIMASSORB 944; manufactured by BASF Corp.) to 100 parts by weight of a two-part type urethane ink. The other configurations are the same as those of Example 4-1.

Comparative Example 4-1

In Comparative Example 4-1, the decorative sheet 1 included the top coat layer 5 and the transparent resin layer 4 which were prepared by adding 0.2, 1.0 or 10.0 parts by weight of hydroxyphenyl triazine having no vesicle to each of 100 parts by weight of a two-part type urethane top coat which is the main component of the top coat layer 5 and 100 parts by weight of a highly crystalline homopolypropylene resin which is the main component of the transparent resin layer 4. The other configurations are the same as those of Example 4-1.

Comparative Example 4-2

In Comparative Example 4-2, the decorative sheet 1 included the top coat layer 5 and the transparent resin layer 4 to which no organic ultraviolet absorbent was added. The other configurations are the same as those of Example 4-1.

<Evaluations>

For the decorative sheets 1 of Examples 4-1 and 4-2 and Comparative Examples 4-1 and 4-2 obtained by the above processes, the ultraviolet absorbance, haze value, color difference (ΔE), and the change in appearance after the weatherability test were evaluated in the same manner as the first embodiment. The evaluation results obtained are shown in Table 11. The symbols for appearance change represent the same meaning as those of the first embodiment.

TABLE 11

| | Ultraviolet absorbent | | Test result (test time: 4000 hours) | | | |
|---|---|---|---|---|---|---|
| | Content [parts by weight] | Vesicle formation | ultraviolet absorbance | Haze value [%] | Color difference (ΔE) | Appearance change |
| Example 4-1 | 0.2 | Yes | 0.19 | 5.04 | 0.75 | ○ |
| | 1.0 | Yes | 0.15 | 5.20 | 0.62 | ○ |
| | 2.5 | Yes | 0.11 | 5.54 | 0.43 | ⊚ |
| | 10.0 | Yes | 0.05 | 6.25 | 0.33 | ⊚ |
| Example 4-2 | 0.2 | Yes | 0.17 | 5.01 | 0.47 | ⊚ |
| | 10.0 | Yes | 0.04 | 6.26 | 0.24 | ⊚ |
| Comparative Example 4-1 | 0.2 | No | 0.81 | 7.50 | 4.50 | X |
| | 1.0 | No | 0.46 | 8.20 | 3.20 | Δ |
| | 10.0 | No | 0.25 | 13.80 | 1.25 | ○ |
| Comparative Example 4-2 | — | — | 10.80 | 6.47 | 12.20 | X |

As shown in Table 11, in the decorative sheet 1 of Example 4-1, the values of ultraviolet absorbance and color difference (ΔE) before and after the weatherability test were small and the haze value was large in proportion to an increase in the additive amount of the hydroxyphenyl triazine liposomes. The reason for this seems to be that the weatherability is improved, whereas white turbidity caused by the additive increases and thus the haze value increases in proportion to an increase in the additive amount of the hydroxyphenyl triazine liposomes.

As shown in Table 11, in the decorative sheet 1 of Example 4-2, the values of ultraviolet absorbance and color difference (ΔE) before and after the weatherability test were small and the haze value was large in proportion to an increase in the additive amount of the hydroxyphenyl triazine liposomes, which showed the same tendency as that of the decorative sheet 1 of Example 4-1. In particular, in the decorative sheet 1 of Example 4-2, the value of color difference (ΔE) before and after the weatherability test was significantly small, which was also a small value compared with the value of color difference (ΔE) of the decorative sheet 1 with the same additive amount of hydroxyphenyl triazine liposomes in Example 4-1. This indicates that adding a photostabilizer to the pattern layer 3a prevents discoloration of ink that forms the pattern.

As shown in Table 11, in the decorative sheet 1 of Comparative Example 4-1, the values of ultraviolet absorbance, haze value and color difference (ΔE) before and after the weatherability test were large compared with those of the decorative sheet 1 of Examples 4-1 and 4-2. This indicates that the decorative sheet 1 had poor weatherability and designability. In particular, in the decorative sheet 1 in which 0.2 parts by weight of hydroxyphenyl triazine was added, whitening or cracking was found after the weatherability test since sufficient ultraviolet absorbance was not achieved. The reason for this seems to be that the aggregation of hydroxyphenyl triazine occurred in the resin composition since the hydroxyphenyl triazine was not provided as vesicles. As a result, white turbidity has proceeded, and the surface area of the ultraviolet absorbent has decreased due to the aggregation, leading to insufficient ultraviolet absorbance. Further, in the decorative sheet 1 in which 10.0 parts by weight of hydroxyphenyl triazine was added, appearance change after the weatherability test was small since a large amount of hydroxyphenyl triazine was added. However, white turbidity due to aggregation of the additive was so prominent that the decorative sheet 1 had poor designability. As shown in Table 11, in the decorative sheet 1 of Comparative Example 4-2, the values of ultraviolet absorbance and color difference (ΔE) before and after the weatherability test were significantly large compared with those of the decorative sheet 1 of Examples 4-1 and 4-2 and Comparative Example 4-1, which indicates that the decorative sheet 1 had little weatherability.

As seen from the aforementioned results, the decorative sheets 1 of Examples 4-1 and 4-2 were superior in weatherability and designability. Further, it was also found that providing the pattern layer 3a to which a photostabilizer was added contributes to maintaining vivid pattern over a long period of time.

REFERENCE EXAMPLES

Decorative sheets other than those described in the present embodiment will be briefly described as reference examples of the present invention.

In the decorative sheets other than those described in the present embodiment, when an amount of organic ultraviolet absorbent sufficient to ensure weatherability is added, the organic ultraviolet absorbent undergoes aggregation in the resin composition which constitutes the resin layer such as the top coat layer. In particular, when aggregation occurs in the resin layer which requires transparency, such as the transparent layer made up of the top coat layer and the transparent resin layer, designability of the decorative sheet may be reduced.

Further, aggregation of the organic ultraviolet absorbent in the resin composition induces bleeding-out by which the aggregated organic ultraviolet absorbent comes out on the surface of the resin layer. The bleeding-out may cause problems such as stickiness on the sheet surface of the top coat layer and poor adhesiveness of the transparent resin layer to other resin layers.

In addition, when an embossed pattern is formed to improve designability of the decorative sheet, recessed portions of the embossed pattern have a reduced thickness compared to the remaining portion, which causes particularly reduced weatherability. As a result, deterioration may start from these recesses, leading to whitening and cracking.

The present inventors have diligently studied and found that the dispersibility of the organic ultraviolet absorbent in the resin material can be drastically improved by containing the organic ultraviolet absorbent in the form of vesicles in which the organic ultraviolet absorbent is encapsulated and thus transparency required for the decorative sheets can be achieved.

Fifth Embodiment

A decorative sheet of the present embodiment includes a transparent resin layer made of transparent olefin-based resin, and it is important that the transparent resin layer contains an organic ultraviolet absorbent, and the organic ultraviolet absorbent is encapsulated in vesicles having a monolayer outer membrane and provided as organic ultraviolet absorbent vesicles.

Such organic ultraviolet absorbent vesicles have a configuration of small sac-like capsules having a layer structure closed in the form of a spherical shell in which the organic ultraviolet absorbent is encapsulated. The organic ultraviolet absorbent vesicles have significantly high dispersibility since their outer membranes have a repelling effect, which prevents particle aggregation. By virtue of this effect, the organic ultraviolet absorbent can be homogeneously dispersed in the resin composition which constitutes the transparent resin layer.

Further, in the decorative sheet of the present embodiment, the organic ultraviolet absorbent vesicles are preferably organic ultraviolet absorbent liposomes having an outer membrane made of phospholipid. The outer membrane made of phospholipid ensures good miscibility with the resin material which is the main component of the transparent resin layer. The outer membrane of the liposomes may be made of a mixture of phospholipid and a dispersant.

In the present embodiment, when the organic ultraviolet absorbent vesicles are added to the transparent resin layer, a preferred amount of the organic ultraviolet absorbent vesicles to be added is in the range of 0.1 to 10 parts by weight per 100 parts by weight of the resin material which is the main component of the transparent resin layer. More preferably, the additive amount of the organic ultraviolet absorbent vesicles is in the range of 0.2 to 5 parts by weight. If the additive amount of the organic ultraviolet absorbent is less than 0.1 parts by weight, ultraviolet absorbance will be less effective. On the other hand, if the additive amount is more than 10 parts by weight, bleeding-out will be more likely to occur.

Further, it is important that an underlayer of the transparent resin layer is an ink layer to which at least a photostabilizer is added. As the photostabilizer, a hindered amine-based material is preferably used. Adding the photostabilizer to the ink layer can prevent radicals generated by degradation of the binder resin itself which forms the ink layer or the resin of other layers from reducing the chemical components of the ink pigment to thereby prevent discoloration of the pigment. Accordingly, a vivid color pattern can be maintained over a long period of time.

Moreover, a top coat layer may be provided on the top of the transparent resin layer depending on the applications or properties required. In particular, in the application which requires mechanical strength, it is important that a top coat layer is provided.

The organic ultraviolet absorbent used in the present embodiment may be the same as that of the first embodiment, and the description thereof is omitted herein.

Further, the method for obtaining the organic ultraviolet absorbent vesicles of the present embodiment (vesicle formation method) is the same as that of the third embodiment, and the description thereof is omitted herein. Further, the method for obtaining the organic ultraviolet absorbent vesicles having a monolayer outer membrane is also the same as that of the third embodiment, and the description thereof is omitted herein.

Further, the phospholipid constituting the outer membrane of vesicles and other substances constituting the outer membrane of vesicles used in the present embodiment can be the same as those of the first embodiment, and the description thereof is omitted herein.

With reference to FIG. 1, a specific configuration of the decorative sheet of the present embodiment will be described.

(Overall Configuration)

FIG. 1 illustrates a specific configuration of the decorative sheet 1 of the present embodiment, and the decorative sheet 1 is composed of a plurality of resin layers. The decorative sheet 1 of the present embodiment includes the top coat layer 5, the transparent resin layer 4, the adhesive layer 7, the ink layer 3, and the primary film layer 2, which are laminated in this order from the outermost surface of the decorative sheet 1. Further, in order to improve designability, the embossed pattern 4a is formed on the surface of the transparent resin layer 4 which faces the top coat layer 5. The recesses of the embossed pattern 4a are filled with the resin composition which constitutes the top coat layer 5 by wiping. The adhesive layer 7 is composed of, for example, a thermosensitive adhesive, an anchor coat, an adhesive for dry lamination, and the like. Moreover, the decorative sheet 1 is bonded to a substrate B to thereby form a decorative board. Examples of the substrate B include wooden boards, inorganic boards and metal plates.

In addition, the resin compositions and the like which constitute the above layers may be substantially the same as those of the layers described in the first embodiment. Accordingly, the resin compositions and the like which are the same as the first embodiment will not be further described.

In the present embodiment, the transparent resin layer 4 may be made of a resin composition that contains olefin-based resin as the main component and includes organic ultraviolet absorbent vesicles.

Further, in the decorative sheet 1 of the present embodiment, the primary film layer 2 is preferably in the range of 20 to 150 μm considering print workability, cost, and the like, the adhesive layer 7 is in the range of 1 to 20 the transparent resin layer 4 is in the range of 20 to 200 and the top coat layer 5 is in the range of 3 to 20 and the total thickness of the decorative sheet 1 is preferably in the range of 45 to 400 μm.

Advantageous Effect of the Present Embodiment

As described above, since the decorative sheet 1 of the present embodiment includes the transparent resin layer 4 to which the organic ultraviolet absorbent vesicles are added, the transparent resin layer 4 in which the organic ultraviolet absorbent is highly homogeneously dispersed in the resin composition which constitutes the transparent resin layer 4 can be achieved. As a result, the decorative sheet 1 having higher weatherability without unduly increasing the additive amount, high transparency, and higher designability can be provided.

Further, since the organic ultraviolet absorbent is provided as organic ultraviolet absorbent vesicles in the present embodiment, a desire of adding a large amount of organic ultraviolet absorbents without causing bleeding-out can be fulfilled. Accordingly, the decorative sheet 1 having further improved weatherability ability can be provided.

Further, providing the ink layer 3 to which a photostabilizer is added can prevent discoloration of the ink layer 3 due to UV exposure. Accordingly, the decorative sheet 1 having higher designability can be provided while maintaining a beautiful design print over a long period of time.

The more detailed effects of the present embodiment will be described below.

(1) The decorative sheet 1 of the present embodiment includes the transparent resin layer 4 made of transparent olefin-based resin, characterized in that the transparent resin layer 4 contains an organic ultraviolet absorbent, and the organic ultraviolet absorbent is encapsulated in vesicles having a monolayer outer membrane and provided as organic ultraviolet absorbent vesicles.

With this configuration, the organic ultraviolet absorbent can be homogeneously dispersed in the transparent resin layer 4. Accordingly, a decorative sheet having high transparency and thus higher designability and higher weatherability can be provided.

(2) In the decorative sheet 1 of the present embodiment, the organic ultraviolet absorbent may be made of at least one selected from the group consisting of benzotriazole, triazine, benzophenone, benzoate, and cyanoacrylate-based absorbents.

With this configuration, a decorative sheet having further improved designability can be provided without impairing transparency of the top coat layer 5 compared with the case using an inorganic ultraviolet absorbent.

(3) In the decorative sheet 1 of the present embodiment, the vesicles may be liposomes having an outer membrane made of phospholipid.

With this configuration, good miscibility with the resin composition which is the main component of the top coat layer 5 can be achieved.

(4) In the decorative sheet 1 of the present embodiment, an ink layer which contains a photostabilizer may be provided as the underlayer of the transparent resin layer 4.

With this configuration, discoloration of the pigment due to radicals generated by degradation of the binder resin itself of the ink layer 3 or the resin of other layers which reduces the chemical components of the ink pigment can be prevented. Accordingly, a decorative sheet having higher designability over a long period of time can be provided.

EXAMPLES

Specific examples of the decorative sheet 1 of the present embodiment will be described below.

<Preparation of Organic Ultraviolet Absorbent Vesicles>

A method for preparing the organic ultraviolet absorbent vesicles will be described. In preparation of the organic ultraviolet absorbent vesicles, a supercritical reverse phase evaporation method was used.

Vesicles were prepared as follows: 100 parts by weight of 2-propanol, 70 parts by weight of hydroxyphenyl triazine (TINUVIN 400; manufactured by BASF Corp.) containing triazine-based ultraviolet absorbent 2-[4-[(2-Hydroxy-3-dodecyloxypropyl)oxy]-2-hydroxyphenyl]-4,6-bis(2,4-dimethylphenyl)-1,3,5-triazine as the main component as an organic ultraviolet absorbent, and 5 parts by weight of a phosphatidylcholine as the phospholipid were placed in a high-pressure stainless steel vessel kept at 60° C., and sealed therein. Carbon dioxide was injected into the vessel so that the vessel pressure becomes 20 MPa at a supercritical state. 100 parts by weight of ion-exchanged water was injected while vigorously stirring the vessel contents. After stirring for 15 minutes at constant temperature and the pressure, carbon dioxide was exhausted for returning to atmospheric pressure. Thus, triazine ultraviolet absorbent liposomes having a monolayer outer membrane made of phospholipid were obtained.

<Production Method of Decorative Sheet 1>

A resin prepared by adding 0.05 parts by weight of a hindered phenol-based antioxidant (IRGANOX 1010; manufactured by BASF Corp.), 0.2 parts by weight of a hindered amine-based photostabilizer (CHIMASSORB 944; manufactured by BASF Corp.) and the triazine-based ultraviolet absorbent liposomes or an organic ultraviolet absorbent of the amount specified in the following Examples or Comparative Examples to a homopolypropylene resin was melt-extruded by an extruder to thereby form a transparent highly crystalline polypropylene sheet having 80 µm thickness as the transparent resin layer 4. Corona treatment was applied on both surfaces of the transparent resin layer 4 thus obtained so that the wetting tension of the sheet surface becomes 40 dyn/cm or higher. On the other hand, a pattern was printed on one of the surfaces of a 70 µm-thick polyethylene sheet having concealing properties (primary film layer 2) by gravure printing using a two-part type urethane ink (V180; manufactured by Toyo Ink Co., Ltd.) to thereby provide the ink layer 3. Further, primer coating was applied on the other of the surfaces of the primary film layer 2. After that, the transparent resin layer 4 was bonded to the surface of the ink layer 3 of the primary film layer 2 by a dry lamination method via a dry lamination adhesive (TAKE-LAC A540; manufactured by Mitsui Chemicals, Inc., applied amount 2 g/m2) which is the adhesive layer 7. Thus, a laminate resin sheet of made up of the primary film layer 2, the ink layer 3, the adhesive layer 7, and the transparent resin layer 4 was obtained. After that, the embossed pattern 4a was applied on the surface of the transparent resin layer 4 of the laminate resin sheet to thereby obtain the decorative sheet 1 having 157 µm total thickness.

Example 5-1

In Example 5-1, the decorative sheet 1 included the transparent resin layer 4 which was prepared by adding 0.2, 1.0, 5.0 or 10.0 parts by weight of triazine-based ultraviolet absorbent liposomes prepared by the method described above to 100 parts by weight of the highly crystalline homopolypropylene resin which is the main component of the transparent resin layer 4.

Example 5-2

In Example 5-2, the decorative sheet 1 included the transparent resin layer 4 prepared by adding 0.2 or 10.0 parts by weight of the triazine-based ultraviolet absorbent liposomes prepared by the above method to 100 parts by weight of a highly crystalline homopolypropylene resin which is the main component of the transparent resin layer 4, and the ink layer 3 which was prepared by adding 0.2 parts by weight of a hindered amine-based photostabilizer (CHIMASSORB 944; manufactured by BASF Corp.) to 100 parts by weight of the ink.

Comparative Example 5-1

In Comparative Example 5-1, the decorative sheet 1 included the transparent resin layer 4 which was prepared by adding 0.2, 1.0, or 10.0 parts by weight of triazine-based ultraviolet absorbent having no vesicles to 100 parts by weight of the highly crystalline homopolypropylene resin which is the main component of the transparent resin layer 4.

Comparative Example 5-2

In Comparative Example 5-2, the decorative sheet 1 included the transparent resin layer 4 to which no organic ultraviolet absorbent was added.

<Evaluations>

For the decorative sheets 1 of Examples 5-1 and 5-2 and Comparative Examples 5-1 and 5-2 obtained by the above processes, the ultraviolet absorbance, haze value, color difference (ΔE), and the change in appearance after the weatherability test were evaluated in the same manner as the first embodiment. The evaluation results obtained are shown in Table 12. The symbols for appearance change represent the same meaning as those of the first embodiment.

TABLE 12

|  | Organic ultraviolet absorbent | | Test result (test time: 4000 hours) | | | |
| --- | --- | --- | --- | --- | --- | --- |
|  | Content [parts by weight] | Vesicle formation | ultraviolet absorbance | Haze value [%] | Color difference (ΔE) | Appearance change |
| Example 5-1 | 0.2 | Yes | 0.08 | 5.01 | 0.85 | ○ |
|  | 1.0 |  | 0.07 | 5.23 | 0.74 | ○ |
|  | 5.0 |  | 0.05 | 5.54 | 0.64 | ◎ |
|  | 10.0 |  | 0.04 | 6.22 | 0.49 | ◎ |

TABLE 12-continued

| | Organic ultraviolet absorbent | | Test result (test time: 4000 hours) | | | |
|---|---|---|---|---|---|---|
| | Content [parts by weight] | Vesicle formation | ultraviolet absorbance | Haze value [%] | Color difference (ΔE) | Appearance change |
| Example 5-2 | 0.2 | Yes | 0.06 | 5.03 | 0.55 | ◎ |
| | 10.0 | | 0.02 | 6.25 | 0.36 | ◎ |
| Comparative Example 5-1 | 0.2 | No | 0.90 | 8.00 | 4.40 | X |
| | 1.0 | | 0.45 | 8.50 | 3.30 | Δ |
| | 10.0 | | 0.22 | 13.50 | 1.35 | ○ |
| Comparative Example 5-2 | — | — | 10.80 | 6.47 | 12.20 | X |

As shown in Table 12, in the decorative sheet 1 of Example 5-1, the values of ultraviolet absorbance and color difference (ΔE) before and after the weatherability test were small for every additive amount sample, which indicates that the decorative sheets 1 had high ultraviolet absorbance and little discoloration occurred due to deterioration. Further, the haze value after the weatherability test showed that the transparent resin layer 4 had maintained transparency required for the decorative sheet after the weatherability test.

Further, as shown in Table 12, in the decorative sheet 1 of Example 5-2, the value of ultraviolet absorbance was small, which indicates that the ultraviolet absorbance remained substantially the same before and after the weatherability test. The haze value after the weatherability test showed that the transparent resin layer 4 had maintained transparency required for the decorative sheet after the weatherability test. In particular, in the decorative sheet 1 of Example 5-2, the value of color difference (ΔE) before and after the weatherability test was small, which indicates that discoloration due to deterioration was significantly small. This can be attributed to the ink layer 3 to which a photostabilizer is added preventing the ink layer from being discolored during the weatherability test.

As shown in Table 12, in the decorative sheet 1 of Comparative Example 5-1, the values of ultraviolet absorbance, haze value after the weatherability test and color difference (ΔE) before and after the weatherability test were large compared with those of the decorative sheet 1 of Examples 5-1 and 5-2. This indicates that the decorative sheet 1 had insufficient ultraviolet absorbance. As seen from the results of appearance change, whitening or cracking occurred after the weatherability test. These results indicate that use of the organic ultraviolet absorbent having no vesicles induced aggregation of the organic ultraviolet absorbent in the resin composition which constituted the transparent resin layer 4, leading to insufficient ultraviolet absorbance that deteriorates the resin composition. In addition to that, it seems that the aggregated ultraviolet absorbent caused poor transparency. As shown in Table 12, in the decorative sheet 1 of Comparative Example 5-2, the values of ultraviolet absorbance and color difference (ΔE) before and after the weatherability test were significantly large, which indicates that the decorative sheet 1 had no ultraviolet absorbance. As seen from the result of appearance change, severe whitening or breakage occurred after the weatherability test. The haze value after the weatherability test was small, which was due to the fact that white turbidity attributed to the additive did not occur since no organic ultraviolet absorbent was added to the transparent resin layer 4.

As seen from the evaluation results, since the decorative sheets 1 of Examples 5-1 and 5-2 includes the transparent resin layer 4 to which the organic ultraviolet absorbent liposomes are added, high ultraviolet absorbance can be exhibited over a long period of time. Accordingly, it was found that this high ultraviolet absorbance can prevent whitening of resin and retain high transparency over a long period of time. Further, it was found that providing the ink layer 3 to which a photostabilizer is added prevents discoloration of the ink which cannot be prevented by the ultraviolet absorbent. Accordingly, the decorative sheet 1 having higher designability over a long period of time can be provided.

REFERENCE EXAMPLES

Decorative sheets other than those described in the present embodiment will be briefly described as reference examples of the present invention.

A case where the method described in PTL 1 is applied to the transparent resin layer in the decorative sheets other than those described in the present embodiment will be described. An olefin-based resin which constitutes the transparent resin layer is typically a non-polar resin material such as polyethylene or polypropylene so that the olefin-based resin has poor miscibility with a polar organic ultraviolet absorbent. A large amount of organic ultraviolet absorbent needs to be added to obtain sufficient weatherability. However, adding a large amount of organic ultraviolet absorbent causes aggregation, which may impair transparency of the transparent resin layer.

In particular, the organic ultraviolet absorbent has a problem that bleeding of the aggregated ultraviolet absorbent may cause stickiness on the surface of the decorative sheet or poor adhesiveness to the top coat layer formed on the transparent resin layer.

The present inventors have diligently studied and found that using the organic ultraviolet absorbent in the form of vesicles can achieve good weatherability with an additive amount similar to the conventional one.

Sixth Embodiment

A decorative sheet of the present embodiment includes a top coat layer as an outermost layer and a transparent resin layer on the underside of the top coat layer, wherein at least one of the top coat layer and the transparent resin layer contain an inorganic ultraviolet absorbent, and it is particularly important that the inorganic ultraviolet absorbent is encapsulated in vesicles having an outer membrane and provided as inorganic ultraviolet absorbent vesicles.

Such inorganic ultraviolet absorbent vesicles have a configuration of small sac-like capsules having a layer structure closed in the form of a spherical shell in which the inorganic ultraviolet absorbent is encapsulated. The inorganic ultraviolet absorbent vesicles have significantly high dispersibility since their outer membranes have a repelling effect, which prevents particle aggregation. By virtue of this effect, the inorganic ultraviolet absorbent can be homogeneously dispersed in the resin composition which constitutes the top coat layer and the transparent resin layer.

Further, in the decorative sheet of the present embodiment, the inorganic ultraviolet absorbent vesicles are preferably inorganic ultraviolet absorbent liposomes having an outer membrane made of phospholipid. The outer membrane made of phospholipid ensures good miscibility with the resin material which is the main component of at least one of the top coat layer and the transparent resin layer. The outer membrane of the liposomes may be made of a mixture of phospholipid and a dispersant.

Further, the additive amount of the inorganic ultraviolet absorbent in the top coat layer is preferably in the range of 0.5 to 20 parts by weight per 100 parts by weight of the resin material which constitutes the main component of the top coat layer, and the additive amount is more preferably in the range of 1 to 10 parts by weight, and still more preferably in the range of 3 to 5 parts by weight. Further, in the transparent resin layer, the additive amount is preferably in the range of 0.01 parts by weight to 5.0 parts by weight per 100 parts by weight of the resin material which constitutes the main component of the transparent resin layer, and more preferably in the range of 0.2 parts by weight to 3.0 parts by weight. The above additive amount of the inorganic ultraviolet absorbent can provide the decorative sheet having particularly good weatherability and designability.

Further, in the decorative sheet of the present embodiment, an embossed pattern is formed on the transparent resin layer, and it is important that the top coat layer is embedded in at least recesses of the embossed pattern. The top coat layer is preferably configured to be embedded in the recesses by wiping when the top coat layer is provided on the surface of the transparent resin layer.

Further, it is important that an underlayer of the transparent resin layer is an ink layer to which at least a photostabilizer is added. As the photostabilizer, a hindered amine-based material is preferably used. Adding the photostabilizer to the ink layer can prevent radicals generated by degradation of the binder resin itself which forms the ink layer or the resin of other layers from reducing the chemical components of the ink pigment to thereby prevent discoloration of the pigment. Accordingly, a vivid color pattern can be maintained over a long period of time.

The inorganic ultraviolet absorbent used in the present embodiment may be the same as that of the first embodiment, and the description thereof is omitted herein.

Further, the method for obtaining the inorganic ultraviolet absorbent vesicles of the present embodiment (vesicle formation method) is the same as that of the third embodiment, and the description thereof is omitted herein. Further, the method for obtaining the inorganic ultraviolet absorbent vesicles having a monolayer outer membrane is also the same as that of the third embodiment, and the description thereof is omitted herein.

Further, the phospholipid constituting the outer membrane of vesicles and other substances constituting the outer membrane of vesicles used in the present embodiment can be the same as those of the first embodiment, and the description thereof is omitted herein.

Specific examples of the decorative sheet of this embodiment will be described with reference to FIG. 2.

FIG. 2 illustrates a specific configuration of the decorative sheet 1 of the present embodiment. The decorative sheet 1 includes a primary film resin sheet, which is the primary film layer 2, having the ink layer 3 applied on the primary film layer 2 and the adhesive layer 7 formed on the ink layer 3, and the transparent resin layer 4 containing the inorganic ultraviolet absorbent vesicles and having a co-extruded adhesive resin layer 4b, and the decorative sheet 1 is obtained by bonding the primary film layer 2 to the transparent resin layer 4 by dry lamination, extrusion lamination, or the like. As shown in FIG. 2, in the decorative sheet 1 of the present embodiment, the top coat layer 5 is embedded in the recesses of the embossed pattern 4a formed on the transparent resin layer 4 by applying the resin composition containing the inorganic ultraviolet absorbent vesicles on the recesses and wiping off the coating liquid by using a squeegee or the like so that the resin composition is embedded only in the recesses. In other words, the decorative sheet 1 of the present embodiment includes the top coat layer 5, the transparent resin layer 4 (adhesive resin layer 4b), the adhesive layer 7, the ink layer 3, and the primary film layer 2, which are laminated in this order from the outermost surface of the decorative sheet 1. Further, in order to improve designability, the embossed pattern 4a is formed on the surface of the transparent resin layer 4 which faces the top coat layer 5, and part of the resin composition which constitutes the top coat layer 5 is embedded in the recesses of the embossed pattern 4a by wiping. The ink layer 3 includes a pattern layer 3a provided on the surface facing the adhesive layer 7 and a solid ink layer 3b.

Further, the configuration of the decorative sheet 1 of the present embodiment may be the same as the configuration of the decorative sheet of the first embodiment.

In addition, the resin compositions and the like which constitute the above layers may be substantially the same as those of the layers described in the first embodiment. Accordingly, the resin compositions and the like which are the same as the first embodiment will not be further described.

In the top coat layer 5 provided on the outermost surface of the decorative sheet 1 of the present embodiment, 0.5 parts by weight to 20 parts by weight of the inorganic ultraviolet absorbent vesicles were added to 100 parts by weight of the resin material which is the main component of the top coat layer 5. In particular, in the present embodiment, the inorganic ultraviolet absorbent vesicles are preferably inorganic ultraviolet absorbent liposomes having an outer membrane made of phospholipid which are obtained by the supercritical reverse phase evaporation method.

In the present embodiment, the top coat layer 5 is provided only in the recesses of the embossed pattern 4a of the transparent resin layer 4. However, the top coat layer 5 may be embedded at least in the recesses of the embossed pattern 4a, and higher weatherability can be maintained at the recesses having a decreased layer thickness by forming the embossed pattern 4a. Further, the top coat layer 5 may be provided to cover the entire surface of the transparent resin layer 4. The decorative sheet 1 having further improved weatherability can be provided by providing the top coat layer 5 that covers the entire surface.

Further, in the present embodiment, the transparent resin layer 4, containing the above resin material as a main component, is made up of the resin composition containing the inorganic ultraviolet absorbent vesicles prepared by the supercritical reverse phase evaporation method. The inorganic ultraviolet absorbent vesicles are preferably contained in the range of 0.1 parts by weight to 5.0 parts by weight to the resin material which is the main component of the transparent resin layer 4. In particular, in the present embodiment, the inorganic ultraviolet absorbent vesicles are inorganic ultraviolet absorbent liposomes having an outer membrane made of phospholipid which are obtained by the supercritical reverse phase evaporation method.

The embossed pattern 4a is formed on the surface of the transparent resin layer 4 to improve designability. The embossed pattern 4a can be formed by a method by which the embossed pattern 4a is formed by applying heat and pressure by using an embossing plate having an embossed pattern before forming the top coat layer 5, or by a method by which the embossed pattern 4a is formed simultaneously with cooling of the sheet by using a cooling roll having an embossed pattern in forming a film using an extruder. Moreover, ink can be filled in the recesses of the embossed pattern 4a to further improve designability.

When non-polar polypropylene is used for the transparent resin layer 4, the adhesive resin layer 4b is preferably provided if the transparent resin layer 4 and the resin layer provided on the underside thereof have low adhesiveness to each other. The adhesive resin layer 4b is preferably a resin such as polypropylene, polyethylene, and acrylic resin modified with acid, and a layer thickness is preferably in the range of 2 μm or more and 20 μm or less in view of adhesiveness and heat resistance. Further, the adhesive resin layer 4b is preferably formed by co-extrusion with the transparent resin layer 4 in view of improvement in adhesion strength.

As shown in FIG. 2, the adhesive layer 7 is provided on the underside of the transparent resin layer 4 to improve adhesiveness between the ink layer 3 on the underside of the adhesive layer 7 and the transparent resin layer 4. An application method of the adhesive layer 7 can be appropriately selected depending on the viscosity of the adhesive and the like, and gravure coating is typically used. After being applied by gravure coating on the ink layer 3 on the surface of the primary film layer 2, the adhesive layer 7 is laminated on the transparent resin layer 4 or the adhesive resin layer 4b. The adhesive layer 7 may not be necessarily provided when the adhesiveness between the transparent resin layer 4 and the ink layer 3 is sufficient.

Further, the ink layer 3 includes the pattern layer 3a made of ink to which at least a photostabilizer is added. Further, the solid ink layer 3b is provided on the underside of the pattern layer 3a to impart concealing properties.

In the present embodiment, the top coat layer 5 and the transparent resin layer 4 are configured to contain the inorganic ultraviolet absorbent vesicles. However, the inorganic ultraviolet absorbent vesicles may also be contained in one of the layers.

In the decorative sheet 1 of the present embodiment, the thickness of the primary film layer 2 is preferably in the range of 20 to 150 μm considering print workability, cost, and the like, the thickness of the adhesive layer 7 is in the range of 1 to 20 μm, the thickness of the transparent resin layer 4 is in the range of 20 to 200 μm, and the thickness of the top coat layer 5 is in the range of 3 to 20 μm, and the total thickness of the decorative sheet 1 is preferably in the range of 45 to 400 μm.

Further, the above solid ink layer 3b has been described in the fourth embodiment, and will not be further described.

Advantageous Effect of the Present Embodiment

As described above, in the decorative sheet 1 of the present embodiment which includes at least one of the top coat layer 5 and the transparent resin layer 4 that contain the inorganic ultraviolet absorbent vesicles, the inorganic ultraviolet absorbent is highly homogeneously dispersed in the resin composition of at least one of the top coat layer 5 and the transparent resin layer 4. As a result, the decorative sheet 1 having higher designability without impairing transparency and ensuring high ultraviolet absorbance with a small content and thus higher weatherability over a long period of time can be provided.

In addition, since high dispersibility of the inorganic ultraviolet absorbent in the resin composition is achieved, the decorative sheet 1 which prevents occurrence of bleeding-out caused by aggregated additives and which has less stickiness on the surface can be provided.

Further, since the inorganic ultraviolet absorbent is provided as inorganic ultraviolet absorbent vesicles in the present embodiment, a desire of adding a large amount of inorganic ultraviolet absorbents can be fulfilled. Accordingly, the decorative sheet 1 having further improved weatherability ability can be provided. In addition, providing the inorganic ultraviolet absorbent vesicles is effective in that flexibility, impact strength, and planar smoothness required for the decorative sheet can be maintained. Further, the inorganic ultraviolet absorbent added to the raw material resin of the top coat layer 5 can prevent thickening so that the recesses of the embossed pattern 4a can be thoroughly filled with the coating liquid. Accordingly, the decorative sheet 1 having higher designability can be achieved.

Moreover, in the present embodiment, the inorganic ultraviolet absorbent can be highly homogeneously dispersed in the resin composition which constitutes at least one of the top coat layer 5 and the transparent resin layer 4 by using the inorganic ultraviolet absorbent liposomes obtained by the supercritical reverse phase evaporation method as the inorganic ultraviolet absorbent vesicles. Accordingly, an improved transparency and ultraviolet absorbance can be achieved.

The more detailed effects of the present embodiment will be described below.

(1) The decorative sheet 1 of the present embodiment is characterized in that the decorative sheet 1 includes the top coat layer 5 as an outermost layer, and the transparent resin layer 4 on the underside of the top coat layer 5, wherein at least one of the top coat layer 5 and the transparent resin layer 4 contains an inorganic ultraviolet absorbent, and the contained inorganic ultraviolet absorbent is encapsulated in vesicles having an outer membrane and provided as inorganic ultraviolet absorbent vesicles.

With this configuration, a decorative sheet having higher designability and higher weatherability over a long period of time can be provided by having at least one of the top coat layer 5 and the transparent resin layer 4 containing the inorganic ultraviolet absorbent vesicles.

(2) In the decorative sheet 1 of the present embodiment, the inorganic ultraviolet absorbent vesicles may have a monolayer outer membrane.

With this configuration, the inorganic ultraviolet absorbent can be homogeneously dispersed in at least one of the top coat layer 5 and the transparent resin layer 4. Accordingly, a decorative sheet having high transparency and thus higher designability and higher weatherability can be provided.

(3) In the decorative sheet 1 of the present embodiment, the inorganic ultraviolet absorbent vesicles may be inorganic ultraviolet absorbent liposomes having an outer membrane made of phospholipid.

With this configuration, good miscibility with the resin composition which is the main component of at least one of the top coat layer 5 and the transparent resin layer 4 can be achieved. Accordingly, vesicles can exhibit high dispersibility in the resin composition which is the main component, and prevent occurrence of secondary aggregation.

(4) In the decorative sheet 1 of the present embodiment, the inorganic ultraviolet absorbent may be zinc oxide.

With this configuration, a decorative sheet with high transparency and higher designability can be provided.

(5) In the decorative sheet 1 of the present embodiment, the embossed pattern 4*a* is formed on the transparent resin layer 4, and at least the recesses of the embossed pattern 4*a* may be filled with the top coat layer 5.

With this configuration, although the transparent resin layer 4 having the embossed pattern 4*a* has a reduced thickness at positions of the recesses of the embossed pattern 4*a*, the recesses are filled with the top coat layer 5. Accordingly, a decorative sheet in which the recesses of the embossed pattern 4*a* have no less weatherability than the remaining portion of the transparent resin layer 4 can be provided.

(6) In the decorative sheet 1 of the present embodiment, an ink layer which contains a photostabilizer may be provided as the underlayer of the transparent resin layer 4.

With this configuration, discoloration of the pigment due to radicals generated by degradation of the binder resin itself of the ink layer 3 or the resin of other layers which reduces the chemical components of the ink pigment can be prevented. Accordingly, a decorative sheet having higher designability over a long period of time can be provided.

EXAMPLES

Specific examples of the decorative sheet 1 of the present embodiment will be described below.

<Preparation of Inorganic Ultraviolet Absorbent Vesicles 1>

First, a method for preparing the inorganic ultraviolet absorbent vesicles used in Examples 6-1 and 6-2 will be described. In preparation of the inorganic ultraviolet absorbent vesicles, a supercritical reverse phase evaporation method was used.

Specifically, 100 parts by weight of 2-propanol, 70 parts by weight of zinc oxide as an inorganic ultraviolet absorbent, and 5 parts by weight of a phosphatidylcholine as the phospholipid were placed in a high-pressure stainless steel vessel kept at 60° C., and sealed therein. Carbon dioxide was injected into the vessel so that the vessel pressure becomes 20 MPa at a supercritical state. 100 parts by weight of ion-exchanged water was injected while vigorously stirring the vessel contents. After stirring for 15 minutes at constant temperature and the pressure, carbon dioxide was exhausted for returning to atmospheric pressure. Thus, zinc oxide liposomes having a monolayer outer membrane made of phospholipid were obtained.

Example 6-1

In Example 6-1, the decorative sheet 1 included the transparent resin layer 4 which contains zinc oxide liposomes prepared by the method described in the above <Preparation of Inorganic Ultraviolet Absorbent Vesicles 1>.

Specifically, a resin prepared by adding 0.05 parts by weight of a hindered phenol-based antioxidant (IRGANOX 1010; manufactured by BASF Corp.), 0.05, 0.1, 0.2, 3.0, 5.0, or 15.0 parts by weight of zinc oxide liposomes, and 0.2 parts by weight of a hindered amine-based photostabilizer (CHIMASSORB 944; manufactured by BASF Corp.) to a homopolypropylene resin was melt-extruded by using an extruder to thereby form the sheet-shaped transparent resin layer 4 as an 80 µm-thick transparent highly crystalline polypropylene sheet. Corona treatment was applied on both surfaces of the transparent resin layer 4 thus obtained so that the wetting tension of the sheet surface becomes 40 dyn/cm or higher. On the other hand, a pattern was printed on one of the surfaces of a 70 µm-thick polyethylene sheet having concealing properties (primary film layer 2) by gravure printing using a two-part type urethane ink (V180; manufactured by Toyo Ink Co., Ltd.) to which a hindered amine-based photostabilizer (CHIMASSORB 944; manufactured by BASF Corp.) in the ratio of 0.5 parts by weight of the amount of binder resin of the above ink was added to thereby provide the pattern layer 3*a*. Further, primer coating was applied on the other of the surfaces of the primary film layer 2. After that, the transparent resin layer 4 was bonded to the surface of the pattern layer 3*a* of the primary film layer 2 by a dry lamination method via a dry lamination adhesive (TAKELAC A540; manufactured by Mitsui Chemicals, Inc., applied amount 2 g/m2) which is the adhesive layer 7. After the embossed pattern 4*a* was formed on the surface of the transparent resin layer 4 of the laminated sheet, a two-part type urethane top coat (W184; manufactured by DIC Graphics Corp.) was applied at the applied amount 3 g/m2 to thereby form the top coat layer 5. Thus, the decorative sheet 1 of Example 6-1 having a total thickness of 154 µm was obtained.

Example 6-2

In Example 6-2, the decorative sheet 1 included the top coat layer 5 and the transparent resin layer 4 each of which contains zinc oxide liposomes prepared by the method described in the above <Preparation of Inorganic Ultraviolet Absorbent Vesicles 1>.

Specifically, a resin prepared by adding 0.05 parts by weight of a hindered phenol-based antioxidant (IRGANOX 1010; manufactured by BASF Corp.) and 0.2 parts by weight of zinc oxide liposomes, and 0.2 parts by weight of a hindered amine-based photostabilizer (CHIMASSORB 944; manufactured by BASF Corp.) to a homopolypropylene resin was melt-extruded by using an extruder to thereby form the sheet-shaped transparent resin layer 4 as an 80 µm-thick transparent highly crystalline polypropylene sheet. Corona treatment was applied on both surfaces of the transparent resin layer 4 thus obtained so that the wetting tension of the sheet surface becomes 40 dyn/cm or higher. On the other hand, a pattern was printed on one of the surfaces of a 70 µm-thick polyethylene sheet having concealing properties (primary film layer 2) by gravure printing using a two-part type urethane ink (V180; manufactured by Toyo Ink Co., Ltd.) to which a hindered amine-based photostabilizer (CHIMASSORB 944; manufactured by BASF Corp.) in the ratio of 0.5 parts by weight of the amount of binder resin of the above ink was added to thereby provide the pattern layer 3*a*. Further, primer coating was applied on the other of the surfaces of the primary film layer 2. After that, the transparent resin layer 4 was bonded to the surface of the pattern layer 3*a* of the primary film layer 2 by a dry lamination method via a dry lamination adhesive (TAKELAC A540; manufactured by Mitsui Chemicals, Inc., applied amount 2 g/m2) which is the adhesive layer 7. After the embossed pattern 4*a* was formed on the surface of the transparent resin layer 4 of the laminated sheet, a top coat coating liquid prepared by adding zinc oxide liposomes of 0.1 parts by weight of zinc oxide per 100 parts by weight of a two-part type urethane top coat (W184; manufactured by DIC Graphics Corp.) was applied at the applied amount 3 g/m2 to thereby form the top coat layer 5. Further, the top coat coating liquid is embedded in the recesses of the embossed pattern 4a by wiping. Thus, the decorative sheet having a total thickness of 156 μm was obtained.

Comparative Example 6-1

In Comparative Example 6-1, the decorative sheet included the transparent resin layer 4 which contained zinc oxide as an inorganic ultraviolet absorbent having no vesicles.

Specifically, the decorative sheet was prepared in the same manner as that of Example 6-1 except that a resin prepared by adding 0.05 parts by weight of a hindered phenol-based antioxidant (IRGANOX 1010; manufactured by BASF Corp.), 0.2 parts by weight of zinc oxide, and 0.2 parts by weight of a hindered amine-based photostabilizer (CHIMASSORB 944; manufactured by BASF Corp.) to a homopolypropylene resin was melt-extruded by using an extruder to thereby form the sheet-shaped transparent resin layer 4 as an 80 μm-thick transparent highly crystalline polypropylene sheet.

Comparative Example 6-2

In Comparative Example 6-2, the decorative sheet included the transparent resin layer 4 which contained an inorganic ultraviolet absorbent which was nanoized by a solid phase method.

Specifically, zinc oxide nanoized by a solid phase method was used as an inorganic ultraviolet absorbent. Specifically, 100 g of isopropanol and 50 g of zinc oxide were processed by a bead mill for 60 minutes using stabilized zirconia beads of 30 μm into nanoized zinc oxide having an average particle diameter in the range of approximately 1 nm to 150 nm. The decorative sheet was prepared in the same manner as that of Example 6-1 except that a resin prepared by adding 0.05 parts by weight of a hindered phenol-based antioxidant (IRGANOX 1010; manufactured by BASF Corp.), 0.2 parts by weight of zinc oxide nanoized by the above solid phase method, and 0.2 parts by weight of a hindered amine-based photostabilizer (CHIMASSORB 944; manufactured by BASF Corp.) to a homopolypropylene resin was melt-extruded by using an extruder to thereby form the sheet-shaped transparent resin layer 4 as an 80 μm-thick transparent highly crystalline polypropylene sheet.

Comparative Example 6-3

In Comparative Example 6-3, the decorative sheet included the transparent resin layer 4 which contained benzotriazole-based material as an ultraviolet absorbent having no vesicles.

Specifically, the decorative sheet was prepared in the same manner as that of Example 6-1 except that a resin prepared by adding 0.05 parts by weight of a hindered phenol-based antioxidant (IRGANOX 1010; manufactured by BASF Corp.), 0.2 parts by weight of benzotriazole-based ultraviolet absorbent (manufactured by BASF Corp.), and 0.2 parts by weight of a hindered amine-based photostabilizer (CHIMASSORB 944; manufactured by BASF Corp.) to a homopolypropylene resin was melt-extruded by using an extruder to thereby form the sheet-shaped transparent resin layer 4 as an 80 μm-thick transparent highly crystalline polypropylene sheet.

<Evaluations>

For the decorative sheets 1 of Examples 6-1 and 6-2 and Comparative Examples 6-1 to 6-3 obtained by the above processes, the ultraviolet absorbance, haze value, color difference (ΔE), and the change in appearance after the weatherability test were evaluated in the same manner as the first embodiment. The evaluation results obtained are shown in Table 13. The symbols for appearance change represent the same meaning as those of the first embodiment.

TABLE 13

| | Processing method | Type of additive | Ultraviolet absorbent content | | Top coat layer + transparent resin (transparent layer) | | Decorative sheet | |
|---|---|---|---|---|---|---|---|---|
| | | | Top coat layer [parts by weight] | Transparent resin layer [parts by weight] | ultraviolet absorbance | Haze value [%] | Color difference (ΔE) | Appearance change |
| Example 6-1 | Vesicle formation | Inorganic | — | 0.05 | 1.12 | 6.40 | 10.80 | Δ |
| | | | | 0.1 | 0.10 | 8.00 | 0.91 | ○ |
| | | | | 0.2 | 0.06 | 8.2 | 0.8 | ○ |
| | | | | 3.0 | 0.04 | 10.10 | 0.63 | ⊙ |
| | | | | 5.0 | 0.04 | 10.70 | 0.61 | ○ |
| | | | | 15.0 | 0.01 | 25.2 | 0.59 | ○ |
| Example 6-2 | Vesicle formation | Inorganic | 0.1 | 0.2 | 0.04 | 8.5 | 0.7 | ○ |
| Comparative Example 6-1 | — | Inorganic | — | 0.2 | 0.21 | 24.3 | 1.5 | Δ |
| Comparative Example 6-2 | Solid phase method | Inorganic | — | 0.2 | 0.15 | 13.5 | 1.3 | Δ |
| Comparative Example 6-3 | — | Organic | — | 0.2 | 0.95 | 7.9 | 4.7 | X |

As shown in Table 13, in the decorative sheet 1 of Example 6-1, the values of ultraviolet absorbance for the decorative sheet 1 having the transparent resin layer 4 to which 0.1 parts by weight to 5.0 parts by weight of zinc oxide liposomes were added was significantly small, which indicates that the ultraviolet absorbance remained substantially the same before and after the weatherability test. Further, the haze value after the weatherability test showed that high transparency was maintained. The value of color difference (ΔE) before and after the weatherability test showed little change in color. Further, in the evaluation of visual appearance change, a favorable result was obtained. Accordingly, it was found that the decorative sheet 1 had higher weatherability and higher designability over a long period of time.

However, for the decorative sheet 1 of Example 6-1 which included the transparent resin layer 4 having zinc oxide liposome content of 0.05 parts by weight, the haze value was small, and the values of ultraviolet absorbance and color difference (ΔE) before and after the weatherability test were large. These results indicate that white turbidity of resin composition due to the additive was small since the additive amount of zinc oxide liposomes was significantly small, whereas deterioration or discoloration of the resin material occurred since the ultraviolet absorbance was insufficient. Therefore, the decorative sheet 1 which includes the transparent resin layer 4 to which 0.05 parts by weight of zinc oxide liposomes is added has significantly higher designability, and can be applied to an indoor application which does not require weatherability ability as high as an outdoor application.

Further, for the decorative sheet 1 of Example 6-1 which includes the transparent resin layer 4 having the additive amount of zinc oxide liposomes of 15.0 parts by weight, the haze value was large, and the values of ultraviolet absorbance and color difference (ΔE) before and after the weatherability test were small. These results indicate that white turbidity of resin composition due to the additive was large since the additive amount of zinc oxide liposomes was excessively large, whereas deterioration of the resin material was reduced since high ultraviolet absorbance was obtained. Therefore, the decorative sheet 1 which includes the transparent resin layer 4 to which 15.0 parts by weight of zinc oxide liposomes is added can be applied to an application which does not require high transparency of the transparent resin layer 4.

Based on the results of Example 6-1, it was found that zinc oxide liposome content in the transparent resin layer 4 was preferably in the range of 0.1 parts by weight to 5.0 parts by weight.

As shown in Table 13, in the decorative sheets 1 of Example 6-2, the value of ultraviolet absorbance for the decorative sheet 1 having the top coat layer 5 and the transparent resin layer 4 to which zinc oxide liposomes were added was significantly small, which indicates that the ultraviolet absorbance remained substantially the same before and after the weatherability test. Further, the haze value after the weatherability test showed that high transparency was maintained. The value of color difference (ΔE) before and after the weatherability test showed little change in color. Further, in the evaluation of visual appearance change, a favorable result was obtained. As seen from the evaluation results, the transparent layer which includes the top coat layer 5 and the transparent resin layer 4 can maintain high ultraviolet absorbance over a long period of time. Accordingly, it was found that this high ultraviolet absorbance can prevent discoloration or whitening of resin and retain high transparency over a long period of time.

In the decorative sheets 1 of Comparative Examples 6-1 to 6-3, the value of ultraviolet absorbance was large, which showed difference in the ultraviolet absorbance before and after the weatherability test. Further, except for Comparative Example 6-3 in which an organic ultraviolet absorbent was used, the haze value was large, which showed that transparency was impaired. From the value of color difference (ΔE) before and after the weatherability test and the evaluation result of visual appearance change after the weatherability test, whitening or cracking was observed. Accordingly, it was found that the decorative sheets 1 of Comparative Examples 6-1 to 6-3 had poor weatherability.

As seen from the above results, the decorative sheets 1 of Examples 6-1 and 6-2 had higher weatherability and the transparency required for decorative sheets.

Based on the evaluation results of the decorative sheets 1 of Examples 6-1 and 6-2 and Comparative Examples 6-1 to 6-3, it was found that the decorative sheet 1 which includes at least one of the top coat layer 5 and the transparent resin layer 4 which contain zinc oxide liposomes as inorganic ultraviolet absorbent vesicles can be provided as the decorative sheet having higher weatherability over a long period of time.

<Preparation of Inorganic Ultraviolet Absorbent Vesicles 2>

A method for preparing the inorganic ultraviolet absorbent vesicles used in Examples 6-3 and 6-4 will be described. In preparation of the inorganic ultraviolet absorbent vesicles, a supercritical reverse phase evaporation method was used.

Specifically, 100 parts by weight of hexane, 70 parts by weight of zinc oxide (average particle diameter of 20 nm) as an inorganic ultraviolet absorbent, and 5 parts by weight of a phosphatidylcholine as the phospholipid were placed in a high-pressure stainless steel vessel kept at 60° C., and sealed therein. Carbon dioxide was injected into the vessel so that the vessel pressure becomes 20 MPa at a supercritical state. 100 parts by weight of ethyl acetate was injected while vigorously stirring the vessel contents. After stirring for 15 minutes at constant temperature and the pressure, carbon dioxide was exhausted for returning to atmospheric pressure. Thus, zinc oxide liposomes having a monolayer outer membrane made of phospholipid were obtained.

Example 6-3

In Example 6-3, the decorative sheet 1 included the top coat layer 5 to which zinc oxide liposomes prepared by the method described in the above <Preparation of Inorganic Ultraviolet Absorbent Vesicles 2> were added. The additive amounts of zinc oxide liposomes were 0.05, 0.54, 1.07, 5.35, 10.70, 21.40, and 42.80 parts by weight per 100 parts by weight of the resin material which was the main component of the top coat layer 5. Of these additive amounts, the additive amounts of zinc oxide were 0.05, 0.5, 1.0, 5.0, 10.0, 20.0, and 40.0 parts by weight.

Specifically, a resin prepared by adding 0.05 parts by weight of a hindered phenol-based antioxidant (IRGANOX 1010; manufactured by BASF Corp.) and 0.2 parts by weight of a hindered amine-based photostabilizer (CHIMASSORB 944; manufactured by BASF Corp.) to a highly crystalline homopolypropylene resin was melt-extruded by using an extruder to thereby form the sheet-shaped transparent resin layer 4 as an 80 μm-thick transparent highly crystalline polypropylene sheet. Corona treatment was applied on both surfaces of the transparent resin layer 4 thus obtained so that the wetting tension of the sheet surface becomes 40 dyn/cm or higher. On the other hand, a pattern was printed on one of the surfaces of a 70 μm-thick polyethylene sheet having concealing properties (primary film layer 2) by gravure printing using a two-part type urethane ink (V180; manufactured by Toyo Ink Co., Ltd.) to thereby provide the pattern layer 3a of 3 μm thickness. Further, primer coating of 1 μm thickness was applied on the other of the surfaces of the primary film layer 2. After that, the transparent resin layer 4 was bonded to the surface of the pattern layer 3a of the primary film layer 2 by a dry lamination method via a 3 μm-thick dry lamination adhesive (TAKELAC A540; manufactured by Mitsui Chemicals, Inc., applied amount 2 g/m2). Thus, a 157 μm-thick laminate resin sheet made up of the primary film layer 2, the pattern layer 3a, the dry lamination adhesive (adhesive layer 7), the primer coating, and the transparent resin layer 4 was obtained. The embossed pattern 4a was formed on the surface of the transparent resin layer 4 of the laminate resin sheet. Then, 0.05, 0.54, 1.07, 5.35, 10.70, 21.40 or 42.80 parts by weight of the zinc oxide liposomes obtained by the above supercritical reverse phase evaporation method were added to 100 parts by weight of a two-part type urethane top coat (W184; manufactured by DIC Graphics Corp.) and the mixture was applied at the thickness of 3 g/m2 to thereby form the top coat layer 5. Thus, the decorative sheet 1 of Example 6-3 having a total thickness of 160 μm was obtained.

Example 6-4

In Example 6-4, the decorative sheet 1 included the top coat layer 5 to which zinc oxide liposomes prepared by the method described in the above <Preparation of Inorganic Ultraviolet Absorbent Vesicles 2> were added, and the pattern layer 3a to which a photostabilizer was added. The additive amounts of zinc oxide liposomes were 1.07, 5.35, and 10.70 parts by weight per 100 parts by weight of the resin material which was the main component of the top coat layer 5. Of these additive amounts, the additive amounts of zinc oxide were 1.0, 5.0, and 10.0 parts by weight.

Specifically, the decorative sheet 1 was prepared in the same manner as that of Example 6-3 except that the pattern layer 3a was formed by using a two-part type urethane ink (V180; manufactured by Toyo Ink Co., Ltd.) to which a hindered amine-based photostabilizer (CHIMASSORB 944; manufactured by BASF Corp.) in the ratio of 0.5 parts by weight of the amount of binder resin of the above ink was added.

Comparative Example 6-4

In Comparative Example 6-4, the decorative sheet 1 included the top coat layer 5 which contained zinc oxide having no vesicles. The additive amount of zinc oxide was 0.5 or 1.0 parts by weight per 100 parts by weight of the resin material which was the main component of the top coat layer 5. Except that the top coat layer 5 had the above configuration, the configuration was the same as that of the decorative sheet 1 described in Example 6-3.

Comparative Example 6-5

In Comparative Example 6-5, the decorative sheet 1 included the top coat layer 5 to which nanoized zinc oxide which was nanoized by a solid phase method was added. The additive amount of the nanoized zinc oxide was 0.5 or 1.0 parts by weight per 100 parts by weight of the resin material which was the main component of the top coat layer 5. Except that the top coat layer 5 had the above configuration, the configuration was the same as that of the decorative sheet 1 described in Example 6-3.

Comparative Example 6-6

In Comparative Example 6-6, the decorative sheet 1 included the top coat layer 5 to which a triazine ultraviolet absorbent which was an organic ultraviolet absorbent was added. The additive amount of triazine-based ultraviolet absorbent was 0.5 parts by weight per 100 parts by weight of the resin material which was the main component of the top coat layer 5. Except that the top coat layer 5 had the above configuration, the configuration was the same as that of the decorative sheet 1 described in Example 6-3.

Comparative Example 6-7

In Comparative Example 6-7, the decorative sheet 1 included the top coat layer 5 and the transparent resin layer 4 to which no inorganic ultraviolet absorbent was added. The remaining configuration was the same as that of the decorative sheet 1 described in Example 6-3.

For the decorative sheets 1 of Examples 6-3 and 6-4 and Comparative Examples 6-4 to 6-7, calculation of the ultraviolet absorbance, measurement of the haze value after the weatherability test, calculation of the color difference (ΔE) before and after the weatherability test, and appearance change after the weatherability test were evaluated in the same manner as Examples 6-1 and 6-2 and Comparative Examples 6-1 to 6-3 (that is, the same as the first embodiment). Further, the symbols for appearance change represent the same meaning as those of Examples 6-1 and 6-2 and Comparative Examples 6-1 to 6-3 (that is, the same as the first embodiment). The evaluation results obtained are shown in Table 14.

TABLE 14

| | Vesicle content [parts by weight] | Ultraviolet absorbent content | | Test time: 4000 hours | | | |
|---|---|---|---|---|---|---|---|
| | | Organic [parts by weight] | Inorganic [parts by weight] | ultraviolet absorbance | Haze value [%] | Color difference (ΔE) | Appearance change |
| Example 6-3 | 0.05 | — | (0.05) | 0.82 | 4.32 | 6.40 | Δ |
| | 0.54 | — | (0.50) | 0.29 | 5.00 | 1.34 | ○ |
| | 1.07 | — | (1.00) | 0.27 | 7.11 | 0.95 | ○ |
| | 5.35 | — | (5.00) | 0.23 | 8.22 | 0.90 | ◎ |
| | 10.70 | — | (10.00) | 0.19 | 8.75 | 0.73 | ○ |
| | 21.40 | — | (20.00) | 0.15 | 11.35 | 0.68 | ○ |
| | 42.80 | — | (40.00) | 0.03 | 17.10 | 0.63 | ○ |
| Example 6-4 | 1.07 | — | (1.00) | 0.18 | 6.98 | 0.48 | ◎ |
| | 5.35 | — | (5.00) | 0.12 | 8.03 | 0.45 | ◎ |
| | 10.70 | — | (10.00) | 0.08 | 8.56 | 0.37 | ◎ |
| Comparative Example 6-4 | — | — | 0.50 | 0.20 | 26.40 | 1.44 | Δ |
| | — | — | 1.00 | 0.19 | 30.22 | 1.41 | X |

TABLE 14-continued

| | Vesicle content [parts by weight] | Ultraviolet absorbent content | | Test time: 4000 hours | | | |
|---|---|---|---|---|---|---|---|
| | | Organic [parts by weight] | Inorganic [parts by weight] | ultraviolet absorbance | Haze value [%] | Color difference (ΔE) | Appearance change |
| Comparative Example 6-5 | — | — | 0.50 | 0.17 | 18.31 | 1.38 | Δ |
| | — | — | 1.00 | 0.15 | 22.96 | 1.27 | X |
| Comparative Example 6-6 | — | 0.50 | — | 0.80 | 8.20 | 4.20 | Δ |
| Comparative Example 6-7 | — | — | — | 10.80 | 6.47 | 12.20 | X |

As shown in Table 14, in the decorative sheet 1 of Example 6-3, the values of ultraviolet absorbance and color difference (ΔE) before and after the weatherability test were small for the decorative sheet 1 having the top coat layer 5 to which 0.54 parts by weight to 21.40 parts by weight of zinc oxide liposomes were added. Further, the haze value after the weatherability test was under 15%, which indicates that the decorative sheet 1 maintained high transparency over a long period of time. Of the above additive amounts of zinc oxide liposomes, the zinc oxide was 0.50 parts by weight to 20.00 parts by weight.

However, for the decorative sheet 1 of Example 6-3 which included the top coat layer 5 having the additive amount of zinc oxide liposome of 0.05 parts by weight, the haze value was small, and the values of ultraviolet absorbance and color difference (ΔE) before and after the weatherability test were large. These results indicate that white turbidity of resin composition due to the additive was small since the additive amount of zinc oxide liposomes was significantly small, whereas deterioration or discoloration of the resin material occurred since the ultraviolet absorbance was insufficient. Therefore, the decorative sheet 1 which includes the top coat layer 5 to which 0.05 parts by weight of zinc oxide liposomes is added to 100 parts by weight of the resin material which is the main component has significantly higher designability, and can be applied to an indoor application which does not require weatherability ability as high as an outdoor application. Of the above additive amounts of zinc oxide liposomes, the zinc oxide was 0.05 parts by weight. The amounts of the other components were minute, and not included in significant figures.

Further, for the decorative sheet 1 of Example 6-3 which includes the top coat layer 5 having the additive amount of zinc oxide liposomes of 42.80 parts by weight, the haze value was large, and the values of ultraviolet absorbance and color difference (ΔE) before and after the weatherability test were small. These results indicate that white turbidity of resin composition due to the additive was large since the additive amount of zinc oxide liposomes was excessively large, whereas deterioration of the resin material was reduced since high ultraviolet absorbance was obtained. Therefore, the decorative sheet 1 which includes the top coat layer 5 to which 42.80 parts by weight of zinc oxide liposomes is added to 100 parts by weight of the resin material which is the main component can be applied to an application which does not require high transparency of the top coat layer 5. Of the above additive amounts of zinc oxide liposomes, the zinc oxide was 40.00 parts by weight.

Based on the results of Example 6-3, it was found that the additive amount of zinc oxide liposome in the top coat layer 5 was preferably in the range of 0.54 parts by weight to 21.40 parts by weight. Of the above additive amounts of zinc oxide liposomes, the zinc oxide was 0.5 parts by weight to 20.00 parts by weight.

As shown in Table 14, in the decorative sheet 1 of Example 6-4, the decorative sheet 1 included the top coat layer 5 to which zinc oxide liposomes were added and the pattern layer 3a in which a photostabilizer was contained. As the additive amounts of zinc oxide liposomes increased, the value of ultraviolet absorbance decreased. Further, the haze value after the weatherability test was small for every additive amount, which indicated that high transparency was maintained. The value of color difference (ΔE) before and after the weatherability test showed little change in color. Further, in the evaluation of visual appearance change, a favorable result was obtained. As seen from the evaluation results, in the decorative sheets 1 of Examples 6-3 and 6-4, it was found that high ultraviolet absorbance can be exhibited over a longer period of time in proportion to an increase in the additive amount of zinc oxide liposomes, and this high ultraviolet absorbance can prevent discoloration or whitening of resin and retain high transparency over a long period of time. Further, in the decorative sheet 1 of Example 6-4 which included the pattern layer 3a to which a photostabilizer was added, the value of color difference (ΔE) before and after the weatherability test was significantly small compared with the decorative sheet 1 of Example 6-3 which included the top coat layer 5 having the additive amount of zinc oxide liposomes of 1.07 parts by weight to 10.70 parts by weight. It was found that the photostabilizer prevents discoloration of the pattern layer 3a, and the decorative sheet can maintain vivid design over a longer period of time.

Further, as shown in Table 14, in the decorative sheets 1 of Comparative examples 6-4 and 6-5, the value of ultraviolet absorbance was small, which indicates that the ultraviolet absorbance during the test time was not changed. However, the haze value after the weatherability test was large, which indicated the transparency of the transparent layer was poor. From the value of color difference (ΔE) after the weatherability test and the evaluation result of visual appearance change, whitening or cracking was observed. As seen from these results, it was found that the decorative sheets 1 of Comparative Examples 6-4 and 6-5 had poor designability and weatherability.

Further, as shown in Table 14, in the decorative sheet 1 of Comparative Example 6-6, the value of ultraviolet absorbance was large. Further, from the value of color difference (ΔE) after the weatherability test and the evaluation result of visual appearance change, it was found that the decorative sheet 1 had poor weatherability. The haze value was small, which indicated high transparency. As seen from these results, it was found that an organic ultraviolet absorbent can maintain high transparency of the transparent layer, whereas ultraviolet absorbance over a longer period of time was poor.

As shown in Table 14, in the decorative sheet 1 of Comparative Example 6-7, the haze value after the weatherability test was small, which indicated that the transparent layer made up of the top coat layer 5 and the transparent resin layer 4 had high transparency. However, the value of ultraviolet absorbance was significantly large. Further, from the value of color difference (ΔE) after the weatherability test and the evaluation result of visual appearance change, severe discoloration of the pattern layer 3a and the like disposed under the transparent layer was observed. As seen from these results, it was found that the decorative sheet 1 in which no ultraviolet absorbent was added to the top coat layer 5 and the transparent resin layer 4 had poor weatherability.

Based on the evaluation results of the decorative sheets 1 of Examples 6-3 and 6-4 and Comparative Examples 6-4 to 6-7, it was found that the decorative sheet 1 which included the top coat layer 5 to which 0.54 parts by weight to 21.40 parts by weight of zinc oxide liposomes as inorganic ultraviolet absorbent vesicles were added to 100 parts by weight of the resin material which is the main component can be provided as the decorative sheet having higher weatherability over a longer period of time as well as higher designability.

REFERENCE EXAMPLES

Decorative sheets other than those described in the present embodiment will be briefly described as reference examples of the present invention.

When an organic ultraviolet absorbent such as a triazine-based ultraviolet absorbent is added to the top coat layer 5 in decorative sheets other than those described in the present embodiment, the transparency of the substrate resin can be maintained, whereas temporal change cannot be avoided, which has posed a problem in sustainability of ultraviolet absorbance over a long period of time. If an inorganic ultraviolet absorbent which causes a small temporal change is used to avoid the above problem, opaque particles aggregate and transparency decreases, which may impair the designability of the decorative sheet.

In addition, if the formulation amount of the ultraviolet absorbent is increased to improve weatherability, aggregation of the ultraviolet absorbent in the resin causes bleeding-out, leading to stickiness on the sheet surface and decrease in adhesiveness.

In addition, when an embossed pattern is formed to improve designability of the decorative sheet, recessed portions of the embossed pattern have a reduced thickness compared to the remaining portion, which causes particularly reduced weatherability. As a result, deterioration may start from these recesses, leading to whitening and cracking.

The present inventors have diligently studied and found that the dispersibility of the inorganic ultraviolet absorbent in the resin material can be drastically improved by containing the inorganic ultraviolet absorbent in the form of vesicles in which the inorganic ultraviolet absorbent is encapsulated and thus transparency required for the decorative sheets can be achieved.

Examples of the decorative sheet 1 of the present invention are not limited to the above-described embodiments and examples, and various modifications may be made within a range that does not impair the spirit of the present invention.

REFERENCE SIGNS LIST

1 Decorative sheet; 2 Primary film layer; 3 Ink layer; 3a Pattern layer; 3b Solid ink layer; 4 Transparent resin layer; 4a Embossed pattern; 4b Adhesive resin layer; 5 Top coat layer; 6 Primer layer; 7 Adhesive layer; 8 Concealing layer; B Substrate

What is claimed is:

1. A decorative sheet, comprising:
   a top coat layer, which comprises a resin composition comprising an urethane-based resin as a main component, as an outermost layer; and
   a transparent resin layer, which comprises a resin composition comprising a transparent highly crystalline polypropylene as a main component, as an underlayer of the top coat layer,
   wherein an organic ultraviolet absorbent and an inorganic ultraviolet absorbent are added to at least one of the top coat layer and the transparent resin layer, and
   wherein the organic ultraviolet absorbent and the inorganic ultraviolet absorbent are each encapsulated in vesicles having a monolayer outer membrane comprising a phospholipid and a dispersant and provided as organic ultraviolet absorbent vesicles and inorganic ultraviolet absorbent vesicles, respectively, wherein when the organic ultraviolet absorbent vesicles and the inorganic ultraviolet absorbent vesicles are added to the top coat layer, an amount of the organic ultraviolet absorbent vesicles is 3 to 5 parts by weight per 100 parts by weight of the resin composition of the top coat layer and an amount of the inorganic ultraviolet absorbent vesicles is 3 to 5 parts by weight per 100 parts by weight of the resin composition of the top coat layer; wherein when the organic ultraviolet absorbent vesicles and the inorganic ultraviolet absorbent vesicles are added to the transparent resin layer, an amount of the organic ultraviolet absorbent vesicles is 0.2 to 3 parts by weight per 100 parts by weight of the resin composition of the transparent resin layer and an amount of the inorganic ultraviolet absorbent vesicles is 0.2 to 3 parts by weight per 100 parts by weight of the resin composition of the transparent resin layer, wherein the organic ultraviolet absorbent is selected from the group consisting of benzotriazole, triazine, benzophenone, benzoate, and cyanoacrylate-based absorbents and the inorganic ultraviolet absorbent is zinc oxide.

2. A decorative sheet, comprising:
   a top coat layer, which comprises a resin composition comprising an urethane-based resin as a main component, as an outermost layer; and
   a transparent resin layer, which comprises a resin composition comprising a transparent highly crystalline polypropylene as a main component, as an underlayer of the top coat layer,
   wherein an organic ultraviolet absorbent and an inorganic ultraviolet absorbent are added to at least one of the top coat layer and the transparent resin layer, and
   wherein the organic ultraviolet absorbent and the inorganic ultraviolet absorbent are together encapsulated in each vesicle having a monolayer outer membrane comprising a phospholipid and a dispersant and provided as organic-inorganic ultraviolet absorbent vesicles, wherein when the organic-inorganic ultraviolet absorbent vesicles are added to the top coat layer, an amount of the organic ultraviolet absorbent in the top coat layer is 3 to 5 parts by weight to 100 parts by weight of the resin composition of the top coat layer and an amount of the inorganic ultraviolet absorbent in the top coat layer is 3 to 5 parts by weight to 100 parts by weight of the resin composition of the top coat layer; wherein when the organic-inorganic ultraviolet absorbent vesicles are added to the transparent resin layer, an amount of the organic ultraviolet absorbent in the transparent resin layer is 0.2 to 3 parts by weight to 100 parts by weight of the resin composition of the transparent resin layer and an amount of the inorganic ultraviolet absorbent in the transparent resin layer is 0.2 to 3 parts by weight to 100 parts by weight of the resin composition of the transparent resin layer, wherein the organic ultraviolet absorbent is selected from the group consisting of benzotriazole, triazine, benzophenone, benzoate, and cyanoacrylate-based absorbents and the inorganic ultraviolet absorbent is zinc oxide.

3. A decorative sheet, comprising:
a top coat layer, which comprises a resin composition comprising an urethane-based resin as a main component, as an outermost layer; and
a transparent resin layer, which comprises a resin composition comprising a transparent highly crystalline polypropylene as a main component, as an underlayer of the top coat layer,
wherein one of the top coat layer and the transparent resin layer, contains an organic ultraviolet absorbent and an inorganic ultraviolet absorbent, and
wherein one of the organic ultraviolet absorbent and the inorganic ultraviolet absorbent is encapsulated in vesicles having a monolayer outer membrane comprising a phospholipid and a dispersant and provided as organic ultraviolet absorbent vesicles or inorganic ultraviolet absorbent vesicles, wherein when the organic ultraviolet absorbent vesicles are added to the top coat layer, an amount of the organic ultraviolet absorbent vesicles is 3 to 5 parts by weight per 100 parts by weight of the resin composition of the top coat layer; when the inorganic ultraviolet absorbent vesicle are added to the top coat layer, an amount of the inorganic ultraviolet absorbent vesicles is 3 to 5 parts by weight per 100 parts by weight of the resin composition of the top coat layer; when the organic ultraviolet absorbent vesicles are added to the transparent resin layer, an amount of the organic ultraviolet absorbent vesicles is 0.2 to 3 parts by weight per 100 parts by weight of the resin composition of the transparent resin layer; when the inorganic ultraviolet absorbent vesicle are added to the transparent resin layer, an amount of the inorganic ultraviolet absorbent vesicles is 0.2 to 3 parts by weight per 100 parts by weight of the resin composition of the transparent resin layer, wherein the organic ultraviolet absorbent is selected from the group consisting of benzotriazole, triazine, benzophenone, benzoate, and cyanoacrylate-based absorbents and the inorganic ultraviolet absorbent is zinc oxide.

4. The decorative sheet of claim 3, wherein the other of the top coat layer and the transparent resin layer contains at least one of the organic ultraviolet absorbent and the inorganic ultraviolet absorbent, and one of the ultraviolet absorbents contained is provided as organic ultraviolet absorbent vesicles or inorganic ultraviolet absorbent vesicles encapsulated in vesicles having a monolayer outer membrane.

5. The decorative sheet of claim 1, wherein an embossed pattern is formed on a surface of the transparent resin layer which faces the top coat layer, and wherein the embossed pattern has recesses which are filled with the top coat layer.

6. A decorative sheet, comprising:
a top coat layer, which comprises a resin composition comprising an urethane-based resin as a main component, as an outermost layer; and
a transparent resin layer, which comprises a resin composition comprising a transparent highly crystalline polypropylene as a main component, on the underside of the top coat layer, wherein
the top coat layer and the transparent resin layer contain an organic ultraviolet absorbent, and
the organic ultraviolet absorbent is encapsulated in vesicles having an outer membrane comprising a dispersant and a phospholipid and provided as organic ultraviolet absorbent vesicles, wherein an amount of the organic ultraviolet absorbent vesicles in the top coat layer is 0.5 parts to 10 parts by weight per 100 parts by weight of the resin composition of the top coat layer and an amount of the organic ultraviolet absorbent vesicles in the transparent resin layer is 0.2 parts to 5 parts by weight per 100 parts by weight of the resin composition of the transparent resin layer and wherein the organic ultraviolet absorbent is selected from the group consisting of benzotriazole, triazine, benzophenone, benzoate and cyanoacrylate-based absorbents.

7. The decorative sheet of claim 6, wherein the outer membrane is a monolayer.

8. The decorative sheet of claim 6, wherein an embossed pattern is formed on a surface of the transparent resin layer which faces the top coat layer, and wherein the embossed pattern has recesses which are filled with the top coat layer.

9. A decorative sheet, comprising:
a top coat layer, which comprises a resin composition comprising an urethane-based resin as a main component, as an outermost layer; and
a transparent resin layer, which comprises a resin composition comprising a transparent highly crystalline polypropylene as a main component, wherein an embossed pattern is formed on a surface of the transparent resin layer which faces the top coat layer, and wherein the embossed pattern has recesses which are filled with the top coat layer, the top coat layer is provided only in the recesses of the embossed pattern of the transparent resin layer, wherein the transparent resin layer contains an organic ultraviolet absorbent, and
the organic ultraviolet absorbent is encapsulated in vesicles having a monolayer outer membrane comprising a phospholipid and a dispersant and provided as organic ultraviolet absorbent vesicles, wherein an amount of the organic ultraviolet absorbent vesicles in the transparent resin layer is 0.2 parts to 5 parts by weight per 100 parts by weight of the resin composition of the transparent resin layer, wherein the organic ultraviolet absorbent is selected from the group consisting of benzotriazole, triazine, benzophenone, benzoate, and cyanoacrylate-based absorbents.

10. The decorative sheet of claim 6, wherein the organic ultraviolet absorbent vesicles are organic ultraviolet absorbent liposomes having an outer membrane made of phospholipid.

11. A decorative sheet, comprising:
a top coat layer which comprises a resin composition comprising an urethane-based resin as a main component, as an outermost layer; and
a transparent resin layer on the underside of the top coat layer, wherein
at least one of the top coat layer and the transparent resin layer contains an inorganic ultraviolet absorbent, and
the inorganic ultraviolet absorbent is encapsulated in vesicles having an outer membrane comprising a phospholipid and a dispersant and provided as inorganic ultraviolet absorbent vesicles, wherein an amount of the inorganic ultraviolet absorbent vesicles in the top coat layer is 3 parts to 5 parts by weight per 100 parts by weight of a composition of the top coat layer and an amount of the inorganic ultraviolet absorbent vesicles in the transparent resin layer is 0.2 parts to 3.0 parts by weight per 100 parts by weight of a composition of the transparent resin layer, wherein the inorganic ultraviolet absorbent is zinc oxide.

12. The decorative sheet of claim 11, wherein the outer membrane is a monolayer.

13. The decorative sheet of claim 11, wherein an embossed pattern is formed on the transparent resin layer, and wherein the embossed pattern has recesses which are filled with at least the top coat layer.

14. The decorative sheet of claim 6, further comprising an ink layer containing a photostabilizer is provided as an underlayer of the transparent resin layer.

15. The decorative sheet of claim 1, wherein the phospholipid is phosphatidylcholine, the organic ultraviolet absorbent is hydroxyphenyl triazine.

16. The decorative sheet of claim 2, wherein the phospholipid is phosphatidylcholine, the organic ultraviolet absorbent is hydroxyphenyl triazine.

17. The decorative sheet of claim 3, wherein the phospholipid is phosphatidylcholine, the organic ultraviolet absorbent is hydroxyphenyl triazine.

18. The decorative sheet of claim 6, wherein the phospholipid is phosphatidylcholine, the organic ultraviolet absorbent is hydroxyphenyl triazine.

19. The decorative sheet of claim 9, wherein the phospholipid is phosphatidylcholine, the organic ultraviolet absorbent is hydroxyphenyl triazine.

20. The decorative sheet of claim 11, wherein the phospholipid is phosphatidylcholine.

* * * * *